US010708135B1

(12) United States Patent
Elliott, IV

(10) Patent No.: US 10,708,135 B1
(45) Date of Patent: Jul. 7, 2020

(54) UNIFIED AND AUTOMATED INSTALLATION, DEPLOYMENT, CONFIGURATION, AND MANAGEMENT OF SOFTWARE-DEFINED STORAGE ASSETS

(71) Applicant: EMC IP Holding Company LLC, Hopkinton, MA (US)

(72) Inventor: William J. Elliott, IV, Holden, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/263,721

(22) Filed: Jan. 31, 2019

(51) Int. Cl.
| G06F 15/173 | (2006.01) |
| H04L 12/24 | (2006.01) |
| H04L 29/08 | (2006.01) |
| G06F 8/60 | (2018.01) |
| G06F 9/50 | (2006.01) |

(52) U.S. Cl.
CPC ............ *H04L 41/0843* (2013.01); *G06F 8/60* (2013.01); *G06F 9/5077* (2013.01); *H04L 41/0893* (2013.01); *H04L 67/1097* (2013.01)

(58) Field of Classification Search
CPC .......... G06F 3/067; G06F 8/60; G06F 9/5077; H04L 67/1097; H04L 41/0843; H04L 41/0893
See application file for complete search history.

(56) References Cited

U.S. PATENT DOCUMENTS

| 8,856,483 B1 * | 10/2014 | Paterson-Jones ..... G06F 12/023 711/170 |
| 8,898,402 B1 * | 11/2014 | Stronge ................ G06F 3/0605 711/100 |
| 9,262,313 B2 * | 2/2016 | Herron .................... G06F 12/02 |
| 9,596,135 B1 * | 3/2017 | Thomas .............. H04L 41/0806 |
| 9,602,341 B1 | 3/2017 | Degwekar et al. |

(Continued)

OTHER PUBLICATIONS

Dell Press Release; "Dell EMC Software-Defined Storage Paves Way for Data Center Modernization;" Jan. 21, 2019; https://www.emc.com/about/news/press/2017/20170508-07.htm; 3 pages.

(Continued)

*Primary Examiner* — Jonathan A Bui
(74) *Attorney, Agent, or Firm* — Daly Crowley Mofford & Durkee, LLP

(57) ABSTRACT

A consumption request, comprising a stack parameter and a resource characteristic parameter, is accessed. The stack parameter specifies at least one type of storage asset that is requested. The resource characteristic parameter specifies at least one functional capability required of the storage asset. Based on the stack parameter, a set of one or more first storage assets able to satisfy the consumption request, is determined. For each first storage asset in the set that is not deployed, a first workflow is generated, the first workflow configured to deploy the respective first storage asset in the set that is not deployed. For each second storage asset in the set that lacks the resource characteristic parameter, a second workflow, configured to implement that resource characteristic in the respective second storage asset, is generated. The set of storage assets is configured to satisfy the consumption request, by miming the first and second workflows.

20 Claims, 29 Drawing Sheets

(56) References Cited

U.S. PATENT DOCUMENTS

| | | | | |
|---|---|---|---|---|
| 10,057,187 | B1* | 8/2018 | Dhoolam | G06F 3/0605 |
| 10,083,100 | B1* | 9/2018 | Agetsuma | G06F 8/65 |
| 10,175,886 | B1* | 1/2019 | Kantor | G06F 3/0604 |
| 2002/0174306 | A1 | 11/2002 | Gajjar et al. | |
| 2004/0088417 | A1 | 5/2004 | Bober et al. | |
| 2013/0318134 | A1* | 11/2013 | Bolik | G06F 9/5011 |
| | | | | 707/827 |
| 2013/0332614 | A1* | 12/2013 | Brunk | H04L 67/1097 |
| | | | | 709/226 |
| 2015/0026430 | A1 | 1/2015 | Paterson-Jones et al. | |
| 2015/0058555 | A1* | 2/2015 | Karamanolis | G06F 3/0689 |
| | | | | 711/114 |
| 2017/0060918 | A1* | 3/2017 | Iyer | G06F 16/185 |
| 2017/0331683 | A1 | 11/2017 | Brooker et al. | |
| 2018/0101324 | A1* | 4/2018 | Sharma | G06F 3/0644 |
| 2019/0222646 | A1* | 7/2019 | Rao | G06F 3/061 |
| 2019/0227845 | A1* | 7/2019 | Sridhar | G06F 3/0605 |

OTHER PUBLICATIONS

Leone et al.; "Accelerate IT Transformation with Hyperconverged Infrastructure (HCI);" Enterprise Strategy Group; Jan. 2018; 11 pages.

Realize "Project Nautilus; Unified Data Stack for IoT;" Dell Inc.; Jan. 2017; 23 pages.

Dell EMC; VxFlex Ready Nodes; "Scalable, reliable and easy-to-deploy building blocks for hyper-converged or server SAN architecture, multi-hypervisor or bare metal environments, and high performance databases;" Jan. 2018; 8 pages.

Dell EMC; "Software-defined storage to transform your IT infrastructure;" Jan. 10, 2019; https://www.dellemc.com/en-us/storage/data-storage/software-defined-storage.htm#compare0=0; 6 pages.

Dell EMC; "Dell EMC Ready Solutions for Software-Defined Infrastructure;" Jan. 2018; 7 pages.

Coyne et al.; "IBM Software-Defined Storage Guide;" Redbooks; Jan. 2018; 158 pages.

Dell EMC; "Dell EMC Isilon Big Data Storage and Analytics Solutions;" Dell EMC; "Dell EMC Isilon Big Data Storage and Analytics Solutions;" Jan. 31, 2019; https://www.emc.com/collateral/hardware/solution-overview/h8319-scale-out-nas-greenplum-hd-so.pdf; 4 pages.

Dell EMC White Paper; VXFLEX OS; Networking Best Practices and Design Considerations; Jul. 2018; 38 pages.

Dell EMC; "ECS Overview and Architecture;" A Dell EMC Technical Whitepaper; Sep. 2018; 63 pages.

Redefine; Dell EMC White Paper; Technical White paper: Elastic Cloud Storage Software Architecture; Feb. 2015; 12 pages.

Dell EMC Product Overview; "Hyper-Converged with Dell EMC VXRACK Flex;" Dell Inc. or its subsidiaries; Jan. 2018; 2 pages.

U.S. Appl. No. 16/263,729, filed Jan. 31, 2019, Elliott IV.

U.S. Non-Final Office Action dated Apr. 7, 2020 for U.S. Appl. No. 16/263,729; 16 Pages.

PCT Invitation to Pay Additional Fees and Partial Search Report dated Apr. 17, 2020 for International Application No. PCT/US2020/014255; 11 Pages.

* cited by examiner

US 10,708,135 B1

UNIFIED AND AUTOMATED INSTALLATION, DEPLOYMENT, CONFIGURATION, AND MANAGEMENT OF SOFTWARE-DEFINED STORAGE ASSETS

FIELD

This application relates at least generally to devices, systems, and methods for data storage and data processing in computer systems, including systems for managing data and resources in a virtualized environment. More particularly, this application relates at least to ways to improve configuration, deployment, and installation of software-defined data storage.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In data storage systems, users of different storage technologies store enormous amounts of data on different storage devices. From a storage array of storage devices, a user may choose any combination of the storage devices to create a virtual storage resource or logical unit. Computer systems are constantly improving in terms of speed, reliability, and processing capability. As is known in the art, computer systems that process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

In addition, enterprises are dealing with more data than ever, and traditional infrastructure no longer provides the reliability, performance and efficiency that enterprise workloads (e.g., enterprise information handling systems) require. This reality is challenging information technology (IT) managers to adopt simpler and more streamlined and cost-effective approaches, such as software-defined infrastructure (SDI). SDI enables enterprises to enjoy the power and efficiency of IT as a service by separating hardware and software and focusing on extensive automation and orchestration. This allows IT to supply the business with scalable, agile resources for cloud- and web-based services and native cloud workloads.

Also, information processing systems increasingly utilize reconfigurable virtual resources to meet changing user needs in an efficient, flexible and cost-effective manner. For example, cloud computing and storage systems implemented using virtual resources have been widely adopted. Other virtual resources now coming into widespread use in information processing systems include Linux containers. Such containers may be used to provide at least a portion of the virtualization infrastructure of a given information processing system.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

In certain embodiments, a computer-implemented method for deploying storage assets is provided. A consumption request to consume storage assets is accessed, the consumption request comprising a stack parameter and a resource characteristic parameter, wherein the stack parameter specifies at least one type of storage asset that is requested, and the resource characteristic parameter specifies at least one functional capability required of the storage asset. Based on the stack parameter, a set of one or more first storage assets able to satisfy the consumption request, is determined. For each first storage asset in the set that is not deployed, a first workflow is generated, the first workflow configured to deploy the respective first storage asset in the set that is not deployed. For each second storage asset in the set that lacks the resource characteristic parameter, a second workflow is generated, the second workflow configured to implement that resource characteristic in the respective second storage asset. The set of storage assets is configured to satisfy the consumption request, wherein the configuring comprises running the first and second workflows.

In certain embodiments of the computer-implemented method, the computer-implemented method further comprises determining that a third storage asset resource can be created to satisfy the consumption request; and generating a third workflow configured to create and deploy the third storage asset resource. In certain embodiments, the third storage asset resource is formed within at least one of the first and second storage assets.

In certain embodiments of the computer-implemented method, the consumption request is for provisioning a fileshare, and the computer-implemented method further comprises contacting one or more LINUX hosts to determine and store host information, registering the one or more LINUX hosts, requesting deployment of a predetermined type of storage assets as respective services, and creating a corresponding fileshare In further embodiments of the computer implemented method, the consumption request comprises a query, including query parameters, relating to a search of an inventory of the storage assets, and the computer-implemented method further comprises pre-defining a set of templates applicable to the storage assets, each respective template comprising configuration of the respective storage asset and prerequisites to deploy the storage asset, and generating a rules set configured to execute on an inventory of storage assets, the rules set configured to determine, based on one or more rules in the rule set, if a template is achievable for a given storage asset.

In certain embodiments of the computer-implemented method, a list of deployment templates applicable to the storage assets is received, the list generated in view of the rules set, wherein the list of deployment templates comprises at least one of: reason why a first portion of the list of deployment templates can be deployed; and reasons why a second portion of the list of deployment templates cannot be deployed.

In certain embodiments of the computer-implemented method, the storage assets comprise software-defined storage assets. In certain embodiments, at least a portion of the computer-implemented method executes in a cloud-native environment.

In another aspect, a system is provided, the system comprising a processor and a non-volatile memory in operable communication with the processor and storing computer program code that when executed on the processor causes the processor to execute a process operable to perform certain operations. One operation comprises accessing a consumption request to consume storage assets, the consumption request comprising a stack parameter and a resource characteristic parameter, wherein the stack parameter specifies at least one type of storage asset that is requested, and the resource characteristic parameter specifies at least one functional capability required of the storage asset. One operation comprises determining, based on the stack parameter, a set of one or more first storage assets able to satisfy the consumption request. One operation comprises, for each first storage asset in the set that is not deployed, generating a first workflow configured to deploy the respective first storage asset in the set that is not deployed. One operation comprises, for each second storage asset in the set that lacks the resource characteristic parameter, generating a second workflow configured to implement that resource characteristic in the respective second storage asset. One operation comprises configuring the set of storage assets to satisfy the consumption request, wherein the configuring comprises running the first and second workflows.

In a further embodiment of the system, the operations performed further comprise determining that a third storage asset resource can be created to satisfy the consumption request and generating a third workflow configured to create and deploy the third storage asset resource. In certain embodiments, the third storage asset resource is formed within at least one of the first and second storage assets. In certain embodiments, the consumption request comprises a query, including query parameters, relating to a search of an inventory of the storage assets, and the computer-implemented method further comprises computer program code that when executed on the processor causes the processor to perform the following actions: pre-defining a set of templates applicable to the storage assets, each respective template comprising configuration of the respective storage asset and prerequisites to deploy the storage asset, and generating a rules set configured to execute on an inventory of storage assets, the rules set configured to determine, based on one or more rules in the rule set, if a template is achievable for a given storage asset.

In certain embodiments of the system, the operations include receiving a list of deployment templates applicable to the storage assets, the list generated in view of the rules set, wherein the list of deployment templates comprises at least one of: reasons why a first portion of the list of deployment templates can be deployed; and reasons why a second portion of the list of deployment templates cannot be deployed.

In certain embodiments of the system, the storage assets comprise software-defined storage assets. In certain embodiments of the system, at least a portion of the computer program code executes in a cloud-native environment.

In a further aspect, a computer program product is provided, the computer program product including a non-transitory computer readable storage medium having computer program code encoded thereon that when executed on a processor of a computer causes the computer to operate a storage system. In certain embodiments, the computer program product comprises computer program code for accessing a consumption request to consume storage assets, the consumption request comprising a stack parameter and a resource characteristic parameter, wherein the stack parameter specifies at least one type of storage asset that is requested, and the resource characteristic parameter specifies at least one functional capability required of the storage asset. In certain embodiments, the computer program product comprises computer program code for determining, based on the stack parameter, a set of one or more first storage assets able to satisfy the consumption request.

In certain embodiments, the computer program product comprises computer program code for generating, for each first storage asset in the set that is not deployed, a first workflow configured to deploy the respective first storage asset in the set that is not deployed. In certain embodiments, the computer program product comprises computer program code for generating, for each second storage asset in the set that lacks the resource characteristic parameter, a second workflow configured to implement that resource characteristic in the respective second storage asset. In certain embodiments, the computer program product comprises computer program code for configuring the set of storage assets to satisfy the consumption request, wherein the configuring comprises running the first and second workflows.

In further embodiments, the computer program product comprises computer program code for determining that a third storage asset resource can be created to satisfy the consumption request, and computer program code for generating a third workflow configured to create and deploy the third storage asset resource.

In additional embodiments, the consumption request comprises a query, including query parameters, relating to a search of an inventory of the storage assets, and the computer program product further comprises computer program code for pre-defining a set of templates applicable to the storage assets, each respective template comprising configuration of the respective storage asset and prerequisites to deploy the storage asset, and computer program code for generating a rules set configured to execute on an inventory of storage assets, the rules set configured to determine, based on one or more rules in the rule set, if a template is achievable for a given storage asset.

In certain embodiments, the computer program product comprises computer program code for receiving a list of deployment templates applicable to the storage assets, the list generated in view of the rules set, wherein the list of deployment templates comprises at least one of: reason why a first portion of the list of deployment templates can be deployed; and reasons why a second portion of the list of deployment templates cannot be deployed. In certain embodiments, the storage assets comprise software-defined storage assets. Details relating to these and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

Figure 12:
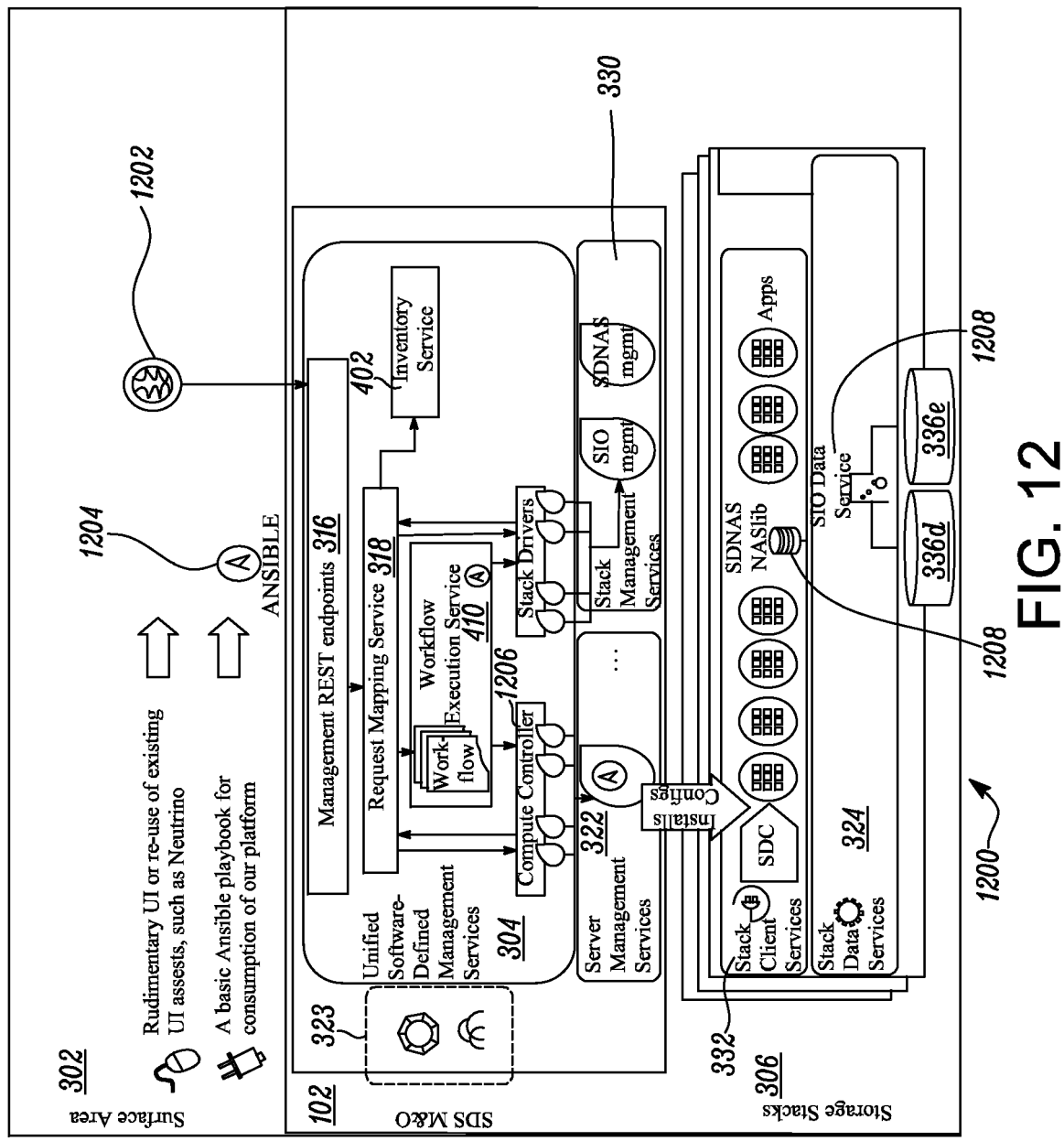
FIG. 12 is an illustrative diagram showing automated vertical functions taking place in an architecture based on the architectures of FIGS. 3-8, in accordance with at least one embodiment.
Figure 13:
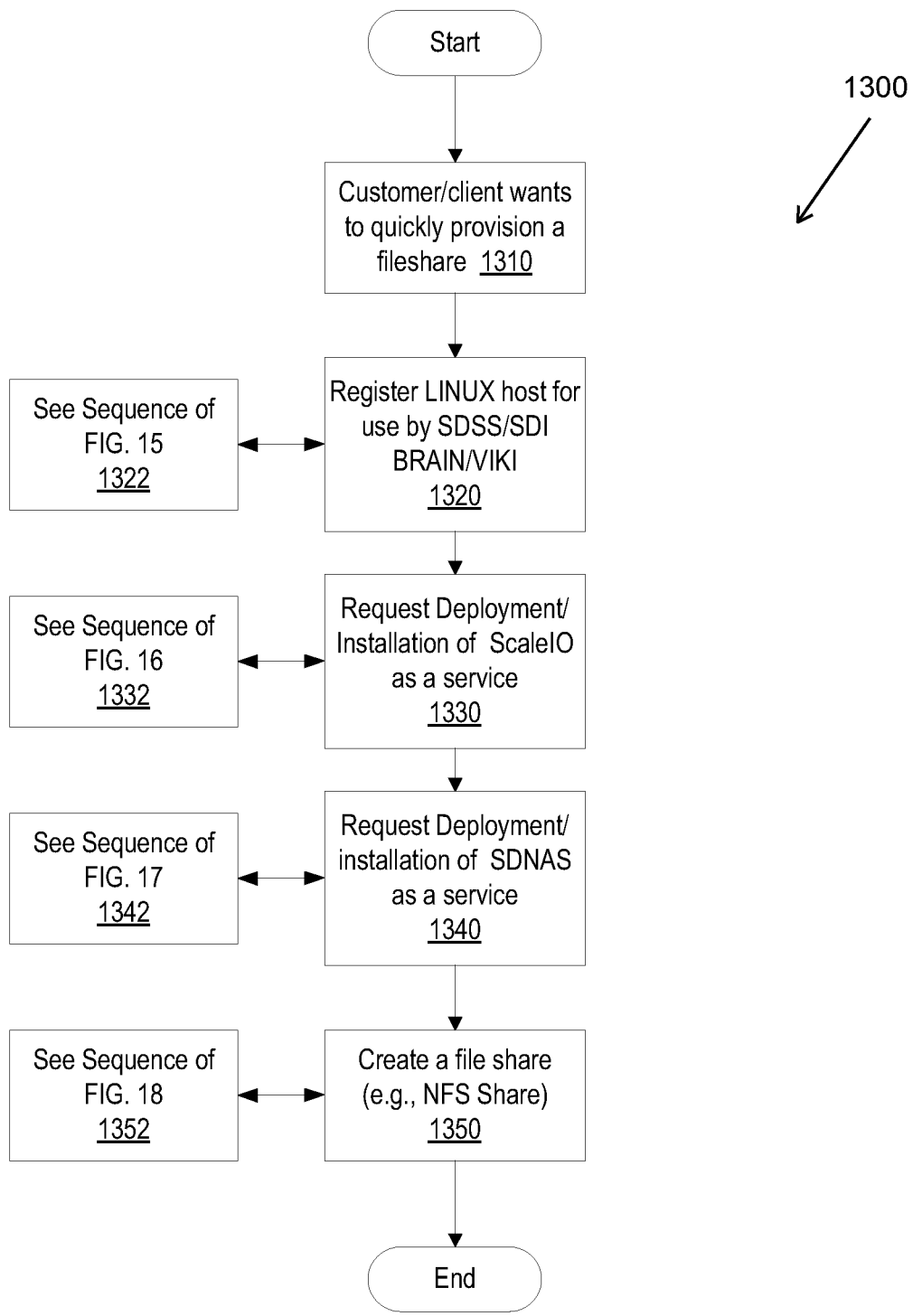
FIG. 13 is a simplified flowchart showing a method for registering and deploying hosts and storage, for the architectures of FIGS. 3-12, in accordance with at least one embodiment.
Figure 14:
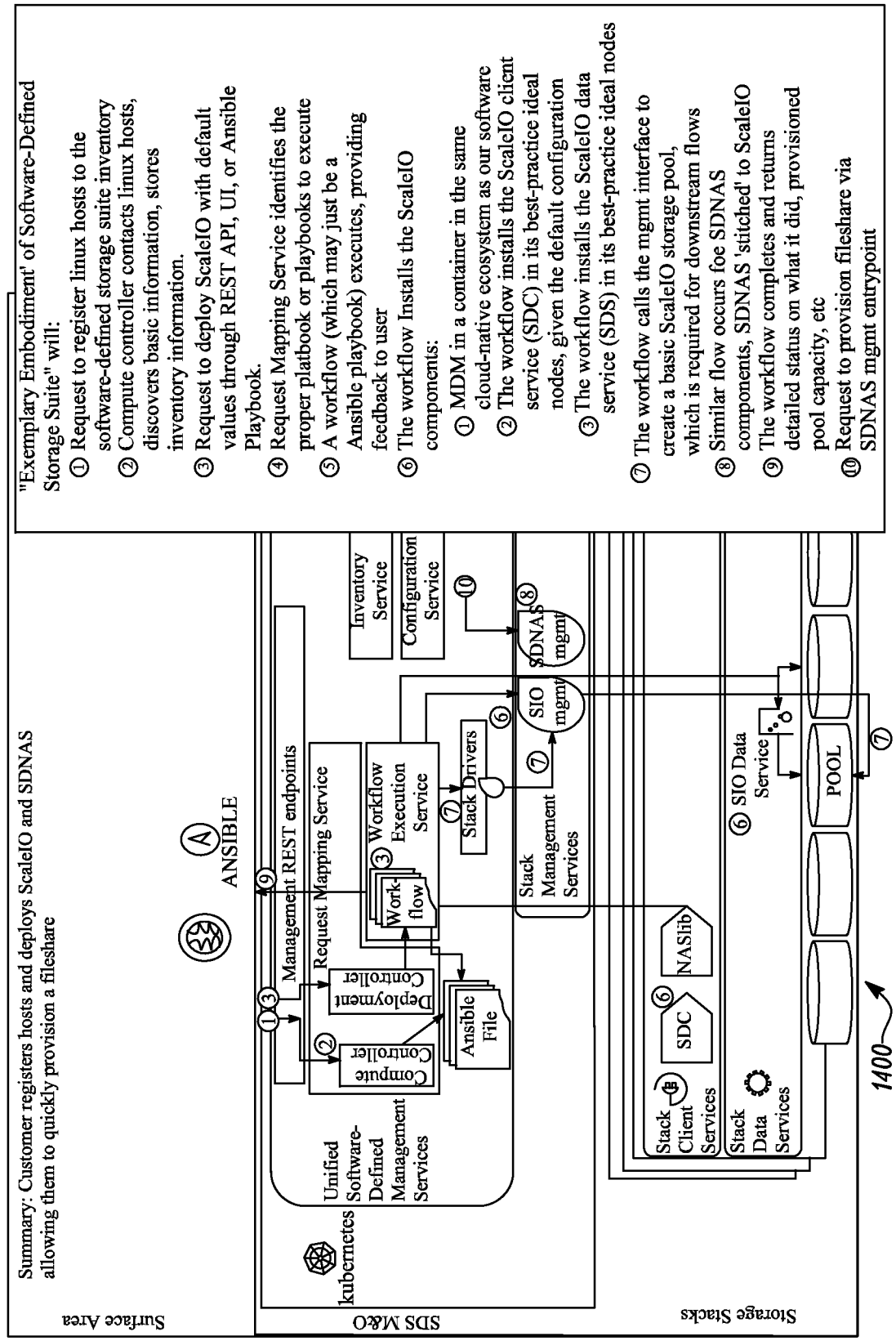
Figure 15:
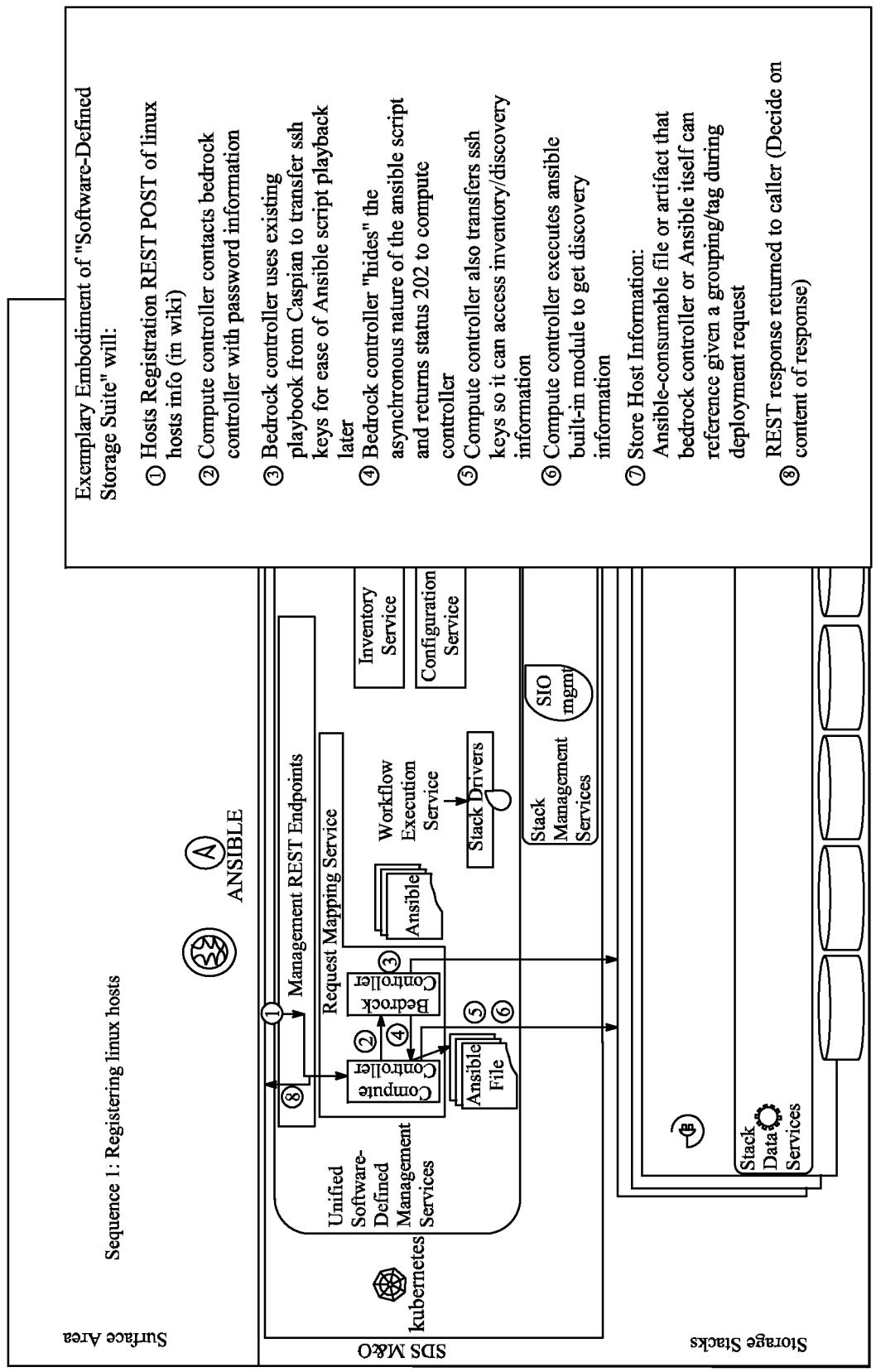
Figure 16:
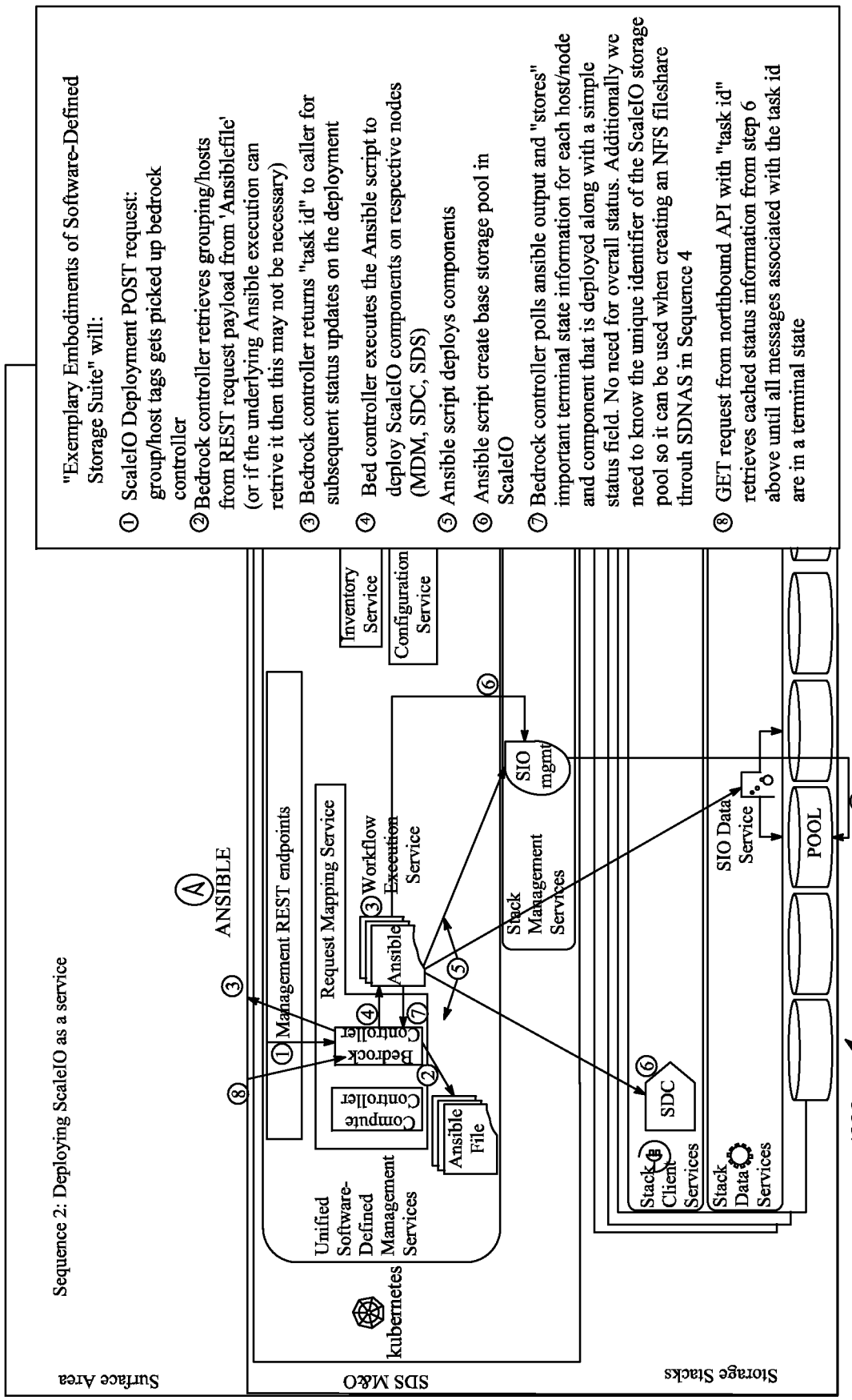
Figure 17:
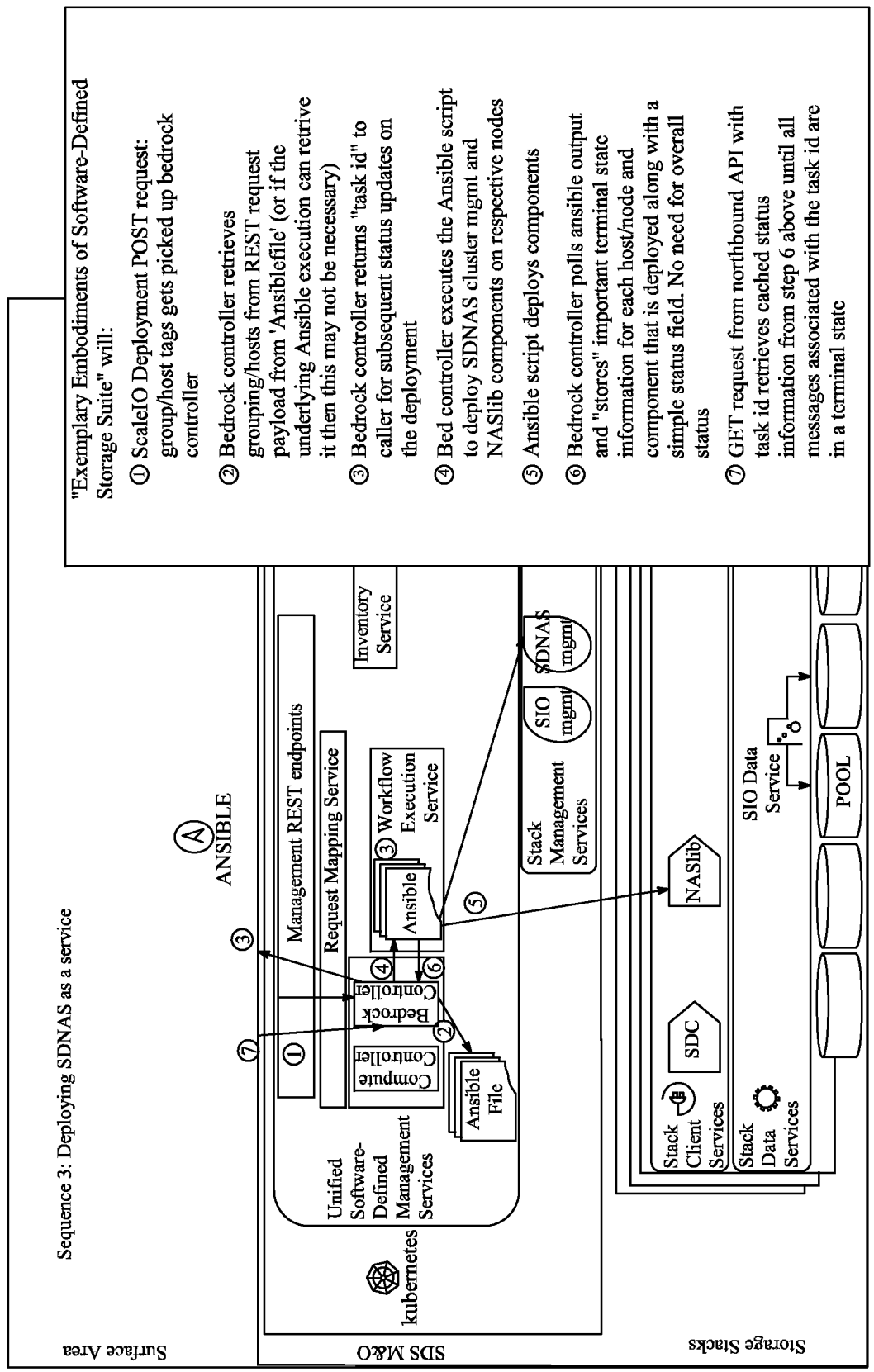
Figure 18:
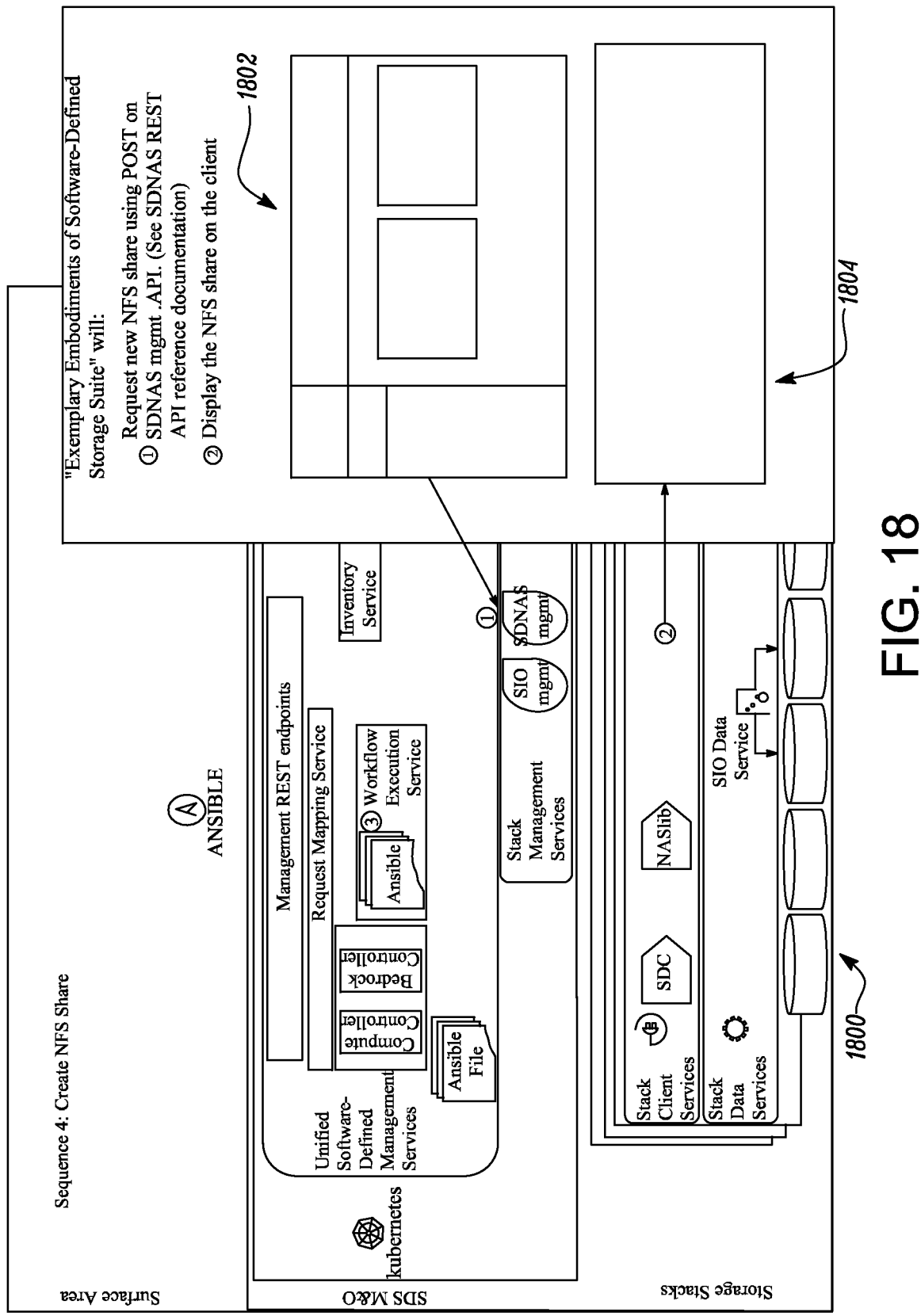
Figure 19:
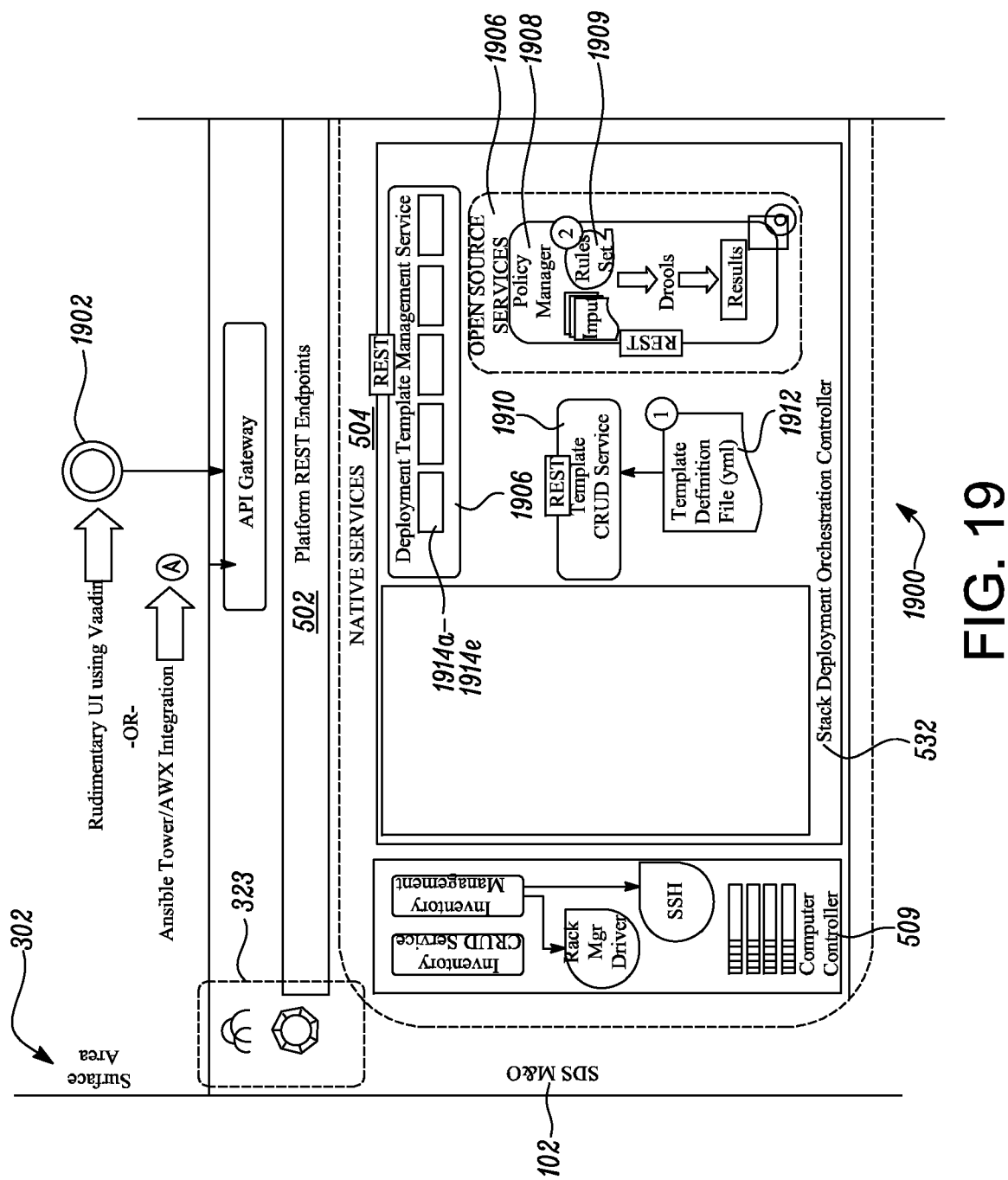
Figure 20:
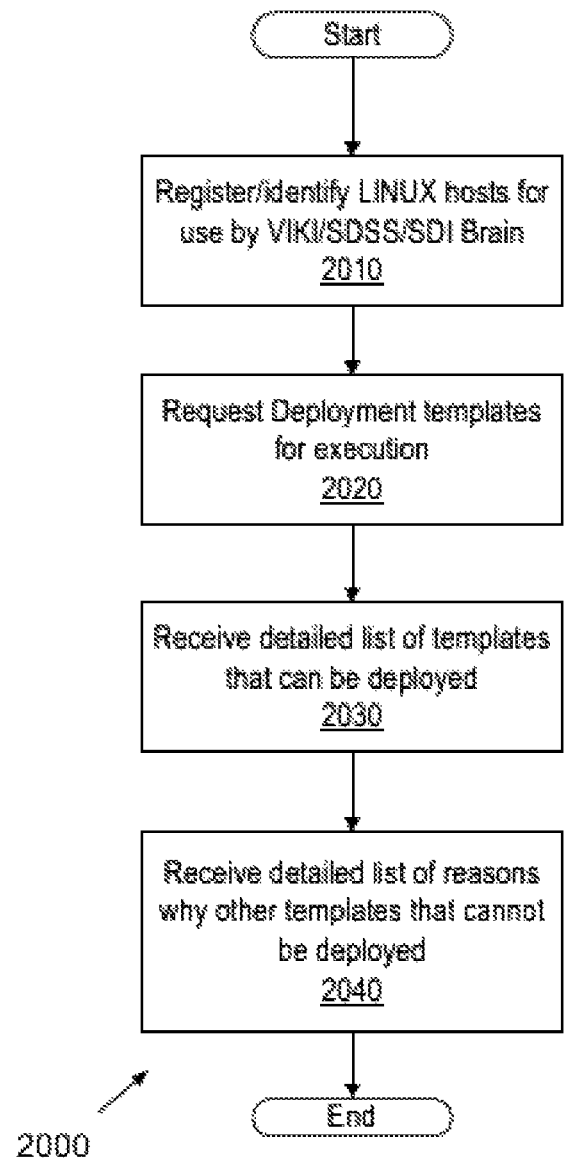
Figure 21:
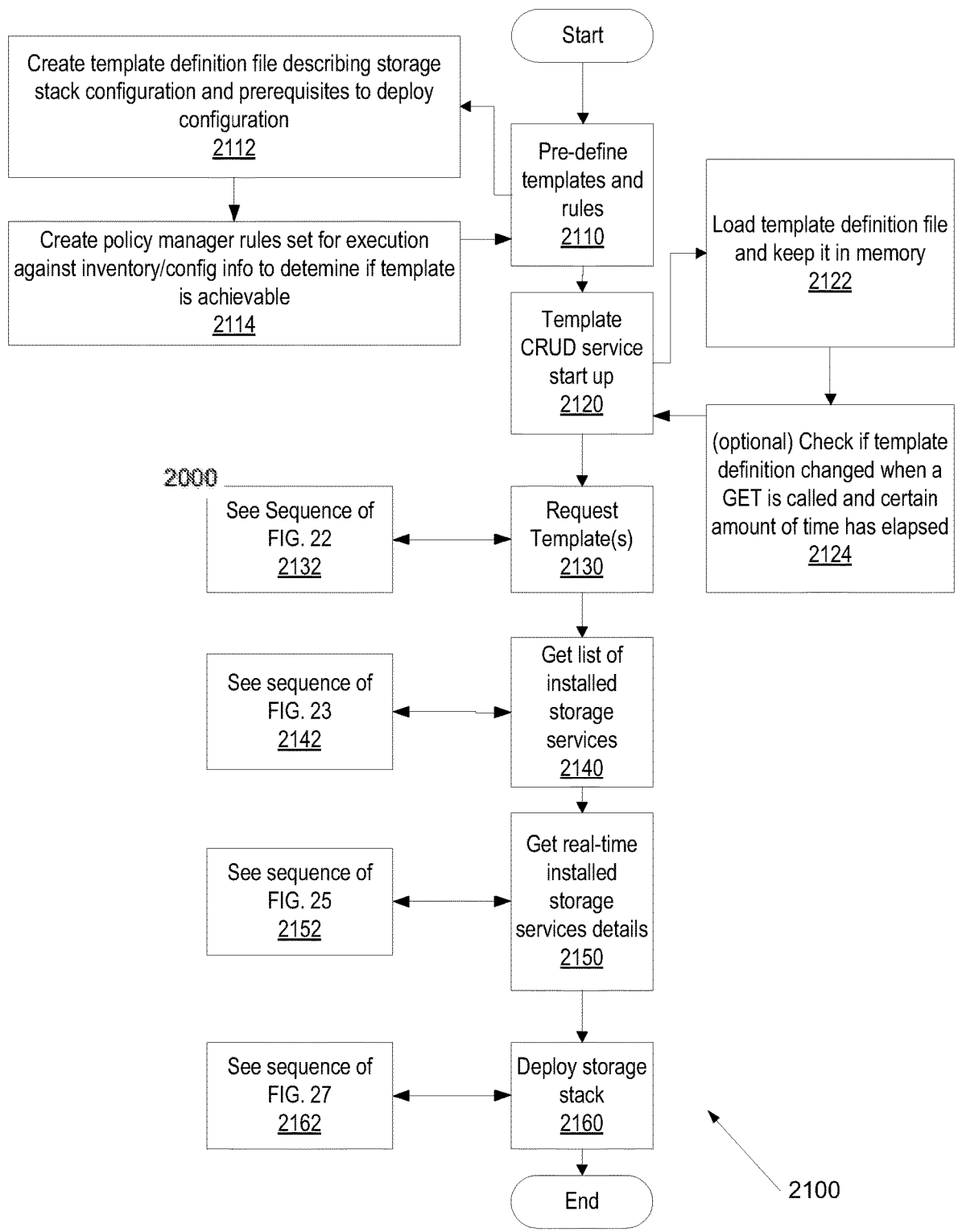
Figure 22:
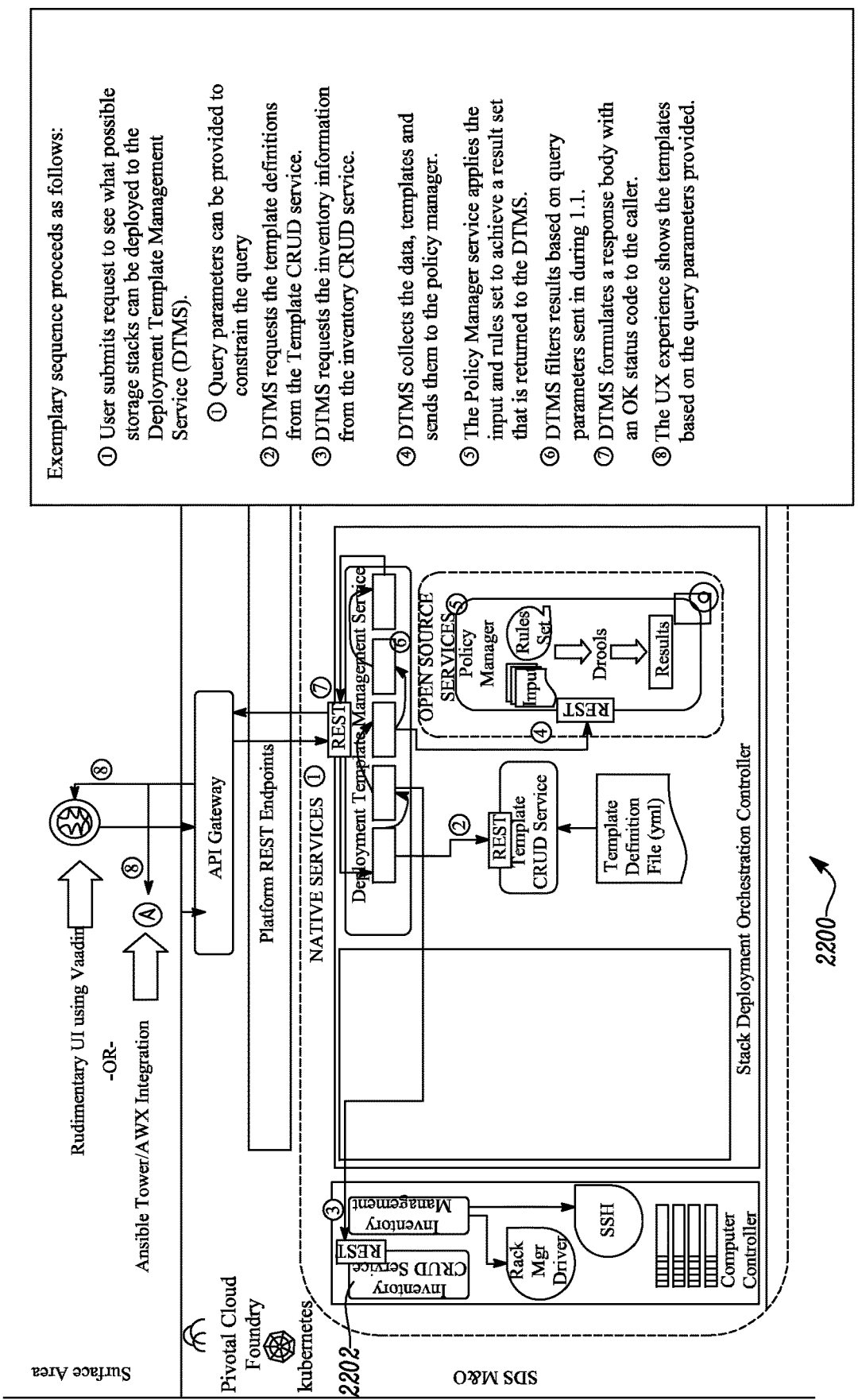
Figure 23:
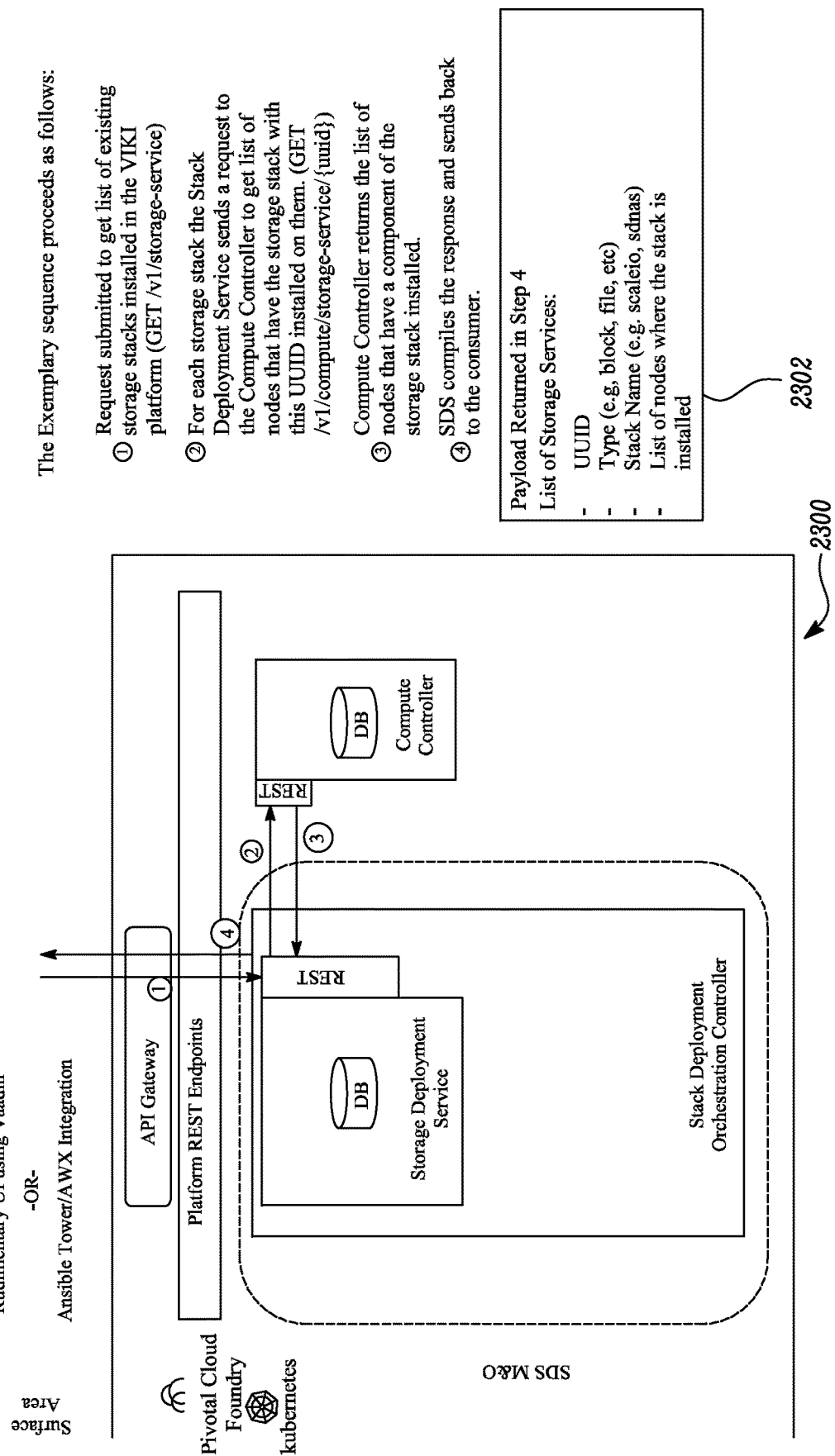
Figure 24:
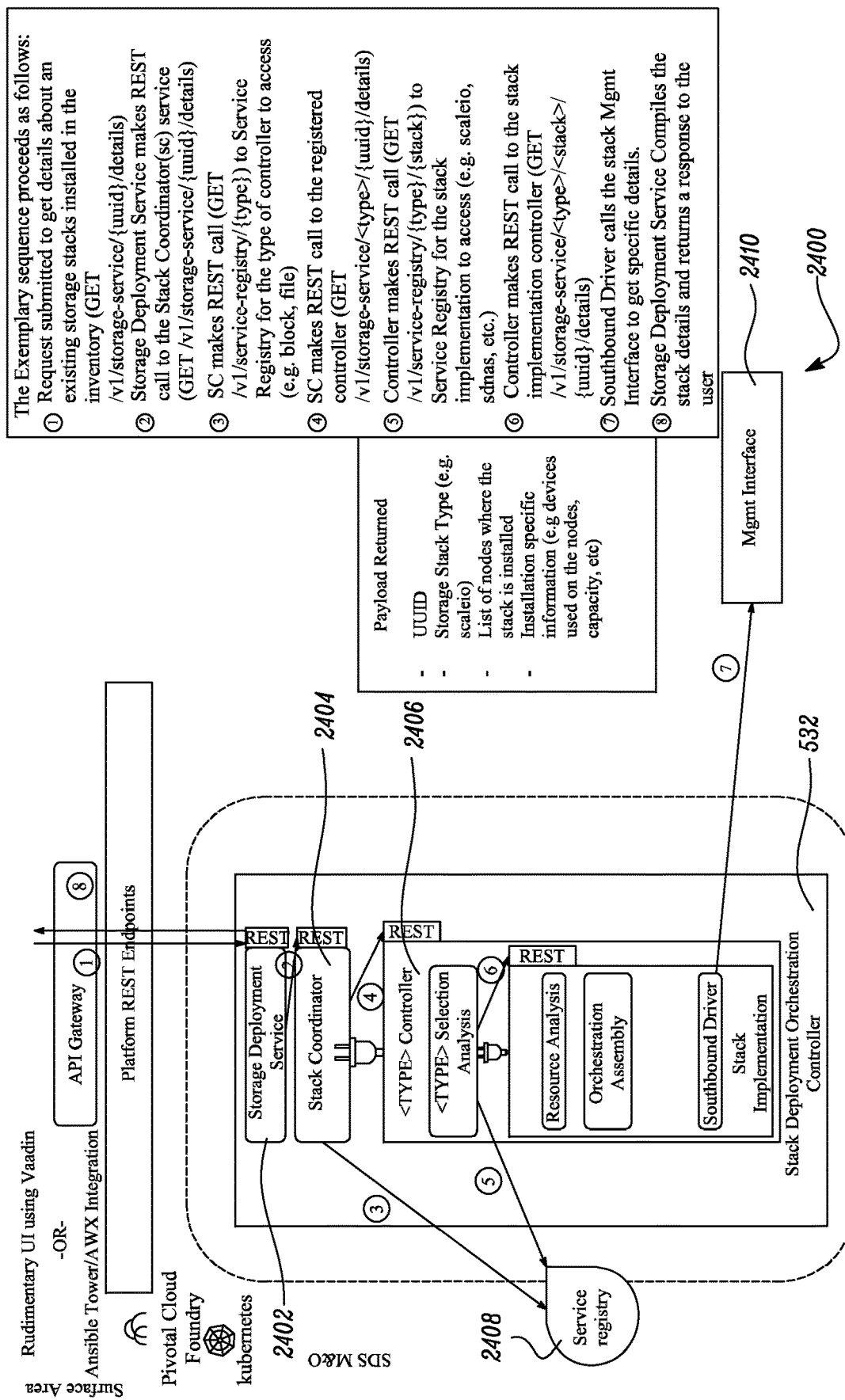
Figure 25:
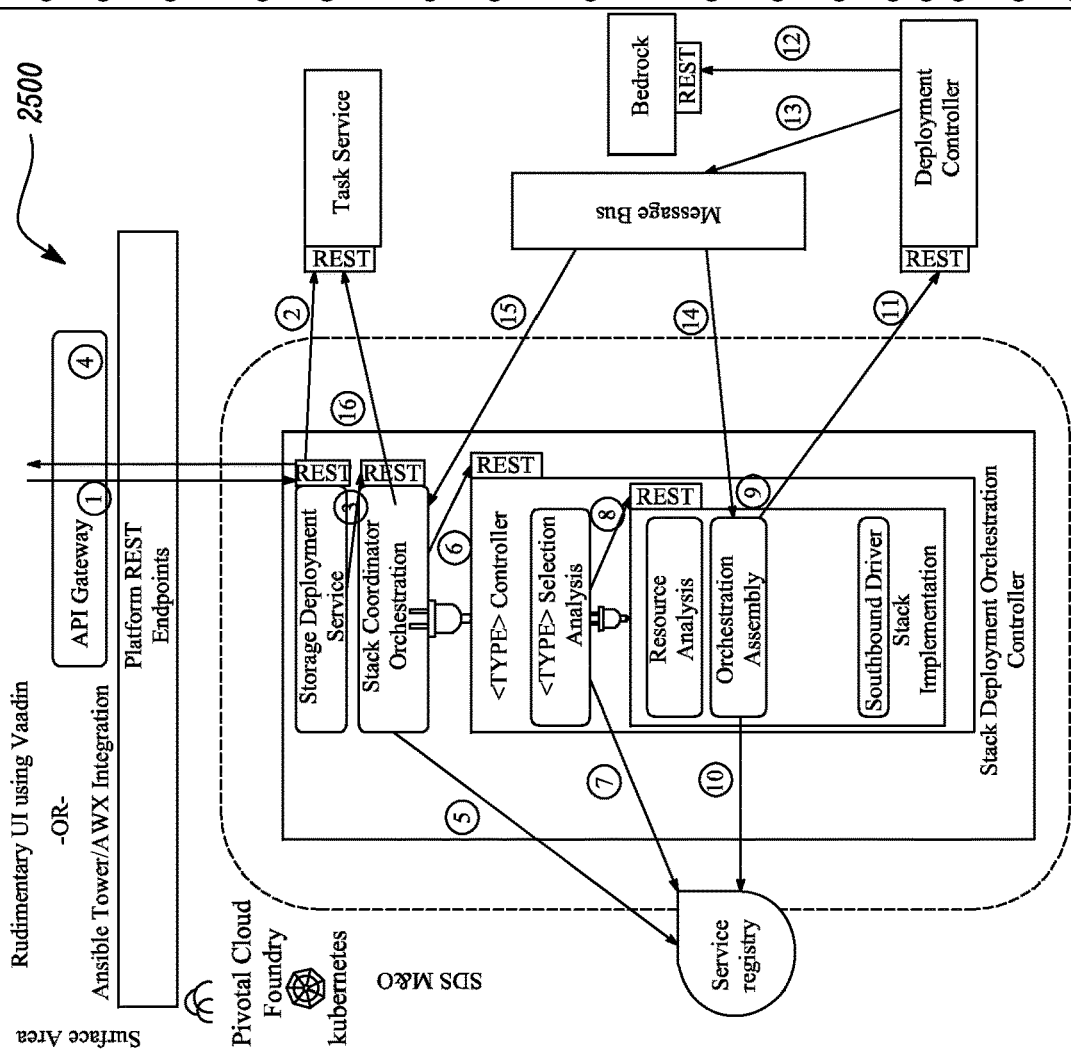
Figure 26:
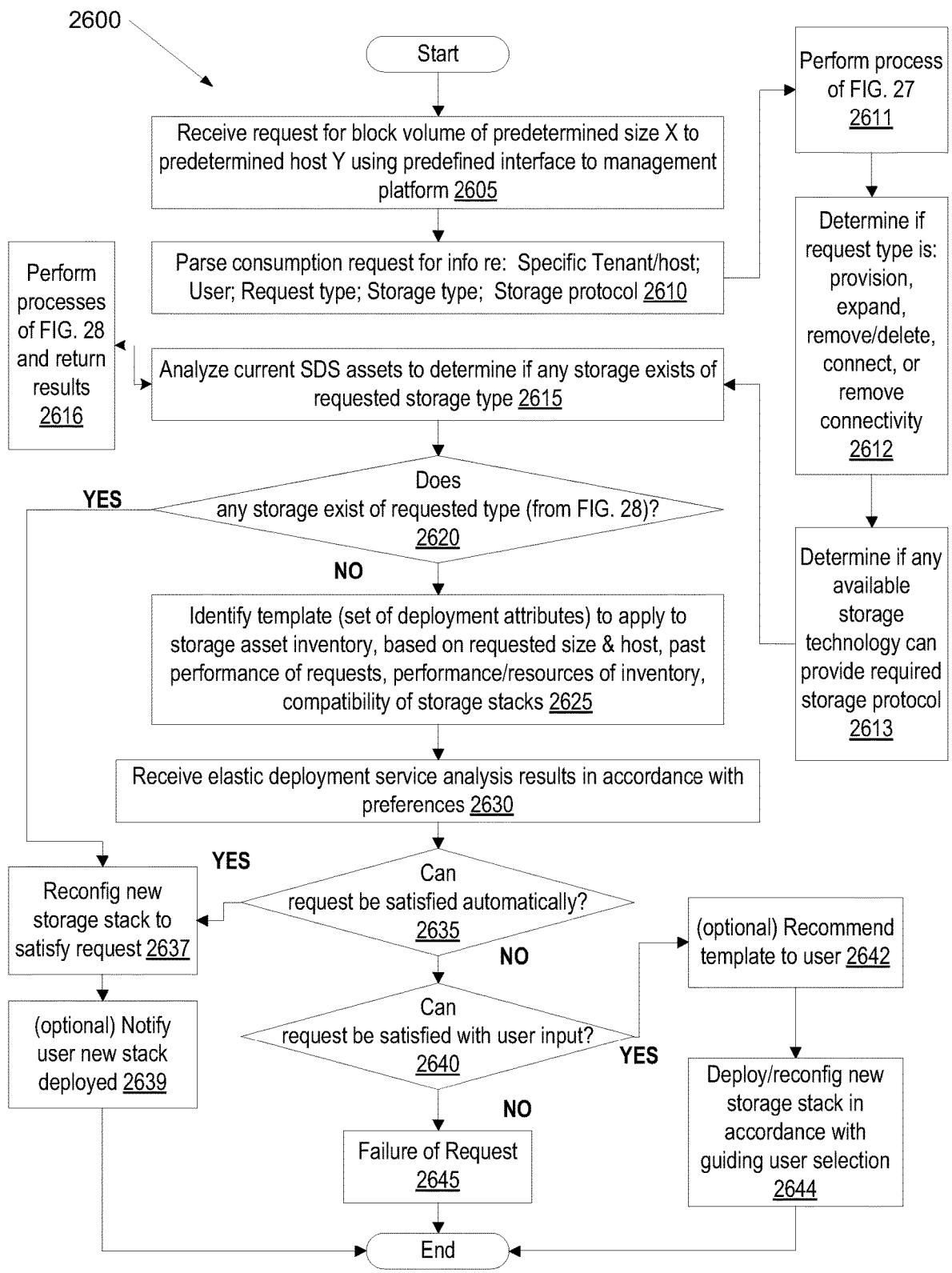
Figure 27:
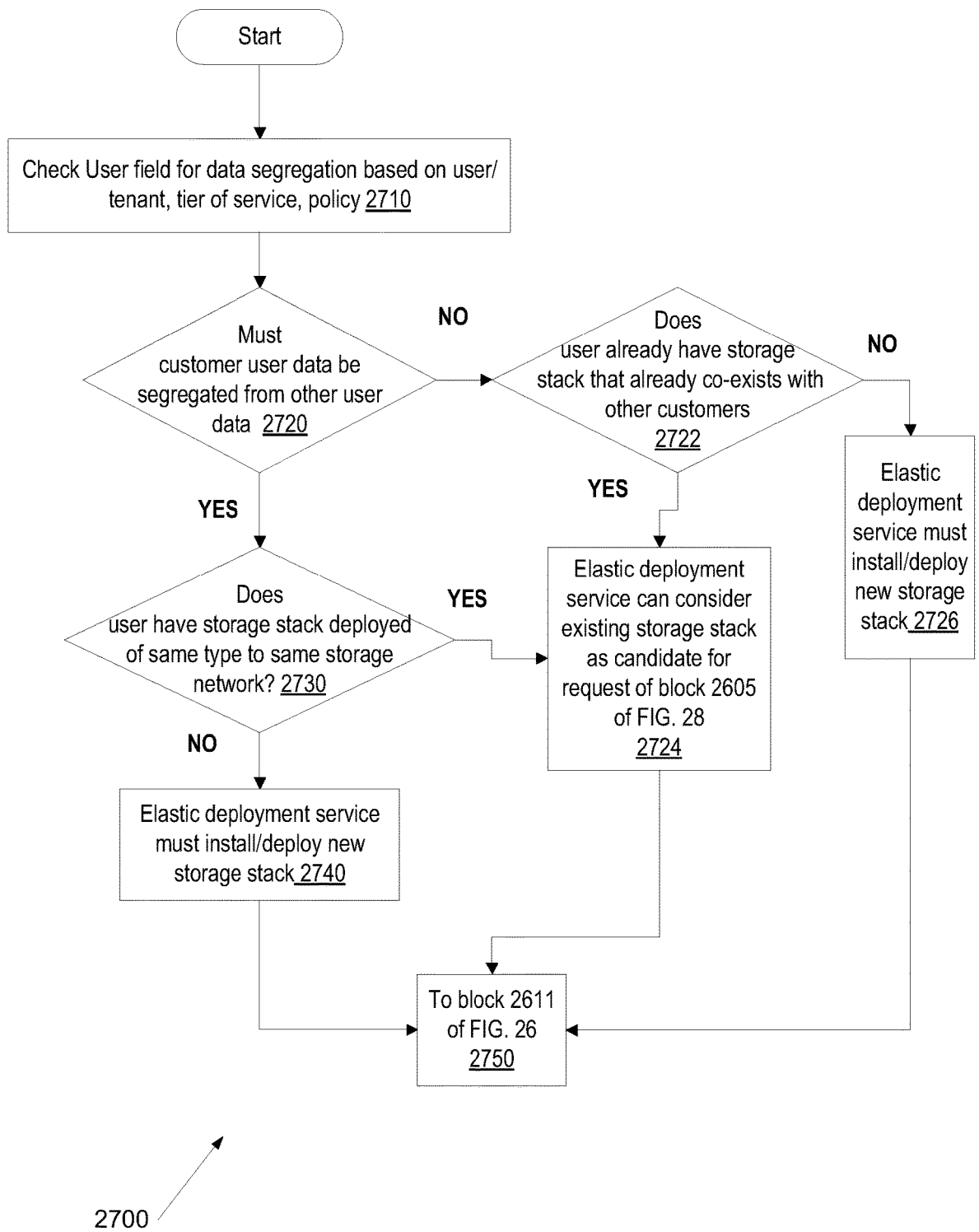
Figure 28:
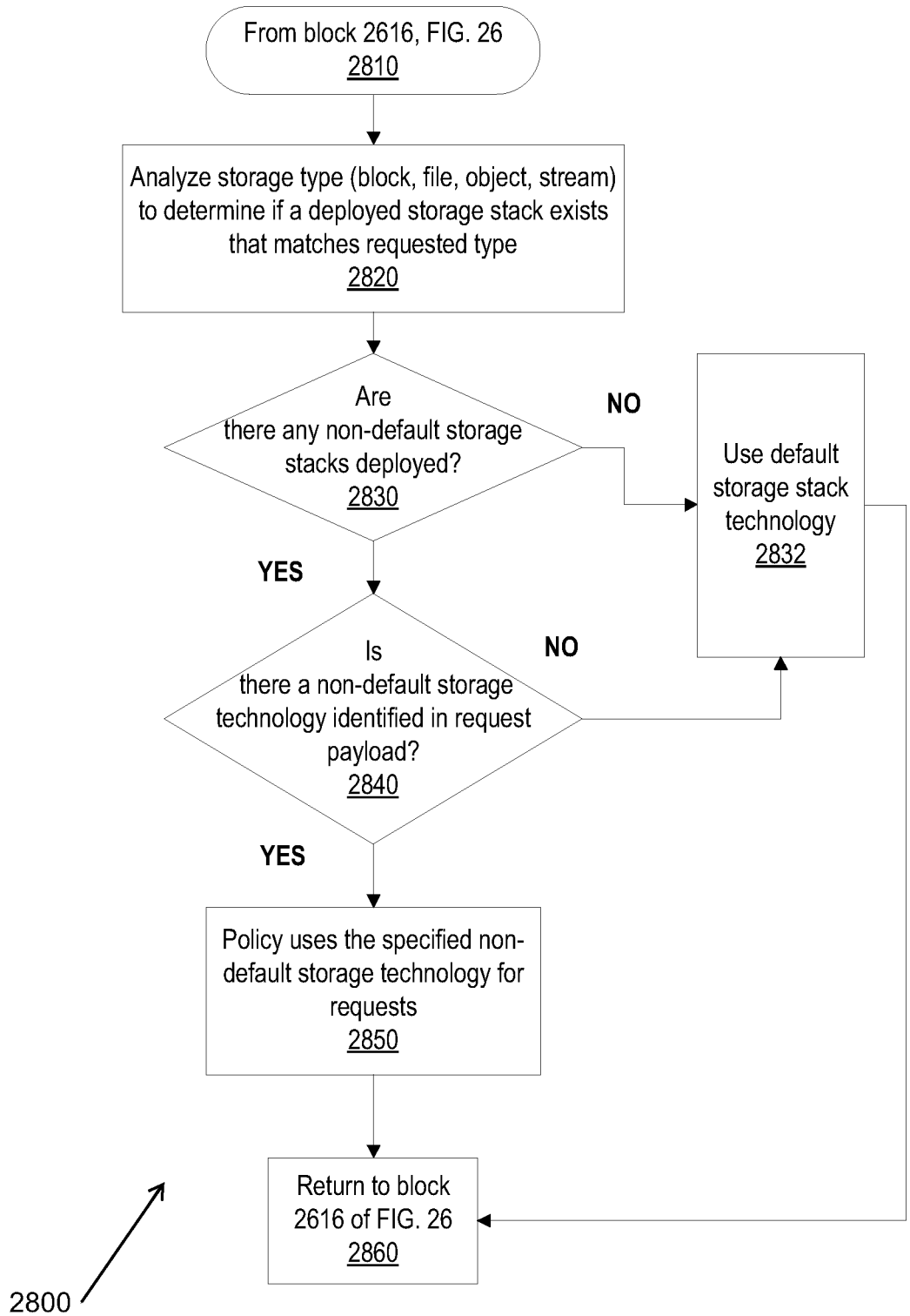
Figure 29:
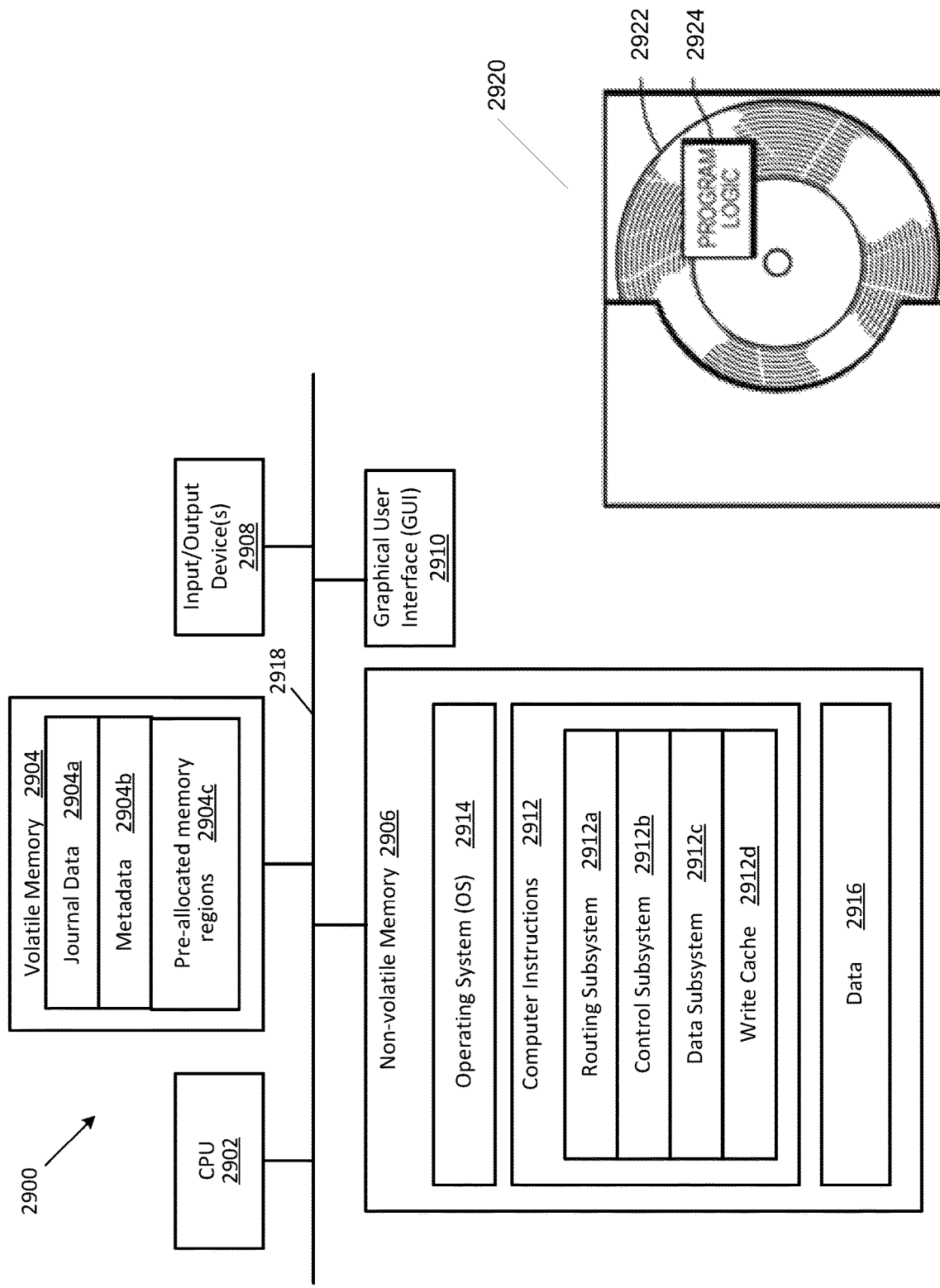

FIG. 14 is an illustrative diagram and exemplary sequence of actions taking place in the architecture of FIG. 12 and the simplified flowchart of FIG. 13, showing the components that are active during registration of a host and deployment of software defined shared block storage (based on direct attached storage), such as VxFlex OS and software defined network attached storage (SDNAS), in accordance with at least one embodiment;

FIG. 15 is an illustrative diagram and exemplary sequence of actions taking place in the architecture of FIG. 12 and the simplified flowchart of FIG. 13, showing the components that are active during registration of a host, in accordance with at least one embodiment;

FIG. 16 is an illustrative diagram and exemplary sequence of actions taking place in the architecture of FIG. 12 and the simplified flowchart of FIG. 13, showing the components that are active during deployment of Scale 10 as a service, in accordance with at least one embodiment;

FIG. 17 is an illustrative diagram and exemplary sequence of actions taking place in the architecture of FIG. 12 and the simplified flowchart of FIG. 13, showing the components that are active during deployment of SDNAS as a service, in accordance with at least one embodiment;

FIG. 18 is an illustrative diagram and exemplary sequence of actions taking place in the architecture of FIG. 12 and the simplified flowchart of FIG. 13, showing the components that are active during creation of a network file share (NFS), in accordance with at least one embodiment;

FIG. 19 is an illustrative diagram showing the components that are active during registration of a host and requesting deployment templates, in accordance with at least one embodiment;

FIG. 20 is an illustrative simplified flowchart showing actions taking place during registration of a host and requesting deployment templates, in the architecture of at least FIGS. 3-8, in accordance with at least one embodiment;

FIG. 21 is an illustrative simplified flowchart showing a method of responding to a request to provision storage that includes indicating which configurations are available in inventory and the capability of that inventory, for the architecture of at least FIGS. 3-8, in accordance with at least one embodiment;

FIG. 22 is an illustrative diagram and exemplary sequence of actions used to implement a method of requesting templates, for the method of FIG. 21, in accordance with at least one embodiment;

FIG. 23 is an illustrative diagram and exemplary sequence of actions used to implement a method of getting installed storage services, for the method of FIG. 21, in accordance with at least one embodiment;

FIG. 24 is an illustrative diagram and exemplary sequence of actions used to implement a method of getting real time installed storage services details, for the method of FIG. 21, in accordance with at least one embodiment;

FIG. 25 is an illustrative diagram and exemplary sequence of actions used to implement a method of deploying a storage stack, for the method of FIG. 21, in accordance with at least one embodiment;

FIG. 26 is a simplified flowchart of an exemplary method of identifying a pool of hardware that can be consumed by SDS platforms and for elastically expanding/contracting existing storage stacks, for at least the architecture of FIGS. 2-19, in accordance with at least one embodiment;

FIG. 27 is a simplified flowchart of a method of parsing a consumption request for user information, for the flowchart of FIG. 28, in accordance with at least one embodiment;

FIG. 28 is a simplified flowchart of a method of parsing a consumption request for storage type information, in accordance with at least one embodiment; and FIG. 29 is a simplified block diagram of an apparatus that may be used to implement at least a portion of the systems and method of FIGS. 1-28, in accordance with at least some embodiments.

DETAILED DESCRIPTION

At least some illustrative embodiments will be described herein with reference to exemplary information processing systems and associated computers, servers, storage devices and other processing devices. It is to be appreciated, however, that embodiments described herein are not restricted to use with the particular illustrative system and device configurations shown. In addition, embodiments can include, without limitation, apparatus, systems, methods, and computer program products comprising processor-readable storage media.

It is anticipated that at least some of the embodiments described herein are workable in various types of storage systems, not just software defined storage systems. In some embodiments, the current disclosure may enable exposure of logical storage resources and allow enterprise IT departments and cloud service providers to manage heterogeneous storage environments through a simple, robust Representational State Transfer (REST) API and a command-line interface (CLI).

Before describing embodiments of the concepts, structures, and techniques sought to be protected herein, some terms are explained, and some relevant background patents are referenced. The following description includes several terms for which the definitions are generally known in the art. However, the following glossary definitions are provided to clarify the subsequent description and may be helpful in understanding the specification and claims.

As used herein, the term "storage system" is intended to be broadly construed to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "information processing system" may be used to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Cloud computing is intended to refer to all variants of cloud computing, including but not limited to public, private, and hybrid cloud computing. In addition, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

In certain embodiments, the term "computer-readable media" may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

In certain embodiments, the term "I/O request" or simply "I/O" may be used to refer to an input or output request, such as a data read or data write request, which can originate at a host, at a user, or at any other entity in operable communication with a computer system.

In certain embodiments, the term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines. LUNs can be divided into smaller logical areas, to balance the load between system modules, where each such small logical area is called a sub-LUN.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a storage controller may refer to any system, apparatus, or device operable to manage the communication of data between a processor and storage resources of a storage array. In certain embodiments, a storage controller may provide functionality including, without limitation, disk aggregation and redundant array of independent disks (RAID), I/O routing, and error detection and recovery. A storage controller may also have features supporting shared storage and high availability. In some embodiments, a storage controller may comprise a PowerEdge RAID Controller (PERC) manufactured by Dell EMC Inc. Storage controllers can be located within a housing or enclosure other than that of an information handling system that it controls, such as a storage enclosure comprising one or more physical storage resources of a given storage array.

In certain embodiments, data replication includes processes by which storage data (e.g., data stored on a data storage entity) is duplicated to a remote or local system, to help provide an enhanced level of redundancy in case a main or primary storage backup system fails. In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects.

In certain embodiments, a data service may be a service for receiving, processing, storing, and protecting data. In certain embodiments, data services provide the high-level data and storage management capabilities of the system.

In certain embodiments, single tenant refers to a single instance of the software and supporting infrastructure serve a single customer. With single tenancy, each customer has his or her own independent database and instance of the software. In certain embodiments, multi-tenant refers to a condition where a single instance of software and its supporting infrastructure serves multiple customers. Each customer shares the software application and also shares a single database. Each tenant's data is isolated and remains invisible to other tenants. In certain embodiments, a tenant represents an organization operating within a data storage system. Tenants also can be created in a system for purposes of security isolation.

In certain embodiments, a storage stack refers to a software defined storage (SDS) stack, where SDS is a storage architecture that uses a layer of software to provision, orchestrate and manage physical data storage capacity on industry-standard servers. In certain embodiments, SDS products can be hyper-converged systems engineered and supported as a single product leveraging servers such as Dell EMC PowerEdge servers, but this is not limiting. SDI/SDS can enable automation of infrastructure configuration, which can allow solutions to be deployed more quickly and alighted more quickly to real-time application requirements.

In certain embodiments, physical disks are disks available for data services consumption. Physical disks can be locally attached to other devices (e.g., a storage stack), but this is not required for all types of physical disks, as will be appreciated by one of skill in the art.

In certain embodiments, cloud computing is characterized by five features or qualities: (1) on-demand self-service; (2) broad network access; (3) resource pooling; rapid elasticity or expansion; and (5) measured service. In certain embodiments, a cloud computing architectures includes front-end and back end components. Cloud computing platforms, called clients or cloud clients, can include servers, thick or thin clients, zero (ultra-thin) clients, tablets and mobile devices. These client platforms interact with the cloud data storage via an application (middleware), via a web browser, or through a virtual session. For example, the front end in a cloud architecture is the visible interface that computer users or clients encounter through their web-enabled client devices. A back-end platform for cloud computing architecture can include single tenant physical servers (also called "bare metal" servers), data storage facilities, virtual machines, a security mechanism, and services, all built in conformance with a deployment model, and all together responsible for providing a service.

In certain embodiments, software as a service (SaaS) is a type of cloud computing that provides a software distribution model in which a third-party provider hosts applications and makes them available to customers over a network such as the Internet. Other types of cloud computing can include infrastructure as a service (IaaS) and platform as a service (PaaS).

In certain embodiments, a cloud native ecosystem is a cloud system that is highly distributed, elastic and composable with the container as the modular compute abstraction.

Kubernetes is an open source container management platform providing portable, extensible open-source platform for managing containerized workloads and services, that facilitates both declarative configuration and automation. Kubernetes can be viewed at least as a container platform, a microservices platform, and a portable cloud platform. Kubernetes typically can run containers, such as Docker containers. As of this writing, Kubernetes is an open source project managed by the Cloud Native Computing Foundation (CNCF) of San Francisco, Calif.

Pivotal Cloud Foundry is a cloud-agnostic Paas solution, and provides an open source, multi-cloud application platform as a service. As of this writing, Pivotal Cloud Foundry is managed by the Cloud Foundry Foundation of San Francisco, Calif.

In certain embodiments, stack data services are a set of data services consume the storage. In certain embodiments, some data services currently can't co-exist with others on the same compute.

In certain embodiments, stack client services are set of services that serve storage facets to applications or other software-defined storage stacks.

In certain embodiments public cloud services are a set of public offerings used to offload cold data or to provide additional archiving capacity.

In certain embodiments, a software defined infrastructure (SDI) Brain provides a unified management of software-defined storage core components.

In certain embodiments, an orchestration describes automated arrangement, coordination, and management of complex computer systems, and services. Orchestration can involve "stitching" of software and hardware components together to deliver a defined service or connecting and automating of workflows when applicable to deliver a defined service. In the area of cloud computing, an orchestration can include a workflow and is configured to provide directed action towards a goal or objective. For example, in certain embodiments herein, an orchestration is run to meet an objective such as wanting to "deploy specific SDS services to a specific server or range of servers," where accomplishing that orchestration is done by running several workflows (e.g., task sequences or sets of instructions) that each perform certain automated processes or workflows, to achieve the overall deployment of specific SDS services goal (e.g., workflows such as a workflow or list of tasks to deploy a storage stack, workflow or list of tasks to register a host, workflow or list of tasks to deploy a stack client as a service, etc.). In contrast, in certain embodiments, a workflow generally is processed and completed as a process within a single domain for automation purposes.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment may include a plurality of "optional" features unless such features conflict.

In addition, in the implementations that follow, it should be understood that, although many specific embodiments use particular brands and names of products (e.g., Dell EMC products, Ansible, Microsoft and Amazon cloud services, etc.,) none of the embodiments described herein are intended to be limited to using products from any vendor. At least some embodiments are intended to be fully hardware agnostic. In certain embodiments, however, extra features (e.g., more things that can be automatically provisioned, more actions, etc.) may be available if certain vendor products are used where there is special knowledge of how to take advantages and characteristics of the vendor's product. For example, in one embodiment, if Dell EMC PowerEdge servers are used in combination with data services and client services also from Dell EMC, then SLO based provisioning (Dell EMC's brand of provisioning by or based on service level) may be provided, as compared to other types of provisioning. One of skill in the art will appreciate various advantages that can be achieved based on knowledge of particular hardware characteristics, versus having to provision based on "commodity" hardware, where special advantages, features and characteristics may not be known. In addition, it should be understood that the embodiments described herein are intended to work within any customer ecosystem, not just the depicted Dell EMC ecosystems.

IT departments have increasing requirements to accommodate storage requests that meet new requirements that are not easily met with traditional purpose-built appliances. The emergence of edge and near-edge workloads along with strict IT budgets precipitates into the need for flexible software-defined storage solutions. These solutions allow the customer to build their own hardware infrastructure based on their requirements using servers from the lowest bidder.

Despite these and other significant advances, substantial obstacles remain in certain information processing contexts. For example, it can be unduly difficult to implement data analytics functionality under current practice. It also can be difficult to install, configure, and deploy software defined storage assets from multiple providers, or multiple different types of software defined storage (SDS). Thus, companies that sell data storage systems, information processing systems, and the like are very concerned with providing customers with an efficient data storage solution that minimizes cost while meeting customer data storage needs. It would be beneficial for such companies to have a way for reducing the complexity of implementing data storage.

One barrier to data storage optimization is the difficulty in integrating together the storage being used (e.g., various software defined storage stacks), especially so that the integrated systems and work together automatically. Customers often request that SDS have a unified or standardized interface. One reason achieving this goal is difficult is because there often is a lack of standardized user interfaces with the various stacks. For example, sometimes each software-defined storage stack has its own deployment process and installation footprint. This leads to improper and inconsistent resource utilization. In addition, each software-defined storage stack often has its own management interface, although many SDS stacks may manage resources in similar ways. Further, each software-defined storage stack may expose its consumable resources its own way. Some stacks may not be industry-standard or consistent with other stacks. As a result, existing software defined storage stacks can require customized user and/or component interfaces, which is labor and time intensive—and thus can be costly. In addition, it means that a given system is not agile enough to adapt and respond to changing customer needs and new or updated hardware/business requirements.

Another issue is diversity of Storage Types. An IT administrator wants to be able to fulfill requests of many different storage types: block, file shares, object, and streams, amongst others. Each type of storage is unique in its protocol, access patterns, and performance and usage characteristics. As such each storage type demands specific resources and configuration to boot-strap. This diversity forces heavy installation engagements and increased overall cost for the customer.

Also, there is a need for an IT administrator needs to be able to use a minimal set of hardware to provide maximum capability. Because different storage types need exclusive access to hardware resources, balancing the resources effectively to maximize capacity across all storage types with minimal resources is a real challenge. Combined Usage also is a factor. Single computer servers may contain more hardware than is needed for a single storage type. Therefore, combining storage types on a single computer server allows the IT administrator further flexibility. This requires segregation of compute resources via a proxy that understands the reservation strategies/policies of the storage types.

Customers use storage stacks and other storage resources in an appliance-based fashion, where the purchased hardware often is pre-configured in the factory, to ensure customers can be up and running quickly after delivery. In typical situations, a customer purchases its own hardware, sticks in data racks/stacks in its data center, and utilizes a control plane or other software, to request that the purchased systems be deployed with software defined storage, so that applications can run either on those servers or adjacent to those servers on other computers. An issue with this arrangement is that each individual storage device has its own way of installing and storing, with various wizards or scripts to help the user, but the interfaces all being different can be difficult and inconvenient for customers, especially when the installation, configuration, and deployment experiences are different for each new device in a system.

Another issue that can affect storage system configuration and deployment is leftover and/or unused capacity. In many systems, each storage stack (for example, products from Dell EMC of Hopkinton, Mass., such as EMC ECS, VxFlex OS, SDNAS, Nautilus, and products such as Dell EMC's Cloud Tiering Appliance and/or Cloud Array, as well as products configured to provide an ability to move data mobility into arrays, instead of having it in a separate server or appliance) is manually installed (using an install script/wizard or form) and configured using a command line interface (CLI) or user interface (UI) for each respective product using prescribed worksheets. This practice can lead to leading to stranded or unused storage and/or compute capacity.

One solution that has been tried in the industry to improve the simplicity of installing and configuring hardware is the CEPH storage product from Red Hat Software of Raleigh, N.C. CEPH provides a single defined open stack SDS platform, which can help for some smaller installations. However, customers are still seeking an enterprise-level solution providing at least the features of CEPH as well as additional features and advantages.

In certain embodiments described herein, the experience of installing, configuring, and deploying new hardware and software defined storage is improved and unified for both in a data center and on the cloud. In certain embodiments, a configuration is provided that include a software suite that can provide uniform storage management across all software-defined storage assets, understand what's required to deploy and wire together in order to serve a storage request, and spin-up or down software-defined storage stacks as a result of predictive analytics, policy, and usage at the IT administrator's request.

In certain embodiment, customers can lower operating expenses, as well, if customers can access a single management pane around the SDS that are available, to have an easy-to-deploy-and-manage offering that slides into a modern cloud-native ecosystem (e.g., Pivotal Cloud Foundry—Pivotal Container Service based on Kubernetes (PCF-PKS)), avoiding the need for costly hardware appliances or "resource-hogging" virtual applications ("vApps"). PCV-PKS is a system that enables deployment, and consumption of container services with "production grade" Kubernetes. Kubernetes, as noted previously, provides an open source container orchestration system for automating deployment, scaling, and management of containerized applications across clusters of hosts.

Certain embodiments described herein are able to at least partially meet this need. In certain embodiments described herein, a mechanism is identified by which multiple storage types (block, file, object, and stream) can be installed, configured, consumed, and managed by a single management and orchestration plane that understands the requirements of each storage type and applies policies to hardware inventory to roll-out enterprise-grade software-defined storage to commodity assets.

In certain embodiments, an arrangement is provided that is configured for:

Giving an IT administrator a mechanism to identify the servers they wish to use for software-defined storage consumption;

Allowing an IT administrator to deploy from a variety of storage types and even profiles within each storage;

Automating the installation of the software defined storage stack components such as storage server software (server drivers), data path software (client drivers), and management software for each storage type Automating the configuration of the software defined storage stack components to reduce the touch-points necessary from the IT administrator.

Exposing consumption interfaces (APIs, SDKs, or industry-standard enabler plug-ins) to the IT administrator, or other appropriate entities, to accelerate consumption of the storage Monitoring the storage for alerts and other actionable information Automating the management of storage stacks to facilitate expansion, contraction, or maintenance operations In at least some embodiments, the arrangements described herein provide at least these advantageous features:

A unified mechanism/platform for software defined storage assets.

Automated/unattended installation and deployment of storage stacks based on policy vs. available inventory.

A hyper-converged storage stack ecosystem (multiple stacks on a single server).

It is anticipated that the embodiments described herein are usable with at least the following technologies:

Dell EMC Elastic Cloud Storage (ECS); Dell EMC VXFLEX OS; Software Defined Network Attached Storage (SDNAS); Dell EMC NAUTILUS (a proprietary software-defined solution for storing and analyzing high volumes of streaming Internet of Things (IoT) data in real time); Glider, and storage stacks that correspond to specific storage features, protocols, or "storage types" (block, file, object, stream)

Ansible: A general-purpose IT orchestration tool that can easily be embedded to facilitate orchestrating the installation, configuration, and management of the above storage stacks; Ansible is an open source automation platform capable of helping with configuration management, application deployment, task automation. And IT orchestration (e.g., where it is required to run tasks in sequence and create a chain of events which must happen on several different servers or devices).

Installation utilities, such as Dell EMC installation utilities.

There are known ways to install and configure various types of storage stacks (including but not limited to the aforementioned Dell EMC Elastic Cloud Storage (ECS); Dell EMC VXFLEX OS, SDNAS and Dell EMC NAUTILUS). For example, in some instances, each storage stack is manually installed (using an install script/wizard or form) and configured using a command line interface (CLI) or user interface (UI) for each respective product. Each product's experience is different and far from unified. The differing experience also means that users are not able to attempt to manually "share" a server between storage stacks.

In certain embodiments, as described herein, these problems are at least partially addressed via a single method of automating installation, configure, and deployment of all types of storage stacks via a unified interface. Certain embodiments herein are able to describe and protect the ability for software, in a consolidated fashion, to be able to control, manage, deploy, solve, and configure, across the board, many different types of software defined storage (SDS) assets. Certain embodiments described herein are configured to control, manage, deploy, and configure, DELL EMC software defined storage (SDS) assets, including but not limited to DELL EMC SCALE IO, DELL EMC VCX OS, storage connected via Container Storage Interface (CSI is a Kubernetes-based open-source dynamic container storage provisioning environment to which developers can issue persistent volume claims for a specific class of service, with these then presented to Kubernetes), appliance-based CSI storage such as Dell EMC PowerMax and Unity, software defined ECS or object stores, ECS flex, DELL EMC ISILON FLEX and ISILON SOFTWARE DEFINED (where DELL EMC ISILON is a type of scale-out network-attached storage systems, designed for demanding enterprise file workloads), and virtually any type of data system or information system relating to data protection, including but not limited to products like DELL EMC DATA DOMAIN VIRTUAL EDITION. Reference herein to specific products from DELL EMC is intended to be exemplary and not limiting. Those of routine skill in the art will appreciate the applicability of the embodiments described herein to storage assets, etc., from many different suppliers.

Furthermore, certain embodiments described herein have applicability in a variety of use categories, including but not limited to server factory installation, server management installation, server management, service deployment management, service "care and feeding," and service usage.

With server factory installation, in one example embodiment, servers from a provider, such as DELL EMC PowerEdge servers, may arrive pre-installed with a base operating system (OS) and requisite software to accelerate participation in the software defined storage suite (SDSS) ecosystem. With a server management installation, embodiments described herein permit deployment of an SDSS ecosystem in a customer's cloud-native infrastructure. With a server management use, certain embodiments described herein are able to provide a complete management capability, including quickly identifying servers for usage by the suite (SDSS), adding a server or range of servers for use by the SDSS, removing, replacing, or upgrading servers, non-disruptively, for use by the SDSS, and monitoring server's health. In addition, it should be understood that, in this disclosure, the terms Software Defined Storage System (SDSS), Software Defined Interface (SDI) Brain, and VIKI, are all used interchangeably.

For service deployment management, certain embodiments described herein deploy specific software-defined storage services to a specific server or range of servers, configure the initial characteristics or constraints each service is allowed to consume, and/or remove or move software-defined services from a server. For service "care and feeding," certain embodiments described herein monitor the health and capacity of software-defined services on a server or group of servers, inform users or other entities of failures or potential failures to the services using the user's existing reporting and monitoring systems, predict service shortages, and provide (semi-)automated remediation or expansion of required data services to stay within SLAs. For service usage, certain embodiments described herein create, expand, and remove volumes, shares, buckets, streams, or protection using industry-standard specifications.

Figure 1:
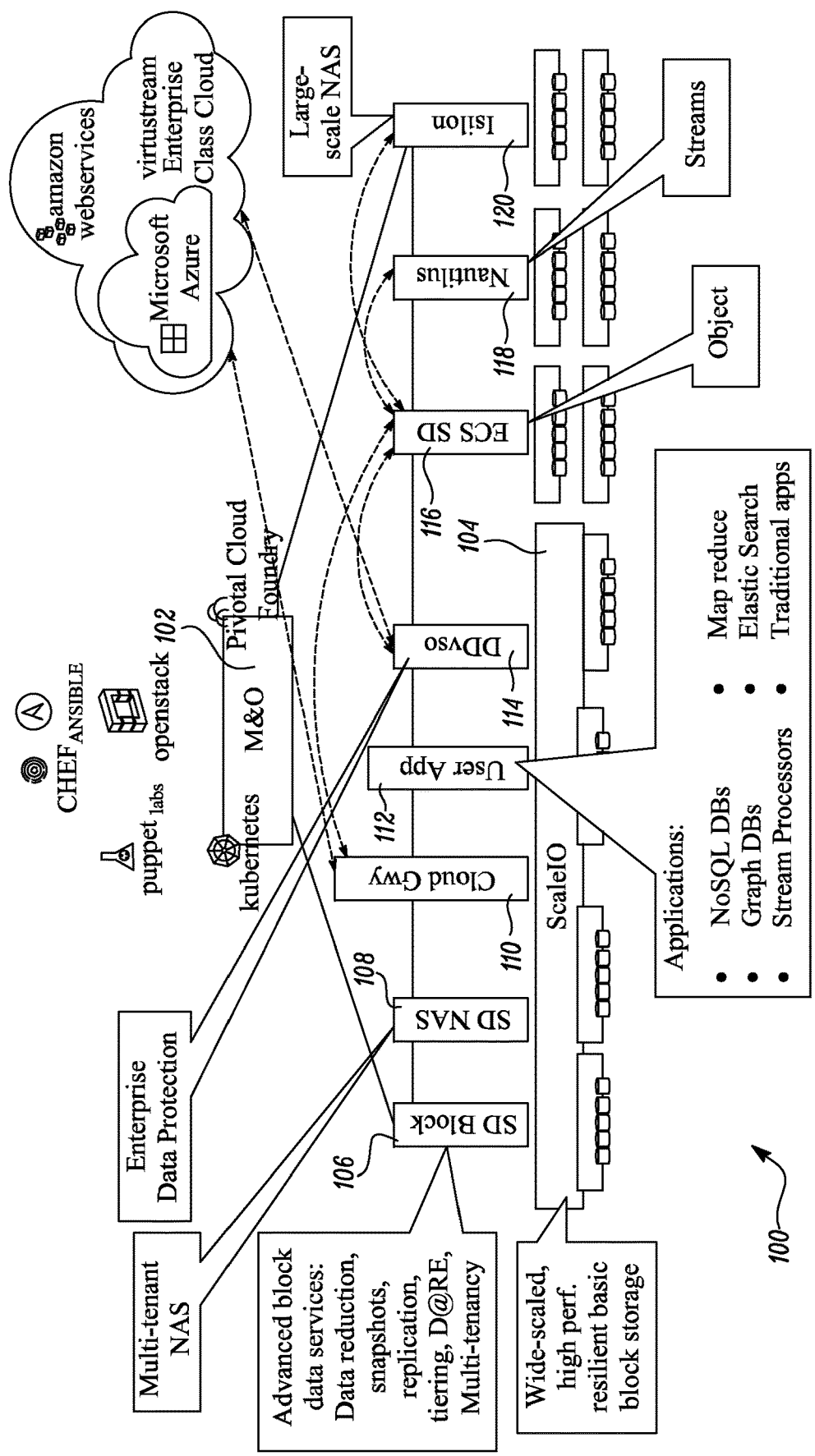
FIG. 1 is an illustrative functional diagram of a management and operation (M&O) plane that encapsulates, at a high level, an exemplary software-defined storage platform, in accordance with at least one illustrative embodiment of the disclosure.

In certain embodiments, configurations are provided that advantageously provide one or more of the following features:

Deploy multiple services on a shared infrastructure
Provide services to many tenants.
Elastically scale platform and services
Flexibly shift capacity between services
Provide operational consistency across services
Provide visibility to operators and account users FIG. 1 is an illustrative functional diagram 100 of a management and orchestration (M&O) plane 102 (also referred to herein as a layer) that encapsulates, at a high level, exemplary software-defined storage platform, in accordance with at least one illustrative embodiment of the disclosure. FIG. 1 depicts a management plane 102 that runs in the customer's existing cloud-native ecosystem that installs, configures, and manages the various storage stacks 106-120 (discussed further below). In the exemplary diagram 100 of FIG. 1, the M&O (which in certain embodiments also is referred to as a controller or "brain" for the system) is shown as part of a cloud computing ecosystem (e.g., by being part of Kubernetes or PCF, as shown in FIG. 1). The M&O plane 102 is in operable communication with a plurality of potential software defined storage stacks that can be used in connection with the cloud computing ecosystem. In the example of FIG. 1, these storage stacks include a software defined (SD) block 106, a software defined network attached storage (SDNAS) block 108, a cloud gateway 110, a user App 112, a DELL EMC DATA DOMAIN virtual edition 114, DELL EMC elastic cloud storage (ECS) 116, DELL EMC NAUTILUS 118, and DELL EMC ISILON 120.

In FIG. 1, the SD Block 106, SDNAS 108, Cloud Gateway 110, User App 112, and DDve 114 are all in operable communication with DELL EMC VxFlex OS 104. It should be noted that the "OS" in "VxFlex OS is part of the product name of this exemplary product, which was formerly known as Dell EMC ScaleIO; the "OS" does not stand for "operating system"). The VxFlex OS 104 provides wide-scaled, high performance resilient basic storage. VxFlex OS is a software-defined storage product that creates a server-based storage area network (SAN) from local application server storage using existing customer hardware or EMC servers. VxFlex OS, in certain aspects, converts direct-attached storage into shared block storage. VxFlex OS, in certain embodiments, converges computing resources and commodity storage into a single-layer architecture. VxFlex OS can be deployed as storage only or as a converged infrastructure combining storage, computational and networking resources into a single block. Capacity and performance of all available resources are aggregated and made available to every participating VxFlex OS server and application. Storage tiers can be created with media types and drive types that match the ideal performance or capacity characteristics to best suit the application needs.

The SD block 106 provides advanced block data services, Data reduction, snapshots, replication, tiering, D@RE (Dell EMC Unity Data at Rest Encryption (D@RE), and Multi-tenancy. The SDNAS block 108 provides multi-tenant NAS. The Cloud Gateway 110 is a connection to outside cloud services 109 like Amazon Web Services, Microsoft Azure, and Web Stream (these are illustrative and not limiting). The User App 112 represents a plurality of user applications usable in this arrangement, including but not limited to NoSQL DBs, Graph DBs, Stream Processors, Map reduce, Elastic Search, and Traditional apps. The DDve 114, as noted above, provides a link to enterprise data protection and also can be used with the cloud services 109. Amazon cloud services. In certain embodiments, the ECS SD 116 is used with objects, Nautilus 118 is used for storage of streams, and Isilon 120 is used with large scale NAS. In certain embodiments, software defined (SD) NAS, a type of high performance NAS is another usable data service.

Figure 2:
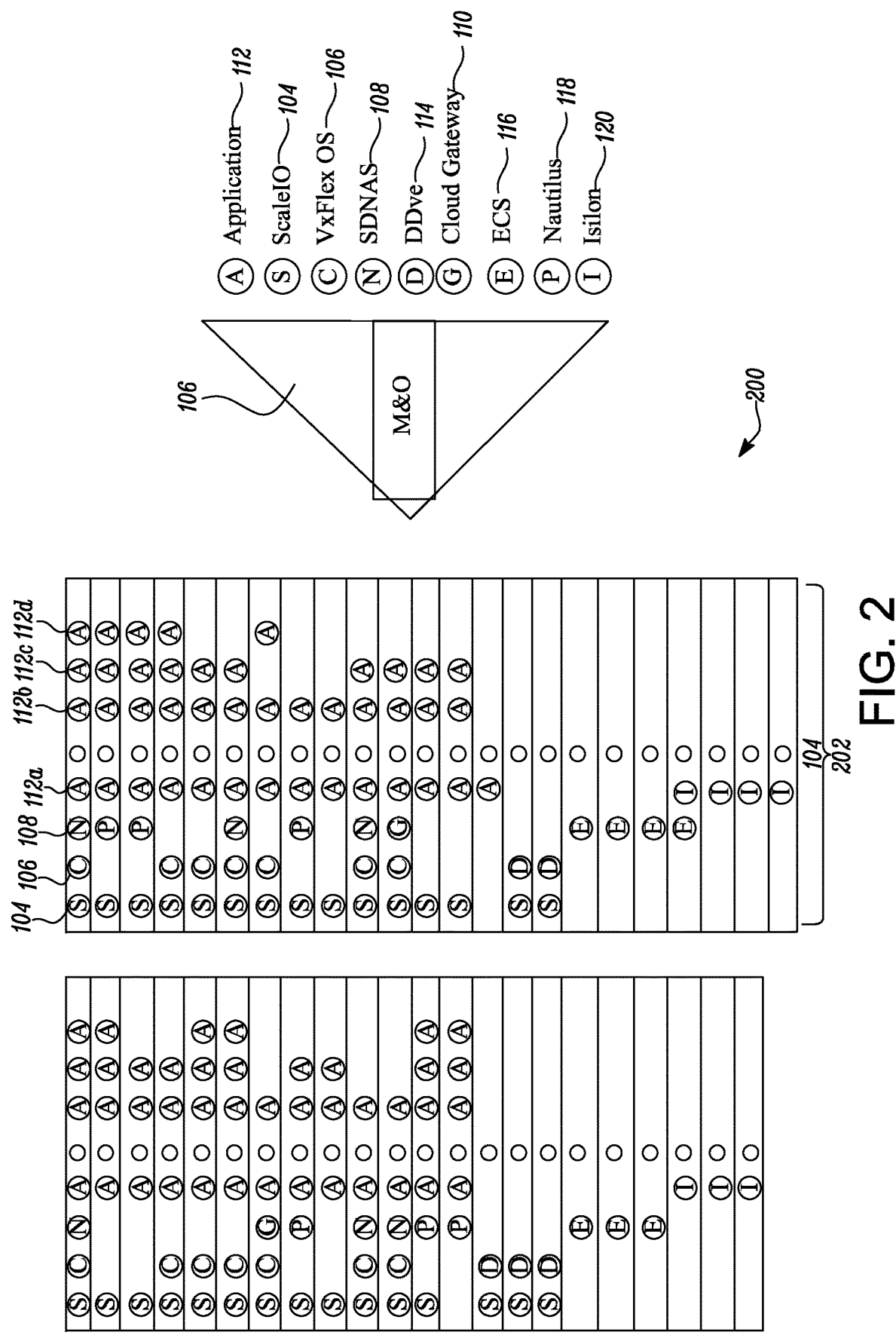
FIG. 2 is an illustrative diagram showing how a plurality of data services exist together on servers in an exemplary system, including applications that customers run, in accordance with one illustrative embodiment of the disclosure.

In at least one embodiment, the system 100 of FIG. 1 can be implemented using a DELL EMC POWEREDGE Blade server and services that can include containerized software of either an M&O 102 of the software defined storage stack (SDSSO (i.e., the storage stacks of FIG. 1) or storage stack data path services. It should be understood, however, that the embodiments herein are not limited to PowerEdge servers for any aspect, including but not limited to the M&O 102 or the storage stack deployments themselves; advantageously, in certain embodiments, the M&O 102 is hardware agnostic FIG. 2 is an illustrative diagram 200 showing how a plurality of data services (e.g., an application 112, VxFlex OS 104, SD Block 106, SDNAS 108, DDve 114, Cloud Gateway 116, ECS, Nautilus, Isilon) co-exist together on servers 202 exist in an exemplary system, including applications that customers run, in accordance with one illustrative embodiment. For example, the rightmost server, top rack includes seven data services, including four applications 112 (denoted by the letter "A"), a VxFlex OS 104 (denoted by the letter "S"), an SD Block 106 (denoted by the letter "C"), and an SDNAS 108 (denoted by the letter "N"). One of skill in the art will appreciate that the other racks in the servers can be similarly interpreted using the letter codes in the figure. Advantageously, as described further herein, the M&O control plane 102 will provide a unified management interface to configure, deploy, provision, manage, etc., across all of these storage defined assets. The M&O plane handles management, orchestration, deployment, configuration, and registration.

Figure 3:
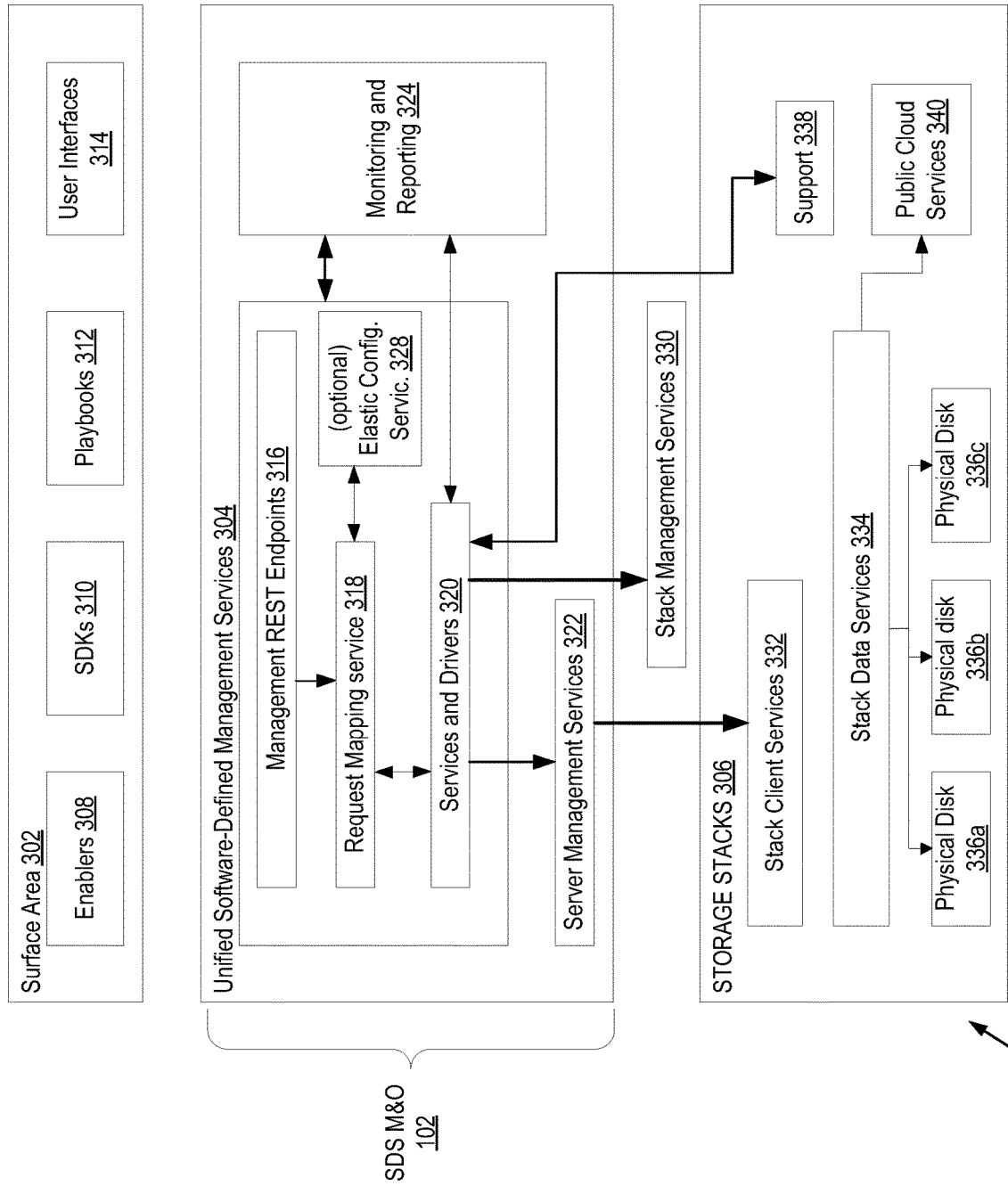
FIG. 3 is a simplified diagram of an architecture implementing a software defined storage suite, in accordance with one illustrative embodiment of the disclosure
Figure 4:
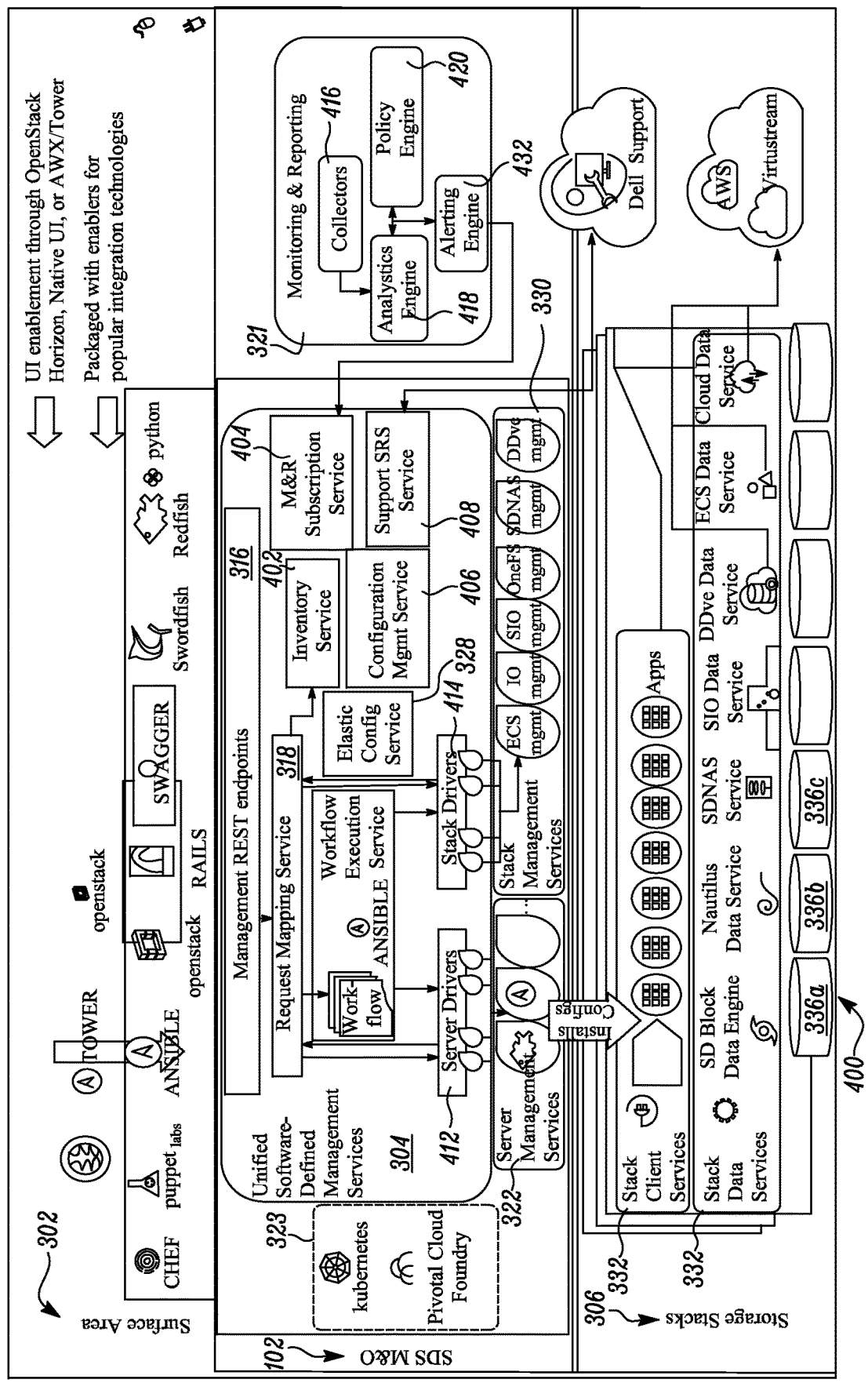
FIG. 4 is a more detailed diagram of the architecture shown in FIG. 3, in accordance with one illustrative embodiment.

FIG. 3 is a simplified diagram of an architecture 300 implementing a software defined storage suite, in accordance with one illustrative embodiment. FIG. 4 is a more detailed diagram 400 of the architecture shown in FIG. 3, in accordance with one illustrative embodiment. FIG. 3 and FIG. 4 depict the same architecture, but in different levels of detail. FIG. 4 also depicts in detail, in the section stack data services 324 (described further below) a plurality of different types of stacks, e.g., DELL EMC Nautilus, SDNAS, DELL EMC VxFlex OS (also referred to herein as SIO), etc., as well as cloud data services, and as one of skill in the art will appreciate, there could also be other types of storage stacks from different vendors. As one of skill in the art will appreciate, each type of stack (including the cloud data interfaces) may have its own proprietary management interface and management software running "underneath" that proprietary management interface. For users (which can include not just IT personnel but also non-human entities such as controllers, processors, computing systems, applications) who want to control, manage, deploy, provision, configure, etc., any of these stack resources, doing so can be complicated, time consuming, and costly. Each product can have its own unique requirements to accomplish these tasks, with its own wizards or scripts, adding to the burden for users/clients who have to have to learn and use different installation and configuration techniques for each system. One way at least some of the embodiments described herein help to address this issue is by providing ways to unify and automate the experience of controlling, managing, deploying, provisioning, and configuring storage assets (especially software-defined storage assets) like the stack data services. In accordance with at least some embodiments that are described further herein, systems, methods, and devices are provided to provide an architecture with as control plane configured to unify the experience for the user. This is described further herein.

Referring to FIGS. 3 and 4, the architectures 300 of FIG. 3 and 400 of FIG. 4 each include a software defined storage (SDS) management and orchestration (M&O) plane 102 (also referred to herein as a layer 102), as noted above, that interacts with a surface area 302 and a plurality of storage stacks 306. Note, as well, that that M&O control plane 102 of FIG. 300 shows explicitly that the element called "stack management services 302" (discussed further below) is outside of the M&O control plane 102; this configuration is likewise applicable also in FIG. 4, but the level of detail shown in FIG. 4 does not make this as easy to see.

In the exemplary architecture of FIGS. 3 and 4, considering these architectures starting from the bottom to the top, the storage stacks 306 include stack client services 332, stack data services 334, a plurality of physical disks 336a-336c, support 338, and one or more public cloud services 340. Generally, the storage Stacks 306, in certain embodiments, are implemented using existing software-defined storage stacks. The physical disks 336 include a set of (usually locally-attached) physical disks that are available for data services consumption.

The stack data services 334 provide a set of data services to consume the storage. As one of skill in the art will appreciate, some data services currently can't co-exist with others on the same compute, and in certain embodiments, these data services are not required to co-exist on the same compute. Stack client services 322 provides a set of services that serve storage facets to applications or other software-defined storage stacks (layering/dependencies on each other are not shown in FIG. 3 or 4).

In certain embodiments, the public cloud services 340 includes, but is not limited to, a set of public offerings used to offload cold data or to provide additional archiving capacity; in certain embodiments, it is possible to move an entire workload of data into the public cloud services 340 or another data center. As shown in FIG. 4, these can include, in an exemplary embodiment, public cloud services 340 (including but not limited to Amazon Web Services (AWS), Virtustream, and Microsoft Azure, are usable as public cloud services 340). The support 338 can include any kind of support usable for the M&O plane 102. In certain embodiments, the support 228 is DELL EMC support, such as Secure Remote Services (SRS) call-home support for M&O. In certain embodiments, services such as SRS maintain an inventor of customer assets; thus, in certain embodiments, the Dell Support 338 also may be leveraged to populate the inventory service 402 in the M&O layer 102, by helping to verify which storage stacks are "healthy" or at least free from issues that interfere with desired performance. This can be more convenient for users because it can remove need to manually provide input information.

The stack management services 330 are services that perform management (control path) of the storage stacks already exist. Advantageously, the stack management services 330 can be elevated to the cloud-native cluster, if not already enabled to do so. In certain embodiments, the stack management services 330 are configured to be "pluggable," meaning that their advanced features and changing functionality can be driven by the plug-in and reflected automatically in the M&O layer without additional adaptation by the unified services. As shown in FIG. 4, the stack management services 330 include a plurality of management services (e.g., those named "ECS mgmt.", "SD Block mgmt", "DDve mgmt.", etc.) that correspond/match to the particular stack data services 334

The M&O plane 102 also is referred to herein as the software defined interface (SDI) "brain" and provides, in certain embodiments, a unified management of software-defined storage core components. As shown in FIG. 4, in certain embodiments the M&O plane 102 includes a cloud native ecosystem 323, such as Kubernetes/Pivotal Cloud Foundry, which provide exceptional scale-out, configuration, management capability. In certain embodiments, it is assumed that a user/customer using the architecture of FIG. 3 and/or FIG. 4, already has a cloud-native ecosystem in its private cloud. In certain embodiments, the server management services 322 are a set of open-source tools used to perform installation, deployment, and configuration of the software-defined storage stacks 306.

The unified software-defined management service 304 are a set of services that understand the servers and services under management and allow the user to create and store any policy around deployments. The unified software defined management services 304 also store and apply configuration templates to storage stacks to best practice configurations, given the hardware deployed.

The monitoring & reporting (M&R) component 321 is an external M&R offering that is integrated to the unified software-defined management services to provide dashboard notification of server or service faults, as well to enable the platform to perform elastic expansion of specific stacks contingent on policy and alerts from M&R (this is discussed further herein). In certain embodiments, a product configured to allow a user to monitor, analyze, and troubleshoot a given storage environment from any perspective, such as DELL EMC CLOUDIQ, is usable, in certain embodiments, to implement this aspect of the embodiment.

The management REST (representational state transfer) endpoints 316 are exposed through REST endpoints. In certain embodiments, the management REST endpoints 316 require industry-standard specification compliance. In certain embodiments, the surface area layer 302 provides the desired touchpoints exclusively.

The Surface area plane or layer 302 includes enablers 308, software developer kits (SDKs) 310, playbooks 312, and user interfaces 314. The surface area 302 depicts how the SDI Brain 323 capabilities are exposed to the consumer. It should be understood that, in this disclosure, the terms Software Defined Storage System (SDSS), Software Defined Interface (SDI) Brain, and VIKI, are all used interchangeably. In certain embodiments, it is advantageous if the surface area 302 includes "pre-packaged" industry standard SDKs and enablers.

The user interfaces (UI) 314 can be implemented in various ways in various embodiments. In one embodiment, the UI 314 is a native UI communicating directly through the SDI Brain Management REST Endpoints 316 (in which case there would a portal service added to the SDI Brain's Unified Software-Defined Management Services 304). In one embodiment, the UI 3114 is a web-based graphical interface that cloud administrators and users can access to manage compute, storage and networking services, such as the OpenStack Horizon-based UI (which, in certain embodiments, with go with the existence of an OpenStack core plug-in plus a Horizon plug-in, elsewhere in the system 400).

Figure 5:
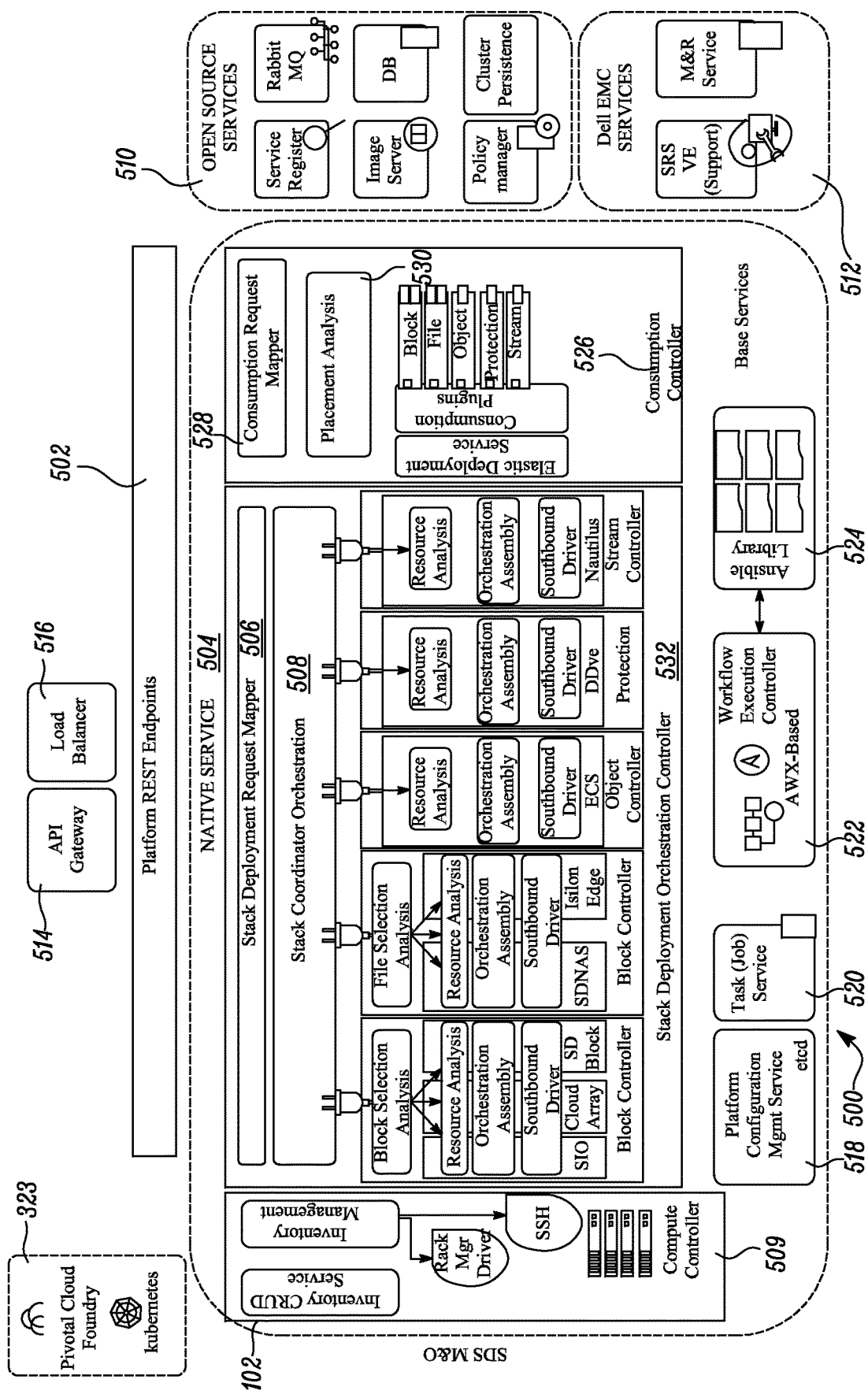
FIG. 5 is a diagram showing controller services for the architecture shown in the detailed diagram of FIG. 4, in accordance with one illustrative embodiment of the disclosure.

The management REST endpoints 316 of FIGS. 3 and 4 include, in certain embodiments, a set of platform REST endpoints, which are discussed further below in connection with FIGS. 5, 7, and 8. FIG. 5 is a diagram 500 showing controller services for the architecture shown in the detailed diagram of FIG. 4, in accordance with one illustrative embodiment of the disclosure.

FIG. 5 includes platform REST endpoints 502, native services 504, a stack deployment request mapper 605, a stack coordinator orchestration component 508, a compute controller 509, open source services 510, DELL EMC services 512 (which are not unlike the support 328 of FIGS. 3 and 4), an API Gateway 514, a load balancer 516, a platform configuration management service 518, a task service 520, a workflow execution controller 522, an Ansible library 524, a consumption controller 526, a consumption request mapper 528, placement analysis 530, and a stack deployment orchestration controller 532. These are described further below.

VIKI platform services, in FIG. 5, run in a customer's existing cloud native environment, such as the Kubernetes cloud environment 323. It should be understood that, in this disclosure, the terms Software Defined Storage System (SDSS), Software Defined Interface (SDI) Brain, and VIKI, are all used interchangeably. VIKI is deployed to many nodes for high availability and service orchestration is achieved through Helm charts, which can be used to simplify packaging and deploying common applications on Kubernetes. Requests to the platform are serviced by multiple services running independently. The API gateway 514 multiplexes the incoming uniform resource locator (URL) to the service that can service that request in the platform. In certain embodiments, several of the same service may exist within the cloud native ecosystem 323. A load balancer 516, such as NGINX, spreads the request load across the request loads services (relatively) evenly.

The native services 504, in certain embodiments, are all services implemented by VIKI platform, with the exception of AWX.

The compute controller 509 exposes REST interfaces that add servers to the inventory. This inventory is used to deploy and install software-defined storage stacks.

The stack deployment orchestration controller 532 exposes REST interfaces that deploy storage stacks on servers, as well as configuring and boot-strapping the stacks based on user input or best practice templates stored in the policy manager. The consumption controller 526 exposes REST interfaces that allow the consumer to consume storage for each respective storage stack type. In the simplest form, it is a pass-thru to the underlying stack. In complicated flows, it dynamically drives an elastic expansion or deployment of storage stacks to satisfy the request.

Open source services 510 are leveraged to reduce infrastructure development costs. They are used by many services in the native services 504. Dell EMC services 512 are services utilized to help facilitate cross-functional behavior, such as M&R and Support/Call-home. The platform configuration management services 518, also referred to herein as base services in VIKI, are independent to or shared by the controllers, e.g., compute controller 509, stack deployment orchestration controller 532, and consumption controller 526 in FIG. 5.

In certain embodiments, the controller services in FIG. 5 are VIKI controller services. The platform REST endpoints 502 at the top of FIG. 5 include everything having anything to do with a request to install, configure or register an SDS asset or other storage, all the way through to consumption requests—everything the management system has to offer. And then, below the platform REST endpoints 502 in FIG. 5, other endpoints within the native services 504 block can be split into deployment REST endpoints and also consumption REST endpoints. In certain embodiments, consumption requests come in through the native services 504, like deployment requests, and then they get routed to the consumption request manager 528.

Figure 6:
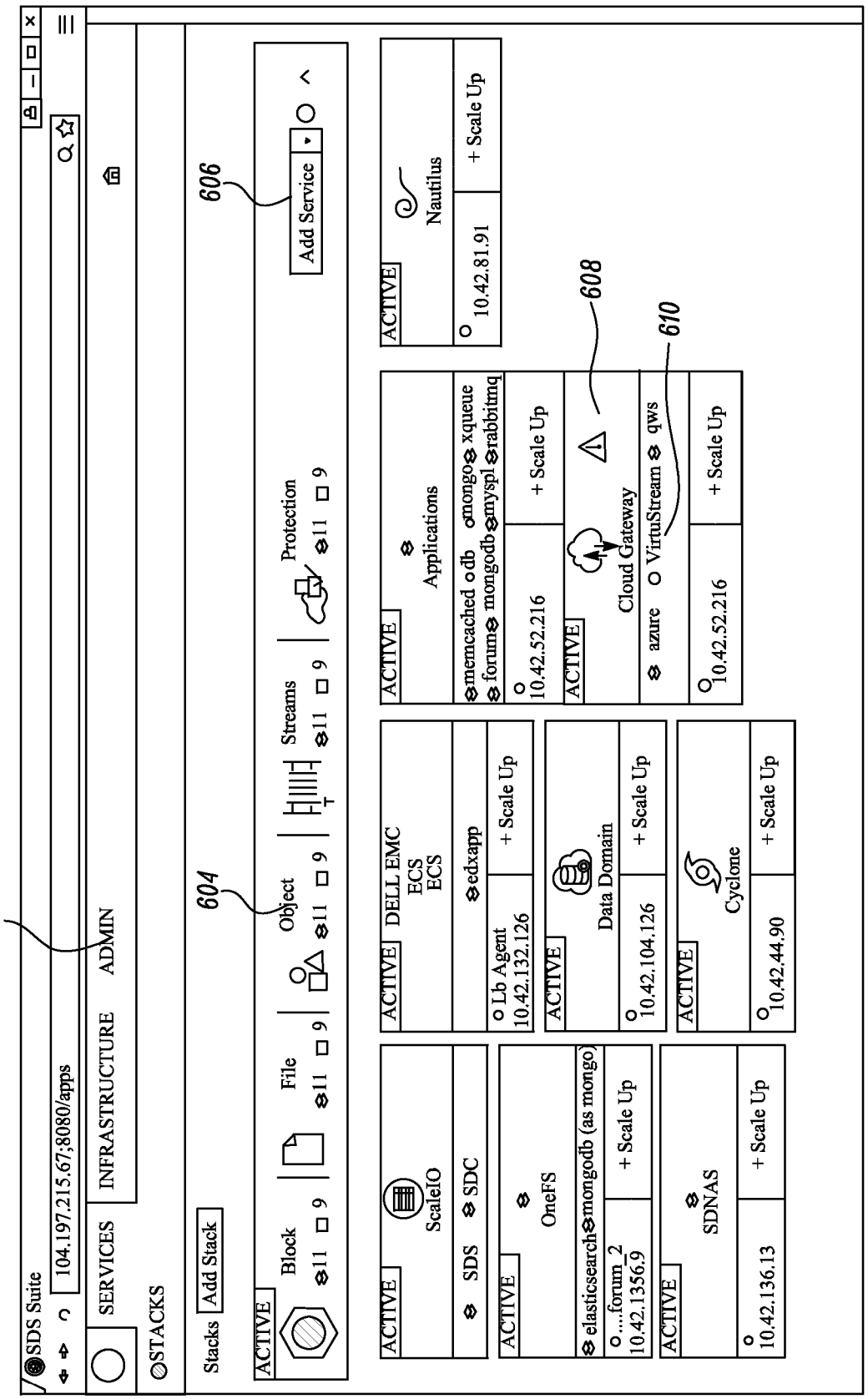
FIG. 6 is an illustrative user interface configured to work with the various architectures described herein, in accordance with at least one disclosed embodiment.

FIG. 6 is an illustrative user interface 600 configured to work with the architecture of FIGS. 3-8 and, in accordance with at least one disclosed embodiment. This user interface (UI) 600, in certain embodiments, is implemented as a browser extension, but that is not limiting. The admin field 602 in the exemplary UI 600, enables the UI 600 to act as the central management interface to the software defined storage infrastructure (SDSI) of FIGS. 3-8. Via the "object"

button 604 on the UI 600, the UI 600 provides a user with a way to ask for a roll-up of active software defined data services in logical groupings. Via the "add Service" button 606 in the UI 600, a user is able to select, for example "add service," and the UI 600 understands how to deploy and configure storage stacks (this is discussed more extensively herein). Via the "cloud gateway" button 608, the UI 600 allows a user to leverage predictive analytics and events from M &R to elastically expand services to new nodes (this is discussed in greater detail herein). Via the "virtual stream" button 610, the UI 600 simplifies deployment and configuration for a user, because the system understands storage stack dependencies and how to orchestrate deployment and configuration.

Figure 7:
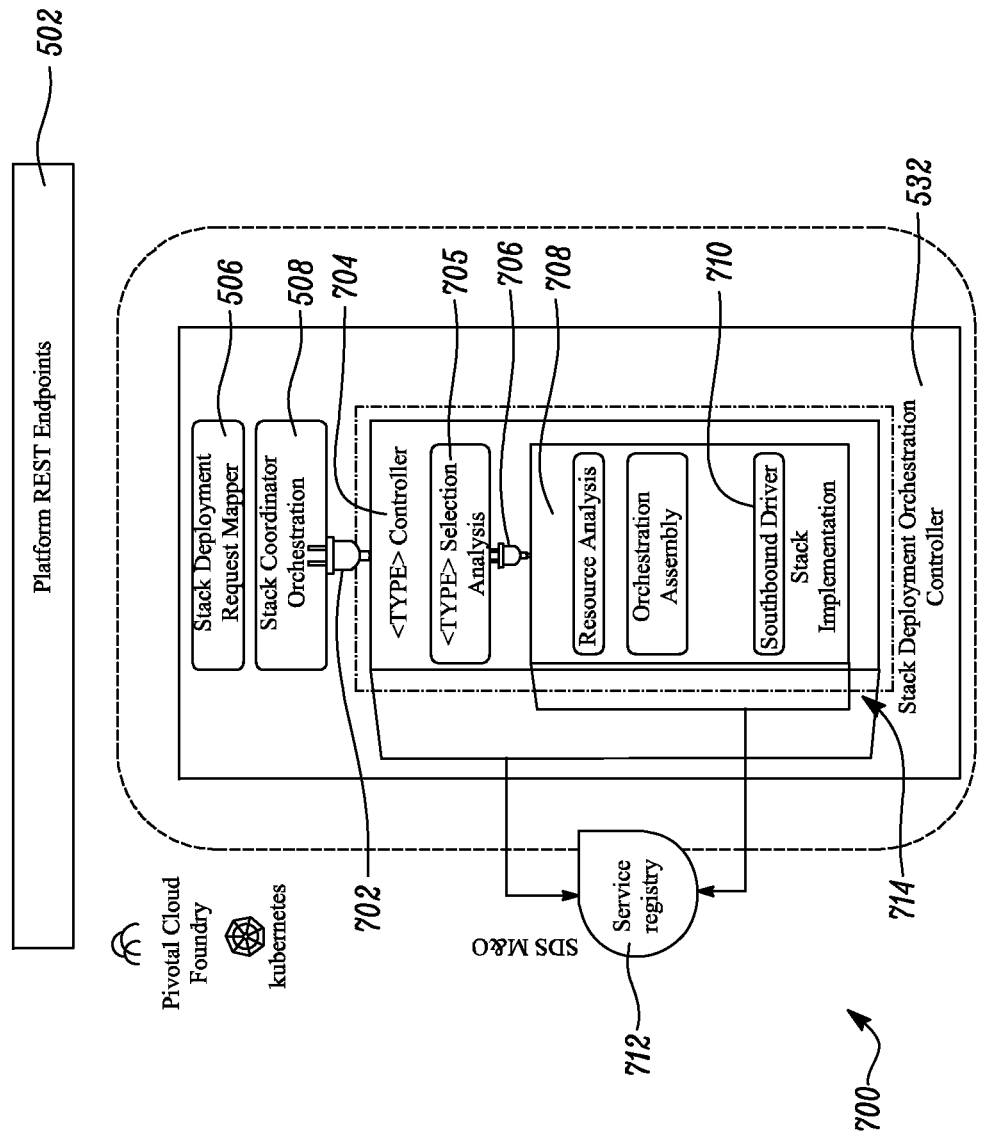
FIG. 7 is a first illustrative diagram showing components within the stack deployment orchestration controller of FIG. 5, in accordance with one embodiment.

FIG. 7 is a first illustrative diagram 700 showing components within the stack deployment orchestration controller 532 of FIG. 5, in accordance with one embodiment. In certain embodiments, the overall goal of the box 714 outlined in dashed line (and that of other similar boxes next to it) is to put type-specific logistics and business logic down to a pluggable architecture so the top layers can be simple and agnostic to the needs of the individual technologies. This box 714 outlined in dashed lines, in certain embodiments, depicts any one of the block controller, fire controller, object controller, projection, and stream controller, shown in FIG. 5. The overall goal of the boxes 705, 708, within the box 714 (along with any other boxes that would be adjacent to it within the dashed box 714) is to put technology-specific configuration parameters and business logic into a pluggable architecture.

Referring still to FIG. 7, from top to bottom, the components in this part of the architecture are configured as follows:

Northbound requests to deploy storage services of a specific type enter the stack deployment request mapping layer 506. The responsibility of this service is to validate arguments, dispatch to the stack coordinator orchestration service, and return a task ID and other relevant information The stack coordinator orchestration service 508 receives requests to dispatch storage services from the request mapper service 506. The stack coordinator orchestration service 508 may receive multiple dependent deployment requests in the same request (such as SDNAS on VxFlex OS). The stack coordinator orchestration service 508 is responsible for loading the respective stack type and calling the necessary interfaces to achieve the requested results. It supports preview and execute for the respective operations.

The first plug-in capability 702 is achieved by services in the box 714 outlined in the dashed line below implementing a REST interface contract and registering itself against the service registry as a provider of the stack coordinator orchestration.

The <TYPE> controller (Block, File, Object, Stream, Protection) 704 implements a basic set of REST interfaces and registering the service against a registry with a specific type. In this example embodiment, only one major controller of each <TYPE> is allowed, and the types are fixed.

In accordance with the second plug in capability 706, each major type has a series of REST entry-points to implement. For deployment, the block selection analysis is the deployment entry point that determines the proper service to deploy, given the deployment request.

The Stack Implementation (Block/VxFlex OS, File/SD-NAS, etc.) 708 registers itself against a service registry and implements the knowledge about: what resources are needed to service this request (creating a new pool, deploying a new stack, etc.); how to describe the operations that need to be performed for a preview request; and how to kick off the deployment or management operations using the bedrock service that determines how to configure and execute Ansible playbooks to provide automation for IT administration tasks.

The southbound driver 710 for each stack is responsible for talking to the deployed storage stack management interfaces (VxFlex OS Management or "MDM") to derive information about how to fulfill a request. Southbound driver 710 also, in certain embodiments, dispatches to bedrock to get basic information bout hosts as well as a utility, and stack implementation can use this information.

Figure 8:
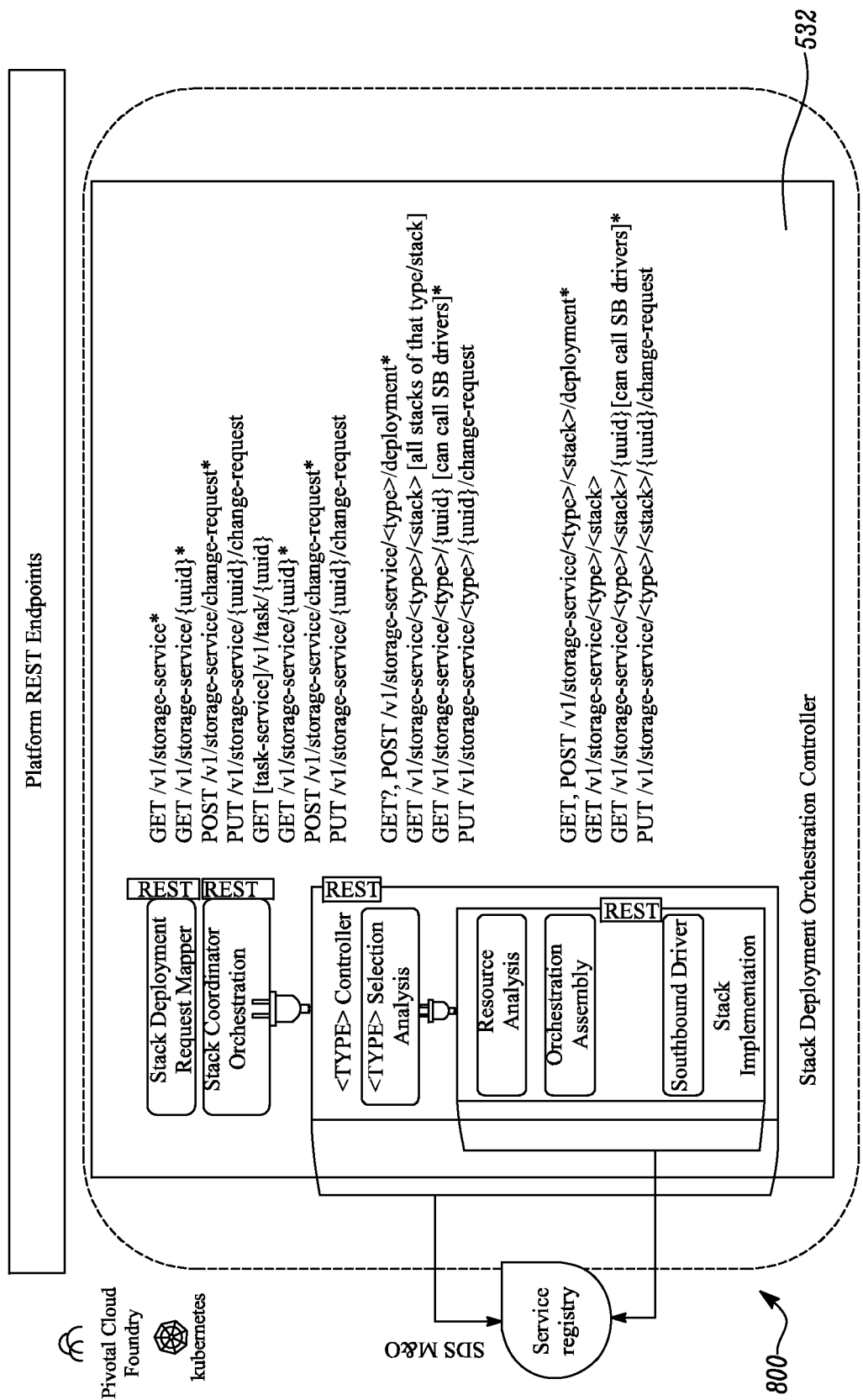
FIG. 8 is a second illustrative diagram showing additional components used within the stack deployment orchestration controller of FIG. 5, in accordance with at least one embodiment.

FIG. 8 is a second illustrative diagram 800 showing additional components used within the stack deployment orchestration controller 532 of FIG. 4, in accordance with at least one embodiment. The stack deployment orchestration controller 532 allows for installing stacks, changing stacks, retrieving information about stacks, creating new resources within stacks (e.g., in certain embodiments, a new pool) and returning task objects for long-running operations.

Figure 9:
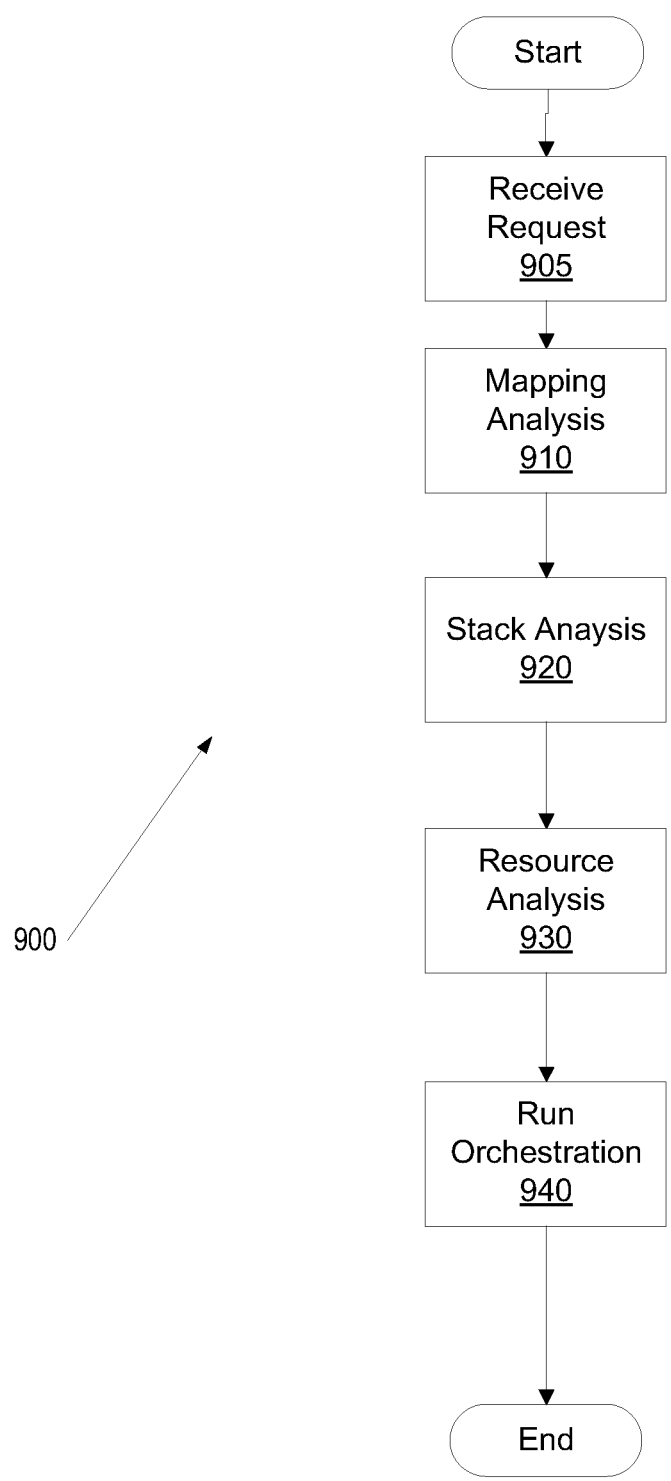
FIG. 9 is a first simplified flowchart of an exemplary method of storage service deployment that is usable with the systems of FIGS. 3-8, in accordance with one embodiment.
Figure 10:
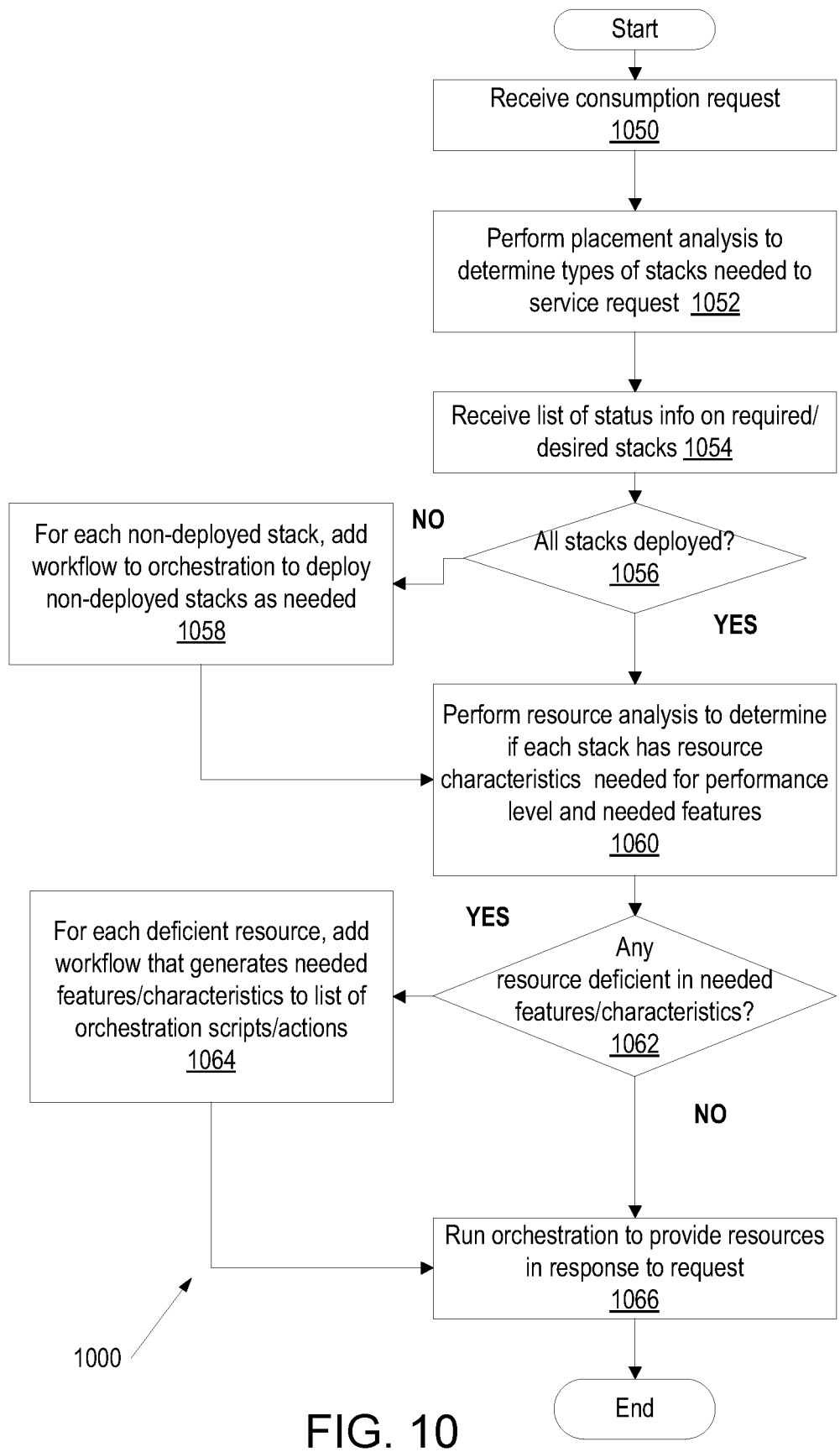
FIG. 10 is a second simplified flowchart of an exemplary method of service storage deployment that is usable with the systems of FIGS. 3-8, in accordance with one embodiment.

FIG. 9 is a first simplified flowchart 900 of an exemplary method of storage service deployment that is usable with the systems of FIGS. 3-8, in accordance with one embodiment, and FIG. 10 is a second simplified flowchart of an exemplary method of service storage deployment that is usable with the systems of FIGS. 3-8, in accordance with one embodiment. FIG. 9 depicts a method that is similar to the of FIG. 10, but at a simplified and higher level, whereas FIG. 10 provides further details for each major type of analysis being performed. The methods of FIGS. 9 and 10 are is usable, in certain embodiments, for various applications, such as deploying specific software-defined storage services to a specific server or range of servers. For example, in certain embodiments, customers may want to deploy their software-defined storage stacks before consumption requests come-in. In accordance with certain embodiments herein, the systems, methods, and devices described herein (including but not limited to the architecture of FIGS. 3-8) has an ability to: (a) understand the stacks and resources that are potentially available for use, when a client/customer request comes in; and (b) service that request by deploying a stack, or just carving out a resource within that stack to satisfy the specifics of the storage request.

In FIG. 9, after a request is received (block 910), three types of analysis are completed: a mapping analysis (block 910, a stack analysis (block 920) and a resource analysis (block 930), based on the results of these analysis, the orchestration that is run (block 940) will be able to deploy and couple together what is needed to serve the received storage request. In certain embodiments, the request that is received will include a stack parameter and a resource characteristic parameter, wherein the stack parameter specifies at least one type of storage asset and the resource characteristic parameter specifies at least one functional capability required of the storage asset.

As an example, consider an example where a customer/client request for an NAS share is received (block 905—FIG. 9, block 1050, FIG. 10). In certain embodiments, a request for a type of storage share is termed a consumption request (block 1050 of FIG. 10). In accordance with FIG. 10, the customer/client request is analyzed (as described further herein) to determine what is being requested. In this example, assume that the received consumption request indicates that the NAS share (e.g., stack parameter) must be on extremely fast storage (first resource characteristic parameter) with inline deduplication capability (second resource characteristic parameter).

First, referring to FIGS. 9 and 10, a mapping/placement analysis (block 910 FIG. 9, block 1052 FIG. 10) is run to analyze the request to determine the types of stacks needed to service the request (block 1052, FIG. 10). The systems, methods, and devices herein also are able to determine (in response to the received request), via the analysis of blocks 910-940 (and blocks 1050-1066), whether the resources are available and deployed. In this hypothetical example, assume that, in response to the request for an NAS share on very fast storage with inline deduplication capability (block 1052), the list that is received at block 1054 indicates that the received request can only be serviced by a combination of SDNAS, SD Block, and VxFlex OS storage stacks.

A stack analysis (block 920) involves, in certain embodiments, checking on the status of storage stacks that can satisfy the storage request (or that are needed/required to satisfy the storage request), to determine, based on the status (block 1054) if the stacks to be used to satisfy the storage request, are deployed (block 1056). The current storage is analyzed, and status of the storage is received (block 1054). In the current hypothetical, the status indicates that, within the available storage, the SIO (also referred to herein as DELL EMC VxFlex OS) and SDNAS products are deployed. In the method of FIG. 10, if these two were the only stacks needed, then the answer at that point at block 1056 would be "yes".

However, in this example, the SIO is not the only stack needed, so analysis continues for each necessary stack. For example, the stack analysis may determine that, for the current suite receiving the customer/client request has SIO deployed, but there's only one pool on hard disk drive (HDD), no solid state drive (SSD), and software defined (SD) Block isn't deployed at all. In this hypothetical, it is learned that SD Block, which is needed to service the request, is not deployed (answer at block 1056 is "NO").

In that situation, a workflow (e.g., a set of tasks or a script) is added to a list of workflows to run at the time of orchestration (when the storage or share is made available to customer/client. For example, for each non-deployed stack, add one or more workflows to orchestration to deploy non-deployed stacks as needed. Thus, after stack analysis (block 920) is complete the methods 900 and 1000 then perform resource analysis (block 930, 1060-1064), where the resource analysis of each stack (whether deployed or not) has resource characteristics needed for the customer's requested performance level and has needed features (block 1060). Based on this, the SDS suite/architecture will be able to respond to the quest to provide resources automatically.

Referring to the method 900 of FIG. 9 and method 1000 of FIG. 10, a mapping analysis (block 910) take place. In certain embodiments, for example, an SDS suite/architecture determines in the mapping analysis block that the received request (block 905) can only be serviced by a SDNAS, SD Block, SIO combination (block 910).

As part of the stack analysis (block 920), the SDS suite/architecture determines if the required resources are already deployed. In certain embodiments, the stack analysis includes evaluating the open inventor (e.g., of storage resources) against a best practice template. In this example, the SDS suite/architecture determines that SIO is already deployed, SDNAS is already deployed, but the software defined (SD) block is not deployed. In certain embodiments, the SD block implements a set of additional capabilities that can leverage VxFlex OS for block storage. For example, in the case of the hypothetical, because SD Block is not deployed, as the last part of the stack analysis, the SDS suite/architecture determines that it should add a script or workflow to the orchestration to get it deployed, such as "Run Ansible script for deploying SD Block against a best-practice" (which is exemplary but not limiting).

Referring again to FIGS. 9, 10 after stack analysis is complete, a resource analysis (block 930) is run to determine if each stack (whether deployed or not) has resource characteristics needed for performance levels and needed features (block 1060). In the resource analysis block (block 930), checks are made to determine if the available and deployed stacks meet other requirements of the request. More details about these kinds of checks are described further herein. If a resource is deficient is in needed features or characteristics (i.e., answer at block 1062 is "YES"), then a workflow/script is added to the orchestration to generate the needed features or characteristics.

For example, in the hypothetical, if the SIO resource does not have a pool that satisfies high performance (which was specified in the request), a workflow/script is added that adds "Create SSD-based SIO pool" (where it is known in the art that SSD devices, as of this writing, generally are higher performing devices than HDD devices). In a further example related to the hypothetical, if the SD Block resource needs respective mapping to provide an inline deduplication feature, a workflow/script reciting "Create inline dedupe volume mapping in SD Block" is added to orchestration In another example if the resource analysis indicates that SDNAS needs to create resources (share) that fits the profile, then in clock 1064 a workflow/script configured to "create SDNAS file share" is added to the orchestration.

When resources are no longer deficient in needed features and characteristics (i.e., answer at 1062 is "NO"), the orchestration is run (block 940, block 1066) is run, which orchestration runs all the scripts that were added to orchestration.

Figure 11:
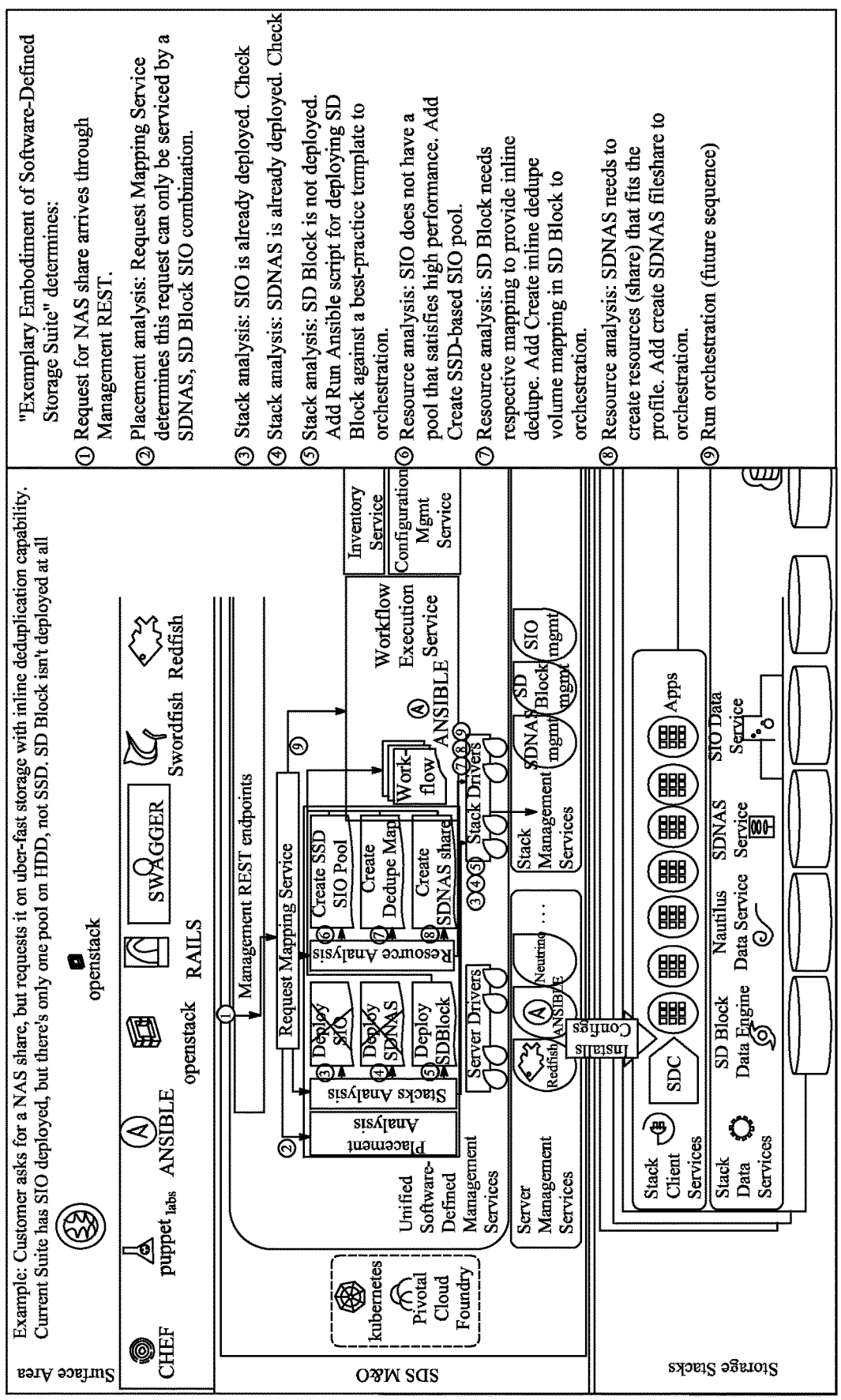
FIG. 11 is a diagram and exemplary sequence of actions taking place in the architecture of FIGS. 3-8 that takes place during storage service deployment, showing actions occurring when a customer asks for a network attached storage (NAS) share, up to the point where the workflow is assembled and passed on to the workflow execution service of FIGS. 3-8, in accordance with at least one embodiment.

FIG. 11 is a diagram 1100 and exemplary sequence of actions taking place in the architecture of FIGS. 3-8 that takes place during storage service deployment, showing actions occurring when a customer asks for a network attached storage (NAS) share, up to the point where the workflow is assembled and passed on to the workflow execution service of FIGS. 3-8, in accordance with at least one embodiment. The sequence of actions of FIG. 11 is shown as the actions numbered (1) through (9) on the right side of the drawing, with corresponding numbered labels in the architecture on the left side of the drawing, showing which elements of the architecture help to implement the sequence.

The architecture of FIG. 11 is substantially the same as that of FIG. 4 but shows in greater detail some of the elements therein. The detailed reference designations of FIG. 4 are not included in FIG. 11, to improve clarity, but like elements are expected to have like numbers. This sequence is implemented to fulfill a hypothetical identical to the one discussed above for the flowcharts of FIGS. 9, and 10, where the methods shown in FIGS. 9 and 10 are still applicable. FIG. 11 shows in even greater detail, how the components of the architecture of, e.g., FIGS. 3 and 4, are able to implement the methods of FIGS. 9 and 10.

Referring to FIGS. 9, 10, 11, the hypothetical use case is the same as discussed above: a customer asks for an NAS share on super ("uber") fast storage, with inline deduplication capability. The current SDS suite of storage in the system receiving the request has SIO deployed, but there's only one pool on HDD (slow storage) not SSD (fast storage) and SD block is not deployed at all. Starting with step 1 in the sequence, at step (1), a request for a NAS share arrives at the architecture, in this example via the management REST endpoints 316 (FIGS. 3,4). At step (2), a placement analysis (also known herein as mapping analysis, e.g., as shown in block 910 of FIG. 9 and block 1052 of FIG. 10), takes place. As FIG. 11 shows, the request mapping service 318, in this embodiment, performs the placement/mapping analysis (2), the stack analysis (3), (4), and (5), and the resource analysis (6), (7), and (8), each of which progresses substantially similarly to the way described above in connection with FIGS. 9 and 10. FIG. 11 also shows that the stack drivers 414 (FIG. 4) help to communicate the information associated with steps (3), (4), and (5) of the stack analysis, and steps (6), (7), and (8) of the resource analysis, to the associated stack management services 330 (e.g., SDNAS management and SIO management). The workflow execution service 410 then runs the orchestration at (9).

FIG. 12 is an illustrative diagram 1200 showing automated vertical functions taking place in an architecture based on the architectures of FIGS. 3-8, in accordance with at least one embodiment. In particular, the architecture shown in FIG. 12 is a "stripped down" architecture compared to the architecture 400 of FIG. 4, to better show the actions taking place. In this exemplary embodiment of the architecture, the architecture 1200 implements a management platform that automates the installation, deployment, and configuration of a particular simplified subset of storage (e.g., in this exemplary embodiment, SDNAS on top of VxFlex OS for simple consumption of file shares using an industry-standard front-end, Ansible Tower). As shown in FIG. 12, the architecture 1200, from bottom to top, includes a software defined storage (SDS) management and orchestration (M&O) plane/layer 102 (also referred to herein as a layer 102), as noted above, that interacts with a surface area 302 and one or more storage stacks 306. As with FIG. 4, the stack management services 302 is, in certain embodiments, outside of the M&O control plane 102.

Considering the architecture of FIG. 12 starting from the bottom to the stop, the storage stacks 306 include a plurality of physical disks 336d-336c stack data services 334, and stack client services 332 Generally, the storage Stacks 306, in certain embodiments, are implemented using existing software-defined storage stacks, such as the illustrated SIO data service 1248 (but this data service is illustrative and not limiting). The physical disks 336 include a set of physical disks that are available for data services consumption.

The stack data services 334 provide a set of data services to consume the storage. Stack client services 322 provides a set of services that serve storage facets to applications or other software-defined storage stacks (layering/dependencies on each other are not illustrated in FIG. 12)

The stack management services 330 are services that perform management (control path) of the storage stacks that already exist. Advantageously, the stack management services 330 can be elevated to the cloud-native cluster, if not already enabled to do so. In certain embodiments, the stack management services 330 are configured to be "pluggable," meaning that their advanced features and changing functionality can be driven by the plug-in and reflected automatically in the M&O layer without additional adaptation by the unified services. As shown in FIG. 12, the stack management services 330 include, by way of example only, SIO management services and SDNAS management services. As will be appreciated, the stack management services layer 330 generally will include management services for the client services and data services that are actually in the stack client services layer 332 and stack data services 324, respectively.

The M&O plane 102 also is referred to herein as the software defined interface (SDI) "brain" and provides, in certain embodiments, a unified management of software-defined storage core components. As shown in FIG. 12, in certain embodiments the M&O plane 102 includes a cloud native ecosystem 323, such as Kubernetes/Pivotal Cloud Foundry. In certain embodiments, it is assumed that a user/customer using the architecture of FIG. 12 may already have a cloud-native ecosystem in its private cloud. In certain embodiments, if the user or customer does not have a cloud-native ecosystem in its private cloud, the architecture 1200 may provide a cloud native ecosystem.

The server management services 322 are a set of open-source tools used to perform installation, deployment, and configuration of the software-defined storage stacks 306. In the example embodiment of FIG. 12, the illustrative server management source being used is Ansible, but this is not limiting.

The unified software-defined management service 304 are a set of services that understand the servers and services under management and allow the user to create and store any policy around deployments. The unified software defined management services 304 also store and apply configuration templates to storage stacks to best practice configurations, given the hardware deployed.

The management REST (representational state transfer) endpoints 316 are exposed through REST endpoints. In certain embodiments, the management REST endpoints 316 require industry-standard specification compliance. In certain embodiments, the surface area layer 302 provides the desired touchpoints exclusively.

The Surface area plane or layer 302 includes a basic or "rudimentary" user interface (UI) 1202, such as the re-use of existing UI assets. Advantageously, in certain embodiments, the implementation leverages a customers' existing IT ecosystems, such as Ansible Tower, VMware vRO and/or other orchestration and management software, such that at least some of the embodiments herein can be "plugged in" readily to the existing ecosystem(s). The surface area layer 302 also includes a basic organized unit or set of scripts that defines work for an automated server configuration, such as an Ansible playbook 1204, for consumption of the platform. The surface area 302 depicts how the SDI Brain 323 capabilities are exposed to the consumer. It should be understood that, in this disclosure, the terms Software Defined Storage System (SDSS), Software Defined Interface (SDI) Brain, and VIKI, are all used interchangeably.

FIG. 13 is a simplified flowchart 1300 showing a method for registering and deploying hosts and storage, for the architecture of FIGS. 3-12, in accordance with at least one embodiment. FIG. 14 is an illustrative diagram 1400 and exemplary sequence of actions taking place in the architecture of FIG. 12 and the simplified flowchart of FIG. 13, showing the components that are active during registration of a host and deployment of software defined shared block storage (based on direct attached storage), such as VxFlex OS and software defined network attached storage (SDNAS), in accordance with at least one embodiment. Although the flowchart of FIG. 13 and the corresponding diagram and sequence of FIG. 14 are described herein in particular with reference to the simplified architecture of FIG. 12, it will be appreciated that such descriptions likewise are applicable to the architectures of FIGS. 3-4 as well.

Referring now to FIGS. 12-14, the overall method illustrates, in one embodiment, a process for a customer/client to provision a file share in a quicker and easier way than is currently done. Where the customer is able to use the architecture to quickly and automatically register a host to the system and to deploy a stack data service (e.g., SIO) and a stack client service (e.g., SDNAS), so as to quickly provision the file share. In block 1310 of FIG. 13, a customer/client begins the process to quickly provision the file share. In step (1) of the related sequence of FIG. 14, the request to register hosts comes in via the Management REST endpoints 316, and the request is routed to the compute controller (see FIG. 14). LINUX hosts are registered for use by VIKI (blocks 1320-1322 of FIG. 13). This registration process involves the compute controller (FIG. 14) contacting the LINUX hosts, discovering basic information about the LINUX hosts, and storing inventory information learned (step (2) of the sequence of FIG. 14). FIG. 15 is an illustrative diagram and exemplary sequence of actions taking place in the architecture of FIG. 12 and the simplified flowchart of FIG. 13, showing the components that are active during registration of a LINUX host, in accordance with at least one embodiment.

FIG. 16 is an illustrative diagram and exemplary sequence 1500 of actions taking place in the architecture of FIG. 12 and the simplified flowchart of FIG. 13, showing the components that are active during deployment of Scale 10 as a service, in accordance with at least one embodiment. Referring briefly to the exemplary sequence of FIG. 15, in step (1) of the sequence, as part of the registration, the management REST endpoints 416 shares LINUX host information. In step (2), the compute controller contacts bedrock controller with password information. In step (3), the bedrock controller uses existing playbook from Caspian to transfer ssh keys for ease of Ansible script playback later. In step (4), the bedrock controller "hides" the asynchronous nature of the ansible script and returns status 202 to compute controller. In step (5), the compute controller also transfers ssh keys so it can access inventory/discovery information. In step (6), the compute controller executes Ansible built-in module to get discovery information. In step (7), compute controller stores host information in form of Ansible-consumable file or artifact that bedrock controller or Ansible itself can reference given a grouping/tag during deployment request. In step (8), the management REST endpoints 416 response is returned to the entity that requested registering the LINUX hosts.

Referring still to FIGS. 13 and 14, in response to the request to deploy VxFlex OS as a service (block 1330-1332), the request mapping service 318 identifies the appropriate playbook(s) to execute (e.g., by communicating with the Ansible playbooks as shown in FIG. 14). As a further part of the request, the workbook executes, providing feedback to a user (step (5) in FIG. 14 sequence). The workflow execution service 410 executes the workflow and installs the components of the VxFlex OS (step (6) of FIG. 14 sequence), where in this embodiment VxFlex OS is deployed with default values. This request can come in via several sources, e.g., through a REST API 316, the user interface 1202, or the Ansible playbook 1204. This registration process also is detailed further in connection with the sequence of FIG. 16, discussed briefly below.

FIG. 16 is an illustrative diagram and exemplary sequence 1600 of actions taking place in the architecture of FIG. 12 and the simplified flowchart of FIG. 13, showing the components that are active during deployment of Scale IO as a service, in accordance with at least one embodiment. Referring briefly to the sequence of FIG. 16, for deploying the stack data service 324 (in this case VxFlex OS), in step (1), a VxFlex OS Deployment POST request is received at the management REST endpoints 416 and associated: group/host tags gets picked up by the bedrock controller of the request mapping service 318. In step (2) of the sequence, the bedrock controller retrieves groupings/hosts from REST request payload from the "Ansible file" (alternately, in certain embodiments, if the underlying Ansible execution can retrieve it, then this may not be necessary). In step (3), the bedrock controller returns a "task id" to caller (i.e., whatever entity is requesting deployment of VxFlex OS as a service) for subsequent status updates on the deployment. In step (4), the bedrock controller executes the Ansible script to deploy VxFlex OS components on respective nodes. (MDM management, SDC application connector, and SDS storage server). In step (5), the Ansible script deploys components. In step (6), the Ansible script create base storage pool in VxFlex OS (e.g., in the stack management services 330).

In step (7), the bedrock controller polls Ansible output and "stores" important terminal state information for each host/node and component that is deployed, along with a simple status field. In certain embodiments, because the terminal state information is stored, there is no need for overall status to be provided. In certain embodiments, it is necessary to know the unique identifier of the VxFlex OS storage pool so it can be used when creating an NFS file share through SDNAS (as discussed further herein). In step (8), a GET request from northbound API with "task id" retrieves cached status information from step (6) above until all messages associated with the task id are in a terminal state.

Referring again now to FIGS. 12-14, in the flowchart of FIG. 13, and the sequence of FIG. 14, it is now at blocks 1340-1342 of FIG. 13 and step (8) of FIG. 14, where SDNAS is to be deployed as a service. The flow for deploying SDNAS as a service, in FIG. 17, substantially similar to the process flow described above in connection with deploying VxFlex OS as a service.

FIG. 17 is an illustrative diagram and exemplary sequence of actions taking place in the architecture of FIG. 12 and the simplified flowchart of FIG. 13, showing the components that are active during deployment of SDNAS as a service, in accordance with at least one embodiment. In step (1) of the sequence of FIG. 17, a VxFlex OS Deployment POST request is received at the management REST endpoints 416, and the group/host tags gets picked up by the bedrock controller of the request mapping service 318. In step (2) of the sequence, the bedrock controller retrieves groupings/hosts from REST request payload from "Ansible file" (in one embodiment, if the underlying Ansible execution can retrieve it, then this may not be necessary). In step (3), the bedrock controller returns a "task id" to caller (entity that requested deploying SDNAS as a service) for subsequent status updates on the deployment. In step (4), the bedrock controller executes the Ansible script to deploy SDNAS cluster management and NASlib (network attached storage libraries) components on respective nodes. In step (5) an Ansible script deploys components. In step (6), the bedrock controller polls Ansible output and "stores" important terminal state information for each host/node and component that is deployed, along with a simple status field. In certain embodiments, this means no need for overall status. In step (7), a GET request from northbound API with "task id" retrieves cached status information from step 6 above until all messages associated with the task id are in a terminal state.

Referring again to FIGS. 13 and 14, it is now at blocks 1350 of FIG. 13 and steps (9)-(10) of the sequence of FIG. 14, where the file share is ready to be deployed. The above workflows have returned detailed status and provisioned pool capacity (step (9) of FIG. 14), and at this point, a file share, such as an NFS (networked file system) file share, can be sent to the stack management services 330 (i.e., in this example embodiment, that is the entry point for that request). In accordance with FIG. 13, block 1350, the sequence of FIG. 18 is then run to provision the file share via the SDNAS management entry point.

FIG. 18 is an illustrative diagram and exemplary sequence of actions taking place in the architecture of FIG. 12 and the simplified flowchart of FIG. 13, showing the components that are active during creation of a network file share (NFS), in accordance with at least one embodiment. Referring briefly to FIG. 18, in step (1), a request new NFS share is made using POST on SDNAS management API (illustrated as the top screen shot 1802 in FIG. 18). In step (2), the NFS share is displayed on the client (illustrated as the bottom screen shot 1804 in FIG. 18).

In another embodiment, using the full architecture shown in FIGS. 3-8, additional features can be implemented. For example, in certain embodiments, in addition to the above-described functions implemented in the embodiments of FIGS. 3-18, the described systems, methods, and apparatuses can provide a more customized automated setup for users, with more templates adapted to tailor the installation, control, management, deployment, configuration, etc., of storage assets, such as software-defined storage assets, to particular user requirements, based on the characteristics and features of the storage assets.

For example, in certain embodiments, the described systems, methods, and apparatuses are able to return a list of software-defined storage (SDS) stack configurations that are available to the user, given the user's inventory and the capability of that inventory. In certain embodiments, being able to return a list of available SDS stack configurations, given user's inventor and inventory capability, builds a base to be able to describe software-defined storage stack installability based on several other factors, including but not limited to server capability (memory, disk, CPU, network), licensing, existing stack installations, tenancy restrictions, and network topology and configuration.

FIG. 19 is an illustrative diagram 1900 showing the components that are active during registration of a host and requesting deployment templates, in accordance with at least one embodiment, where the applicable architecture is that of FIGS. 3-5 as discussed above. FIG. 20 is an illustrative simplified flowchart showing actions taking place during registration of a host and requesting deployment templates, in the architecture of at least FIGS. 3-8, In particular, the architecture shown in FIG. 19 is a "stripped down" architecture compared to the architecture 500 of FIG. 5, to better show the actions taking place.

Referring to FIG. 19, FIG. 19 illustrates the M&O layer and surface area layer 302 and includes platform REST endpoints 502, native services 504, a compute controller 509, an API Gateway 514, a deployment template management service (DTMS) 1906, a plurality of templates 1914a-1914e within the deployment template management service, open source services 1906, a policy manager 1908, a template CRUD service 1910, template definition file 1912, and a stack deployment orchestration controller 532. These are described further below or are identical to the way they were previously described in connection with FIGS. 4-5 or elsewhere herein.

Requests to the platform REST endpoints 502 are serviced by multiple services running independently. The API gateway 514 multiplexes the incoming uniform resource locator (URL) to the service that can service that request in the platform. In certain embodiments, several of the same service may exist within the cloud native ecosystem 323. The user interface (UI) 1902 communicates requests to the API gateway 415. In certain embodiments, the UI 1902 is implemented as a rudimentary UI using Vaadin framework where, Vaadin Framework is a Java UI framework and library that simplifies web application development, where code for the framework is written in Java and executed on the server's Java Virtual Machine (JVM) while the UI is rendered as hypertext markup version 5 (HTML5) in a browser. The Vaadin framework is an open source product available from Vaadin in Turku, Finland. In certain embodiments, the UI 1902 is implemented via Ansible Tower/AWX integration, where Ansible Tower is a web-based interface for managing Ansible, providing a UI for managing quick deployments and monitoring configurations.

The native services 504, in certain embodiments, is similar to the native services 504 as described above in connection with FIG. 5 and includes all services implemented by the VIKI platform, with the exception of Ansible AWX/Tower. The compute controller 509 exposes REST interfaces that add servers to the inventory. This inventory is used to deploy and install software-defined storage stacks.

The stack deployment orchestration controller 532 has functions similar to that of the one in FIG. 5 and exposes REST interfaces that deploy storage stacks on servers, as well as configuring and boot-strapping the stacks based on user input or best practice templates stored in the policy manager 1908 and/or the template definition file 1912.

In certain embodiments, the controller services in FIG. 19 are VIKI controller services. The platform REST endpoints 502 at the top of FIG. 19 include everything having anything to do with a request to install, configure or register an SDS asset or other storage, all the way through to consumption requests—everything the management system has to offer, as noted previously. The native services 504, in certain embodiments, are all services implemented by the VIKI platform, with the exception of AWX, as noted previously.

The template definitions file 1912 is a file that describes configurations of storage stacks and prerequisites needed for the storage stack configuration to be deployed. The template create/read/update/delete (CRUD) service 1910 keeps track of template definitions and inventory information, providing them to the DTMS 1906 when requested, checking if template definitions change, and storing template definition files in memory. The DTMS 1906 collates data, template and inventory information and provides them to the policy manager 1908, receives a set of results from the policy manager 1908, filters the results based on query parameters and provides a response to a caller/user.

Referring to FIG. 19 and the flowchart 2000 of FIG. 20, In the architecture 1900 of FIG. 19, a customer/user can register/identify LINUX hosts for use by VIKI (block 2010), request deployment templates the customer/user can execute (block 2020), get a detailed list of templates that can be deployed (block 2030), and can get reasons why they can't deploy others (block 2040). This is explained further herein.

FIG. 21 is an illustrative simplified flowchart showing a method of responding to a request to provision storage that includes indicating which configurations are available in inventory and the capability of that inventory, for the architecture of at least FIGS. 3-8 and 19, in accordance with at least one embodiment. FIG. 21 includes at a high level the overall actions shown in FIGS. 19-25, an in certain blocks, details on the actions are described further in one or more of FIGS. 19-25. Referring now to FIGS. 19 and 21, the method starts with predefining templates and rules that are to be applied to the software defined storage assets (block 2110). Pre-definition includes creation of a template definition file 1912 that describes the configurations of storage stacks, and the prerequisites to deploy the configuration (block 2112), as well as creation of a rules set 1909 for the policy manager 1908 (block 2114). The rules set 1909 can be executed against inventory and configuration information to determine if the template is achievable.

The template CRUD service 1910 is started up (block 2120), which includes the template CRUD Service 1910 loading the template definition file 1912 and keeping it resident in memory (block 2122). The template definition file describes the storage stack configuration and prerequisites to deploy the configuration (block 2122). As part of this, the template CRUD Service 1910 checks to see if the definition (template definition file 1912) changed when a GET is called, and a certain amount of time has elapsed. (optional) (block 2124). A request for templates is made (block 2130). In certain embodiments, this involves performing actions listed in the sequence in FIG. 22, which is an illustrative diagram 2200 and exemplary sequence of actions used to implement a method of requesting templates, for the method of FIG. 21, in accordance with at least one embodiment. In FIG. 22, the numbers in the diagram correspond to the component in the architecture that helps perform the corresponding numbered step.

Referring briefly to FIG. 19 and FIG. 22, in the listed sequence, in step (1), a user submits a request to see what possible storage stacks can be deployed to the Deployment Template Management Service (DTMS) 1906. The user request can provide query parameters to constrain the query. In step (2), the DTMS 1906 requests the template definitions from the Template CRUD service 1910. In step (3), the DTMS 1906 requests the inventory information from the inventory CRUD service 2202 (FIG. 22). In step (4), the DTMS 1906 collects the data and templates and sends them to the policy manager 1908. In step (5), the Policy Manager service applies the input and rules set to achieve a result set that is returned to the DTMS 1906. In step (6), the DTMS 1906 filters results based on query parameters sent in at step (1). In step (7), the DTMS 1906 formulates a response body with an OK status code to the caller. In step (8), the user experience (UX experience), or user interface, shows the templates based on the query. These templates are returned back in block 2130 of FIG. 21.

Referring again to FIGS. 19 and 21, in block 2140 a list of installed storage service is obtained (block 2140), and FIG. 23 is an illustrative diagram and exemplary sequence 2300 of actions used to implement a method of getting installed storage services, for the method of FIG. 21, in accordance with at least one embodiment. Referring briefly to FIG. 23, and to the sequence shown therein, at step (1), a request is submitted, via the platform REST endpoints 502, to get a list of existing storage stacks installed in the VIKI platform (GET/v1/storage-service). In step (2), for each storage stack, the Storage Deployment Service sends a request to the Compute Controller to get list of nodes that have the storage stack with this universal unique identifier (UUID) installed on them. (GET/v1/compute/storage-service/{uuid}). In step (3), the compute controller returns to the REST endpoints the list of nodes that have a component of the storage stack installed. In step (4), the SDS compiles the response and sends the response back to the consumer. FIG. 23 includes an example of a payload 2302 that can be returned to the customer in step (4). The example payload (which is for illustrative purposes only) includes a list of storage services, including UUD, type (e.g. block, file, etc.), stack name (e.g. VxFlex OS, SDNAS), and a list of nodes where the stack is installed.

Referring again to FIGS. 19 and 21, after getting the list of installed storage services (block 2140), the method gets real-time installed storage services details (block 2140), and FIG. 24 is an illustrative diagram and exemplary sequence 2400 of actions used to implement a method of getting real time installed storage services details, for the method of FIG. 21, in accordance with at least one embodiment. Referring briefly to FIG. 24, in step (1) a request is submitted to the storage deployment service 2402, to get details about an existing storage stacks installed in the inventory (GET/v1/storage-service/{uuid}/details). In step (2), the storage deployment service 2402 makes a REST call to the stack coordinator (SC) service 2404 (GET/v1/storage-service/{uuid}/details). In step (3), the SC service 2404 makes a REST call (GET/v1/service-registry/{type}) to the service registry 2408 for the type of controller to access (e.g. block, file). In step (4), the SC service 2408 makes a REST call to the registered controller 2406 (GET/v1/storage-service/<type>/{uuid}/details). In step (5), the controller 2406 makes a REST call (GET/v1/service-registry/{type}/{stack}) to the Service Registry 2408 for the stack implementation to access (e.g. VxFlex OS, etc.). In step (6), the controller makes REST call to the stack implementation controller 532 (GET/v1/storage-service/<type>/<stack>/{uuid}/details). In step (7), a southbound Driver calls the stack management interface Interface to get specific details. In step (8) the storage deployment service 2402 compiles the stack details and returns a response to the user.

Referring again to FIGS. 19 and 21, once the architecture has the template, installed storage services details, and the real-time installed storage services details, the storage stack can be deployed (block 2160). FIG. 25 is an illustrative diagram and exemplary sequence 2500 of actions used to implement a method of deploying a storage stack, for the method of FIG. 21, in accordance with at least one embodiment. Referring briefly to FIG. 25, in step (1) a request is submitted to the storage deployment service to deploy a storage stack (POST/v1/storage-service/change-request). In step (2), the storage deployment service sends a request to the task service to create a new task. (POST/v1/tasks). In step (3), the storage deployment service makes REST call to the stack coordinator orchestration (SCO) service (POST/v1/storage-service/change-request). In step (4) a task is returned to the user so that the user can monitor the deployment execution. In step (5), the SCO makes a REST call (GET/v1/service-registry/{type}) to the service registry for the type of controller to access (e.g. block, file). In step (6), the SCO makes REST call to the correct controller (POST/v1/storage-service/<type>/deployment). In step (7), the controller makes REST call (GET/v1/service-registry/{type}/{stack}) to service registry for the stack implementation to access (e.g. VxFlex OS, SDNAS, etc.).

In step (8), the controller makes a REST call to the stack implementation controller that will invoke southbound drivers to deploy the storage stack (POST/v1/storage-service/<type>/<stack>/deployment). In step (9), the stack controller analyzes resources and orchestrates the operations to perform. In step (10), an orchestration assembly requests a deployment controller from the service registry. In step (11), the orchestration assembly makes a REST call to Deployment Controller. In step (12) the deployment controller invokes Bedrock and polls the task. In step (13), when the task is complete, a message is put on the bus. In step (14), the orchestration assembly subscribes to a message from the bus about the task being done. In step (15), the SCO subscribes to the message bus and consumes the task status. In step (16), the SCO marks the task with the appropriate status (completed or failed.). This also ends the method of FIG. 21.

As the above embodiments demonstrate, a single, unified, management and orchestration (M&O) layer or pane, having architectures as described above, can be configured to automatically install, configure, deploy, and consume storage assets from various different vendors, and can understand what's required to deploy and wire together in order to serve a storage request, and spin-up or down software-defined storage stacks as a result of predictive analytics, policy, and usage at the IT administrator's request.

IT departments are using software-defined storage platforms to reduce the over capital and operating expenses associated with deploying and maintaining the hardware associated with purpose-built appliances (storage arrays). This is initially achieved through standardizing on and purchasing a set of commodity compute servers, racking them together with simple networking, and installing software-defined storage stacks that provide block, file, object, or stream storage over IP-based protocols.

Challenges may arise, however, when trying to maximize the usages of the infrastructure across many storage types. One attempted solution has been to lock specific servers in the rack down to specific roles. For example, let servers 1-4 provide block storage, servers 5-8 provide object storage, and so on. These worksheet-based configuration practices can lead to stranded capacity, and stranded capacity on one storage type means potential capacity starvation for another storage type down the road.

At least some of the aforementioned embodiments demonstrated and described unified configuration management, including deployment, installation, configuration, and consumption of software-defined storage assets. At least some of these embodiments provide a way to prescriptively and manually identify these roles and apply policies to an inventory of hardware to automatically install software-defined storage stacks for future consumption.

In further aspects of these embodiments, additional embodiments are provided that enable the removal of the prescriptive, manually deployment steps entirely. At least some embodiments provide a mechanism where policies and predictive analytics are applied to consumption requests from the user (requests to create volumes, buckets, file shares, etc.) and are applied to the available hardware inventory to dynamically install and configure the storage software. This allows the customer to start with nothing but hardware inventory and provide consumption capability to the customer, with the management software boot-strapping storage stacks and making configuration changes as requests come into the system. In certain embodiments, this can provide a consumption-based elastic deployment and reconfiguration of the software-defined storage.

At least some embodiments provide an automated mechanism to elastically deploy storage stacks appropriate to the requests to consume storage. At least some embodiments provide a way to contract (reduce size) or uninstall storage stacks responsibly when they are no longer in use. At least some embodiments expand existing storage stacks to additional nodes or drives to increase capacity predictively. At least some embodiments, provide controls to the IT administrator to gate operations based on operations type. (install versus expand versus contract). At least some embodiments enable automating the installation, deployment, and configuration, etc., of storage stacks as described previously herein. At least some embodiments elastically expand and/or contract storage use policy, predictive analytics (past usage predicting future results). At least some embodiments perform installation/deployment as part of consumption requests.

In certain embodiments, a configuration is provided wherein an IT administrator identifies a pool or inventory of hardware (e.g., servers) that can be consumed by software-defined storage platforms. In some embodiments, the servers may only have a bare, supported operating system on them. As opposed to a manually configured rack of servers, where a prescribed set of storage types are installed on a fixed set of nodes defined by the user before the end-user make a request to consume the storage (create a volume, share, or bucket), this configuration instead starts, in certain embodiments, with no storage stacks installed, before consumption requests are allowed.

Referring briefly to FIGS. 3 and 4, at least some embodiments include a component called the elastic configuration service 328, within the M&O management layer/plane, that operates to implement at least the functions associated with FIGS. 26-28, described further below.

Consider a situation where a customer/client is existing in a computer-based or information-processing ecosystem, such as a cloud ecosystem, in a client-server configuration, but the customer/client does not have a single storage stack deployed (yet) anywhere in the ecosystem. However, the customer has access to an architecture such as the M&O plane/layer described above. The customer/client runs an application, such as an ORACLE Database on the server, and that application hypothetically needs 10 GB of storage.

With the embodiments described herein, the customer/client is able to request a 10 GB volume to/for that server (not unlike other use cases described herein), and, in certain embodiments, the architecture provided herein should be able to recognize, based on the request for the 10 GB of storage, exactly what type of storage is needed, what the resources are that can implement this function, and also and have the ability to go out and actually install, deploy, and configure the storage stack to be able to satisfy that request for the 10 GB, and then finally call that storage stack's management software to actually create the volume. Thus, is possible to stat with "nothing" (no access to any data stores) and So, you can start from nothing and then actually have a storage stack automatically deployed and ready to go. This also provides an important advantage for customers/clients, because they may not have to pay for the extra storage (the extra 10 GB of data storage) until the customer/client actually uses it, and this advantage also has applicability in cloud storage configurations.

In at least some embodiments, this mechanism allows the IT administrator to identify a pool or inventory of hardware (servers) that can be consumed by software-defined storage platforms. The servers may only have a bare, supported operating system on them. As opposed to a manually configured rack of servers, where a prescribed set of storage types are installed on a fixed set of nodes defined by the user before the end-user make a request to consume the storage (create a volume, share, or bucket), this mechanism instead starts with no storage stacks installed before consumption requests are allowed, and then automatically provides them in response to certain instructions. Thus, this can advantageously enable performing a kind of "just in time" installation and deployment of storage assets, which is more cost and resource efficient, because storage assets are not installed or deployed until they are actually needed for consumption, thus saving clients and customers money by not having to install and deploy storage assets until needed.

FIG. 26 is a simplified flowchart of an exemplary method 2600 of identifying a pool of hardware that can be consumed by SDS platforms and for elastically expanding/contracting existing storage stacks, for at least the architecture of FIGS. 2-19, in accordance with in at least one embodiment. This flow chart 2600 is discussed in connection with an illustrative example where the management platform (e.g., the SDS M&O 102 of at least FIGS. 3-19, as described herein) is installed, but this example is not limiting and is provided simply to better understand how the process steps work. In certain embodiments, the M&O is installed in a cloud-native orchestration ecosystem, such as Kubernetes, Pivotal Cloud Foundry, or Pivotal Container Service (PKS). In certain embodiments, before the method of FIG. 26 begins, an IT administrator identifies rack of servers for use by the M&O 102 management platform. In certain embodiments, potentially usable servers may be automatically identified (and set up, deployed, configured, etc.) in accordance with the architectures and methods, including the unified interface for configuration management, described herein in connection with FIGS. 3-26).

In at least one embodiment, the method of FIG. 26 is implemented in configuration where the M&O management platform 102 contains a fixed inventory to match against incoming requests and supported storage topologies. Although use of a fixed inventory is not limiting, having a fixed inventory improves the efficiency of analyzing assets to assess their ability to meet customer needs. In an example, the fixed inventory that is being matched against incoming storage requests and supported storage topologies can include the following exemplary characteristics, but this is not, of course, limiting:

The Storage Types: Block, File, Object, Stream
Storage Technologies: VxFlex OS, PowerMax, Unity, ECS Flex, Isilon SD, Nautilus, AWS S3, SDNAS (and their respective Storage Types they support)
Storage Protocols: iSCSI, FC, SDC (VxFlex OS), NAS Referring now to FIG. 26, in block 2605, a request is received (e.g., at the management REST endpoint 316), from a user, for a block volume of a predetermined size "X" to a predetermined host "Y", using a predefined interface (e.g., a user interface (UI) 314 as described above). In this example, assume the following parameters:

User: asics
Request-Type: Provision Storage
Storage:
Type: Block
Protocol: iSCSI
Size: 10 GB
Hosts: dbhost1.localhost, dbhost2.localhost In block 2010, the consumption request is parsed for information regarding: Specific Tenant/host; User; Request type; Storage type; Storage protocol. Thus, the management platform 102 interprets the received consumption request as a specific type to serve a specific tenant and host. The elastic deployment service 328 (FIGS. 3 and 4) is responsible for matching the consumption request to an existing storage technology installation/deployment or expanding the capacity of an existing deployment or installing a new storage technology deployment to service the request. The following request fields, in certain embodiments, impact the elastic deployment service 328: User, Request Type, Storage Type, and Storage Protocol. As part of this parsing, in certain embodiments, the processes of FIGS. 27-29 are performed (block 2611), and determinations are made regarding which request type it is (block 2612) and whether the storage technology can provide the required storage protocol (block 2613). This is explained further below.

Referring briefly to FIG. 27, FIG. 27 is a simplified flowchart 2700 of a method of parsing a consumption request for user information, for the flowchart of FIG. 28, in accordance with at least one embodiment. In block 2710, the user field is checked for data segregation based on user/tenant, tier of service, policy. Depending on the policy and tier of service the customer is paying for, the elastic deployment service 328 must ensure this user's data is segregated from other user's data. ("Tenant" may be exchanged for user here, as entire organizations/companies may want their data segregated from other company's data). Thus, at block 2720, a check is made for whether customer user data be segregated from other user data If the answer at block 2720 is "NO" (i.e., customer user data does not have to be segregated), then a check is made at block 2722 for whether the user already has one or more storage stack that already co-exists with other customers. If the answer at block 2722 is "YES", then the elastic deployment service 328 can consider the existing storage stack as a candidate for the block volume request of block 2605 (FIG. 16). One instance when the answer at block 2722 might be "YES" is a situation where the user or tenant may pay for a less expensive policy where its storage stack co-exists with other customers. In this case, if that storage stack already exists, it can be considered for use with this request.

If the answer at block 2722 is "NO" (meaning—the data need not be segregated, but the user does not already have a storage stack deployed), then the elastic deployment service 328 must install/deploy new storage (e.g., using the methods already described herein, in connection with FIGS. 3-25, etc.)

Referring again to block 2720, if the answer at block 2720 is "YES" (customer data must be segregated), then, depending on policy and tier of service the customer is paying for, the elastic deployment service 328 must ensure this user's data is segregated from other user's data. (In certain embodiments, "tenant" may be exchanged for user here, as entire organizations/companies may want their data segregated from other company's data). Thus, if a "YES' at block 2720, then a check is made to see whether the user already has a storage stack deployed of the same type (e.g., the type "Block") to the same (storage) network (block 2730). If the answer at block 2730 is "YES", then, then the elastic deployment service 328 can consider the existing storage stack as a candidate for the request of block 2605 of FIG. 26 (e.g., for a block volume request for a 10 GB volume) (block 2724).

If the answer at block 2730 is "NO", then if the user does not have a storage stack deployed of the same type, the elastic deployment service 328 learns that it needs to install/deploy a new storage stack (block 2740), e.g., using the aforementioned methods and architectures of FIGS. 3-25). The method then returns to block 2612 of FIG. 26 (block 2750).

Referring again to FIG. 26, at block 2612, the request type is checked to see if it is one of: provision, expand, remove/delete, connect, or remove connectivity (block 2612). For example, the request could be a request to create (provision) storage for a host/cluster, expand existing storage, or remove/delete storage. It could also be used to connect existing storage to additional hosts/clusters or to remove connectivity of the storage to or from the host.

In block 2613, a check is made to determine if any available storage technology can provide the required storage protocol (the required protocol named in the request). The storage protocol (e.g., one of FC, iSCSI, SDC [VxFlex OS], NAS) drives policy within the management platform because each storage technology is only capable of providing certain protocols. For example, if the request at block 2605 specified, "iSCSI" as the protocol, and the list of storage technologies available was: only SDNAS and Isilon, then block 2613 would choose to deploy Isilon, because Dell EMC SDNAS cannot provide iSCSI protocol. Processing then flows from block 2613 to block 2615. It also should be noted that, in FIG. 26, the order of checking fields in the parsing of the consumption request in block 2610 is illustrative and not limiting; fields can be checked in any order.

Referring to blocks 2615 and 2620, the current SDS are analyzed to determine if any storage exists of the requested type. The management platform 328 uses this field to determine if there is a storage stack deployed that matches the type requested. The management platform has an inventory of supported storage types and technologies that can service those types. As an illustrative (but not limiting) example, in one embodiment the inventory list includes:

Block: VxFlex OS (default), PowerMax, Unity
File: Dell EMC SDNAS [software-defined NAS] (default), Isilon SD
Object: Dell EMC ECS (default), AWS S3
Stream: Dell EMC Nautilus The elastic deployment service 328 is configured to know which storage technology to use via two mechanisms: if there are no non-default storage stacks deployed, then the default storage stack technology is used, but if no non-default storage stack technology is identified in the request payload, then the default storage stack technology is used. Otherwise the policy uses the specified/non-default storage technology for requests. Thus, in block 2615 of FIG. 26, the method briefly jumps to FIG. 28 (block 2616), which is a simplified flowchart 2800 of a method of parsing a consumption request for storage type information, in accordance with at least one embodiment.

Referring briefly to FIG. 28, from block 2616 of FIG. 26, processing in FIG. 28 begins at block 2810. The storage types are analyzed (block 2820) to determine if a deployed storage stack exists that matches the requested type (e.g., one of block type, file type, object type, and stream type). To determine what storage technology to use, the elastic deployment service 328 checks whether there are any non-default storage stacks deployed (block 2830). If the answer is "NO," then the default storage stack technology is used (block 232). If the answer at block 2830 is "YES,", there are non-default storage stacks (already) deployed, then a check is made to see if the request payload had identified a non-default storage stack to be used (block 2840). If the answer at block 2840 is "NO," that means that the request payload appears to be not specifying a particular storage technology, so it is permissible to use the default storage stack technology for the system (block 2832).

If, at block 2840, the answer is "YES," that the request payload includes a non-default storage technology in it, then the requests should be configured to use the specified non-default storage technology (block 2850). Processing then returns, at block 2860, back to block 2616 of FIG. 26.

Referring again to FIG. 26, at block 2616 results are returned that indicate whether storage exists of the requested type (blocks 2615 and 2620). Thus, in block 2620, if storage exists of the requested type (answer at block 2620 is YES), then the storage stack is reconfigured to satisfy the request (block 2637), and, optionally, a notification can be sent that the new stack has been deployed (block 2639). Depending on IT administrator preferences, the deployment can take place automatically. In certain embodiments, an optional preview/pause step (between blocks 2620 and 2637) can take place, wherein an entity such as end user or IT manager can give final approval before deployment.

Referring again to block 2620, if storage of the requested type does not exist (answer at block 2620 is "NO," then, in certain embodiments, the elastic deployment service 328 described herein is configured to analyzes the current landscape of the software-defined storage assets and has determines that no storage exists of the requested type. In certain embodiments, to help deploy, configure, and provide storage of an appropriate or suitable type, in block 2625, the elastic deployment service identifies a suitable template (set of deployment attributes) of type block to apply to the inventory, taking into account:

The requested size (some sizes cannot be satisfied by some hosts in inventory)
The requested host (hosts with previous requests generally prefer subsequent storage from the same source)
Past performance (score) of such requests and the subscribed deployment (analytics that predict future performance of operations)
Performance/resources of inventory (other storage stacks may be in use, and it may be desirable to avoid installing new stacks on them, depending on policy and conditions)
Compatibility of storage stacks (some storage stacks live well adjacent to other storage stacks, however some may not) to determine if multi-stack on a single server is allowed.

In block 2630, the elastic deployment service 328 receives the service analysis results, in accordance with preferences. The elastic deployment service analysis results in various supported possibilities (depending on IT administrator preferences). If the request can be satisfied automatically (answer is "YES" at block 26350, then the storage stack is deployed (e.g., if storage is available but not yet deployed) or reconfigured (e.g., storage is deployed but its allocation must change in some way to satisfy the request) to satisfy the request, without administrator intervention (block 2637). Optionally, if the settings require it, a notification can be sent (e.g., to a user, IT administrator, or other entity for receiving notifications) to alert that a new stack has been deployed (block 2639).

If the request cannot be satisfied automatically (i.e., answer at block 2635 is "NO"), then it may be that the configuration is such that some manual actions, such as approval or review of the change, or a guided execution, must take place before the request is executed. In block 2640, a check is made to see if the request can be satisfied with user input, such as review or guided execution. If the answer is YES at block 2640, then the elastic deployment service 328 is configured to provide a "menu" of options for the IT administrator to guide the execution, providing better prescriptive automation for future requests.

For example, the elastic deployment service 328 can provide a recommended template to satisfy the received requests (block 2642), and the new storage stack is deployed or reconfigured in accordance with a guided user selection (block 2644).

Another outcome at block 2640 is a "NO" answer, because the request cannot be satisfied with user input, such that there are no possible ways to satisfy the request, resulting in a failure of the request (block 2645). Failure can occur for various reasons, including but not limit to, there's no inventory, not enough inventory, or the inventory's resources are already allocated to other storage types or stacks.

As the above description for FIGS. 26-28, in connection with FIGS. 3, 4, demonstrates the elastic deployment service 328, in certain embodiments, accepts consumption requests to create, delete, expand storage and determines the best course of action to provide. In certain embodiments, one advantage of at least some embodiments of the architecture and methods described herein is helping to establish minimal deployments, because the template-based deployment, installation, and configuration of storage stacks takes into account potential future usage to reduce the overall time-consuming process of installation of storage stacks. In addition, another advantage of at least some embodiments described herein is the ability to maximize capacity, because at least some embodiments of the elastic deployment service 328 help to prevents stranded capacity by allocating only a portion of the server's hard drive space, where possible. Further, another advantage of at least some embodiments described herein is helping to maximize compute, because elastic deployment combines storage stacks on a single server to maximize the compute resources. Also, yet another advantage of at least some embodiments described herein is addition of the ability to reallocate resources, because at least some embodiments of elastic deployment described herein can move storage stacks from one node to another in order to meet service level objectives.

Testing done on at least some embodiments described herein involved a case study wherein block and file storage stack components were installed (and deployed, and configured . . . ) on the same nodes (allocating unique local storage volumes for each stack) successfully.

In the above-described flow charts and sequence diagrams, certain elements (e.g., rectangular elements, diamond shaped elements, and statements preceded by a number in a circle), herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow charts and sequence diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Further, the processes and operations described herein can be performed by a computer especially configured for the desired purpose or by a general-purpose computer especially configured for the desired purpose by another computer program stored in a computer readable storage medium or in memory.

FIG. 29 is a simplified block diagram of an apparatus that may be used to implement at least a portion of the systems, architectures, sequence diagrams, and method of FIGS. 1-28, in accordance with at least some embodiments.

As shown in FIG. 29, computer 2900 may include processor 2902, volatile memory 2904 (e.g., RAM), non-volatile memory 2906 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 2910 (e.g., a touchscreen, a display, and so forth) and input and/or output (I/O) device 2908 (e.g., a mouse, a keyboard, etc.). Non-volatile memory 2904 stores, e.g., journal data 2904a, metadata 2904b, and pre-allocated memory regions 2904c. The non-volatile memory, 2906 can include, in some embodiments, an operating system 2914, and computer instructions 2912, and data 2916. In certain embodiments, the computer instructions 2912 are configured to provide several subsystems, including a routing subsystem 2912A, a control subsystem 2912b, a data subsystem 2912c, and a write cache 2912d. In certain embodiments, the computer instructions 2912 are executed by the processor/CPU 2902 out of volatile memory 2904 to perform at least a portion of the processes shown in FIGS. 2-8. Program code also may be applied to data entered using an input device or GUI 2910 or received from I/O device 2908.

The systems, architectures, sequences, flowcharts, and processes of FIGS. 1-28 are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 29, which is useful for carrying out a method described with reference to embodiments shown in, for example, FIGS. 1-28. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor 2902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 29, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 29 shows Program Logic 2924 embodied on a computer-readable medium 2920 as shown, and wherein the Logic is encoded in computer-executable code configured for carrying out the reservation service process of this invention and thereby forming a Computer Program Product 2922. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A computer-implemented method for deploying storage assets, the method comprising:
    accessing a consumption request to consume storage assets, the consumption request comprising a stack parameter and a resource characteristic parameter, wherein the stack parameter specifies at least one type of storage asset that is requested, and the resource characteristic parameter specifies at least one functional capability required of the storage asset;
    determining, based on the stack parameter, a set of one or more first storage assets able to satisfy the consumption request;
    for each first storage asset in the set that is not deployed, generating a first workflow configured to deploy the respective first storage asset in the set that is not deployed;
    for each second storage asset in the set that lacks the resource characteristic parameter, generating a second workflow configured to implement that resource characteristic in the respective second storage asset; and
    configuring the set of storage assets to satisfy the consumption request, wherein the configuring comprises running the first and second workflows.

2. The computer-implemented method of claim 1, further comprising:
    determining that a third storage asset resource can be created to satisfy the consumption request; and
    generating a third workflow configured to create and deploy the third storage asset resource.

3. The computer-implemented method of claim 2, wherein the third storage asset resource is formed within at least one of the first and second storage assets.

4. The computer-implemented method of claim 1, wherein the consumption request is for provisioning a fileshare, and wherein the computer-implemented method further comprises:
    contacting one or more LINUX hosts to determine and store host information;
    registering the one or more LINUX hosts;
    requesting deployment of a predetermined type of storage assets as respective services; and
    creating a corresponding fileshare.

5. The computer-implemented method of claim 1 wherein the consumption request comprises a query, including query parameters, relating to a search of an inventory of the storage assets, and wherein the computer-implemented method further comprises:
  pre-defining a set of templates applicable to the storage assets, each respective template comprising configuration of the respective storage asset and prerequisites to deploy the storage asset; and
  generating a rules set configured to execute on an inventory of storage assets, the rules set configured to determine, based on one or more rules in the rule set, if a template is achievable for a given storage asset.

6. The computer-implemented method of claim 5, further comprising receiving a list of deployment templates applicable to the storage assets, the list generated in view of the rules set, wherein the list of deployment templates comprises at least one of:
  reason why a first portion of the list of deployment templates can be deployed; and
  reasons why a second portion of the list of deployment templates cannot be deployed.

7. The computer-implemented method of claim 1, wherein the storage assets comprise software-defined storage assets.

8. The computer-implemented method of claim 1, wherein at least a portion of the computer-implemented method executes in a cloud-native environment.

9. A system, comprising;
  a processor; and
  a non-volatile memory in operable communication with the processor and storing computer program code that when executed on the processor causes the processor to execute a process operable to perform the operations of:
  accessing a consumption request to consume storage assets, the consumption request comprising a stack parameter and a resource characteristic parameter, wherein the stack parameter specifies at least one type of storage asset that is requested, and the resource characteristic parameter specifies at least one functional capability required of the storage asset;
  determining, based on the stack parameter, a set of one or more first storage assets able to satisfy the consumption request;
  for each first storage asset in the set that is not deployed, generating a first workflow configured to deploy the respective first storage asset in the set that is not deployed;
  for each second storage asset in the set that lacks the resource characteristic parameter, generating a second workflow configured to implement that resource characteristic in the respective second storage asset; and
  configuring the set of storage assets to satisfy the consumption request, wherein the configuring comprises running the first and second workflows.

10. The system of claim 9, further comprising computer program code that when executed on the processor causes the processor to perform the operations of:
  determining that a third storage asset resource can be created to satisfy the consumption request; and
  generating a third workflow configured to create and deploy the third storage asset resource.

11. The computer-implemented algorithm of claim 10, wherein the third storage asset resource is formed within at least one of the first and second storage assets.

12. The system of claim 9, wherein the consumption request comprises a query, including query parameters, relating to a search of an inventory of the storage assets, and wherein the computer-implemented method further comprises computer program code that when executed on the processor causes the processor to perform the following actions:
  pre-defining a set of templates applicable to the storage assets, each respective template comprising configuration of the respective storage asset and prerequisites to deploy the storage asset; and
  generating a rules set configured to execute on an inventory of storage assets, the rules set configured to determine, based on one or more rules in the rule set, if a template is achievable for a given storage asset.

13. The system of claim 9, further comprising computer program code that when executed on the processor causes the processor to perform the operations of:
  receiving a list of deployment templates applicable to the storage assets, the list generated in view of the rules set, wherein the list of deployment templates comprises at least one of:
    reasons why a first portion of the list of deployment templates can be deployed; and
    reasons why a second portion of the list of deployment templates cannot be deployed.

14. The system of claim 9, wherein the storage assets comprise software-defined storage assets.

15. The system of claim 9, wherein at least a portion of the computer program code executes in a cloud-native environment.

16. A computer program product including a non-transitory computer readable storage medium having computer program code encoded thereon that when executed on a processor of a computer causes the computer to operate a storage system, the computer program product comprising:
  computer program code for accessing a consumption request to consume storage assets, the consumption request comprising a stack parameter and a resource characteristic parameter, wherein the stack parameter specifies at least one type of storage asset that is requested, and the resource characteristic parameter specifies at least one functional capability required of the storage asset;
  computer program code for determining, based on the stack parameter, a set of one or more first storage assets able to satisfy the consumption request;
  computer program code for generating, for each first storage asset in the set that is not deployed, a first workflow configured to deploy the respective first storage asset in the set that is not deployed;
  computer program code for generating, for each second storage asset in the set that lacks the resource characteristic parameter, a second workflow configured to implement that resource characteristic in the respective second storage asset; and
  computer program code for configuring the set of storage assets to satisfy the consumption request, wherein the configuring comprises running the first and second workflows.

17. The computer program product of claim 16, further comprising:
  computer program code for determining that a third storage asset resource can be created to satisfy the consumption request; and computer program code for generating a third workflow configured to create and deploy the third storage asset resource.

18. The computer program product of claim 16, wherein the consumption request comprises a query, including query parameters, relating to a search of an inventory of the storage assets, and further comprising:

computer program code for pre-defining a set of templates applicable to the storage assets, each respective template comprising configuration of the respective storage asset and prerequisites to deploy the storage asset; and computer program code for generating a rules set configured to execute on an inventory of storage assets, the rules set configured to determine, based on one or more rules in the rule set, if a template is achievable for a given storage asset.

19. The computer program product of claim 16, further comprising computer program code for receiving a list of deployment templates applicable to the storage assets, the list generated in view of the rules set, wherein the list of deployment templates comprises at least one of:

reason why a first portion of the list of deployment templates can be deployed; and reasons why a second portion of the list of deployment templates cannot be deployed.

20. The computer program product of claim 16, wherein the storage assets comprise software-defined storage assets.

* * * * *